(12) United States Patent
Talagala et al.

(10) Patent No.: US 10,019,320 B2
(45) Date of Patent: Jul. 10, 2018

(54) SYSTEMS AND METHODS FOR DISTRIBUTED ATOMIC STORAGE OPERATIONS

(71) Applicant: SanDisk Technologies LLC, Plano, TX (US)

(72) Inventors: Nisha Talagala, Livermore, CA (US); Dhananjoy Das, Sunnyvale, CA (US); Swaminathan Sundararaman, San Jose, CA (US); Ashish Batwara, Fremont, CA (US); Nick Piggin, Yarralumla (AU)

(73) Assignee: SANDISK TECHNOLOGIES LLC, Plano, TX (US)

( * ) Notice: Subject to any disclaimer, the term of this patent is extended or adjusted under 35 U.S.C. 154(b) by 464 days.

(21) Appl. No.: 14/298,791

(22) Filed: Jun. 6, 2014

(65) Prior Publication Data
US 2015/0113326 A1 Apr. 23, 2015

Related U.S. Application Data

(60) Provisional application No. 61/892,962, filed on Oct. 18, 2013.

(51) Int. Cl.
 G06F 11/14 (2006.01)
 G06F 3/06 (2006.01)
 G06F 11/20 (2006.01)

(52) U.S. Cl.
 CPC .......... *G06F 11/1441* (2013.01); *G06F 3/064* (2013.01); *G06F 3/0619* (2013.01);
 (Continued)

(58) Field of Classification Search
 CPC ...... G06F 3/0619; G06F 3/064; G06F 3/0688; G06F 11/1441; G06F 11/1443
 (Continued)

(56) References Cited

U.S. PATENT DOCUMENTS

| 4,571,674 A | 2/1986 | Hartung |
| 5,193,184 A | 3/1993 | Belsan et al. |

(Continued)

FOREIGN PATENT DOCUMENTS

| CN | 1771495 | 5/2006 |
| EP | 1418502 | 5/2004 |

(Continued)

OTHER PUBLICATIONS

Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.

(Continued)

*Primary Examiner* — Ann J Lo
*Assistant Examiner* — Tracy A Warren
(74) *Attorney, Agent, or Firm* — Kunzler, PC

(57) ABSTRACT

An aggregation module combines a plurality of logical address spaces to form a conglomerated address space. The logical address spaces comprising the conglomerated address space may correspond to different respective storage modules and/or storage devices. An atomic aggregation module coordinates atomic storage operations within the conglomerated address space, and which span multiple storage modules. The aggregation module may identify the storage modules used to implement the atomic storage request, assign a sequence indicator to the atomic storage request, and issue atomic storage requests (sub-requests) to the storage modules. The storage modules may be configured to store a completion tag comprising the sequence indicator upon completing the sub-requests issued thereto. The aggregation module may identify incomplete atomic storage requests based on the completion information stored on the storage modules.

25 Claims, 38 Drawing Sheets

(52) U.S. Cl.
CPC ........ *G06F 3/0688* (2013.01); *G06F 11/1443* (2013.01); *G06F 11/2094* (2013.01)

(58) Field of Classification Search
USPC ....................................................... 711/155
See application file for complete search history.

(56) References Cited

U.S. PATENT DOCUMENTS

| | | | |
|---|---|---|---|
| 5,261,068 A | 11/1993 | Gaskins et al. | |
| 5,307,497 A | 4/1994 | Feigenbaum et al. | |
| 5,325,509 A | 6/1994 | Lautzenheiser | |
| 5,392,427 A | 2/1995 | Barrett et al. | |
| 5,404,485 A | 4/1995 | Ban | |
| 5,438,671 A | 8/1995 | Miles | |
| 5,469,555 A | 11/1995 | Ghosh et al. | |
| 5,499,354 A | 3/1996 | Aschoff et al. | |
| 5,504,882 A | 4/1996 | Chai | |
| 5,535,399 A | 7/1996 | Blitz et al. | |
| 5,553,261 A | 9/1996 | Hasbun et al. | |
| 5,586,291 A | 12/1996 | Lasker | |
| 5,594,883 A | 1/1997 | Pricer | |
| 5,596,736 A | 1/1997 | Kerns | |
| 5,598,370 A | 1/1997 | Nijima et al. | |
| 5,651,133 A | 7/1997 | Burkes | |
| 5,680,579 A | 10/1997 | Young et al. | |
| 5,682,497 A | 10/1997 | Robinson | |
| 5,682,499 A | 10/1997 | Bakke et al. | |
| 5,701,434 A | 12/1997 | Nakagawa | |
| 5,745,792 A | 4/1998 | Jost | |
| 5,754,563 A | 5/1998 | White | |
| 5,757,567 A | 5/1998 | Hetzler et al. | |
| 5,787,486 A | 7/1998 | Chin et al. | |
| 5,802,602 A | 9/1998 | Rahman et al. | |
| 5,809,527 A | 9/1998 | Cooper et al. | |
| 5,809,543 A | 9/1998 | Byers | |
| 5,845,329 A | 12/1998 | Onishi et al. | |
| 5,930,815 A | 7/1999 | Estakhri et al. | |
| 5,957,158 A | 9/1999 | Volz et al. | |
| 5,960,462 A | 9/1999 | Solomon et al. | |
| 6,000,019 A | 12/1999 | Dykstal et al. | |
| 6,014,724 A | 1/2000 | Jennett | |
| 6,073,232 A | 6/2000 | Kroeker et al. | |
| 6,101,601 A | 8/2000 | Matthews | |
| 6,170,039 B1 | 1/2001 | Kishida | |
| 6,170,047 B1 | 1/2001 | Dye | |
| 6,173,381 B1 | 2/2001 | Dye | |
| 6,185,654 B1 | 2/2001 | Van Doren | |
| 6,209,088 B1 | 3/2001 | Reneris | |
| 6,236,593 B1 | 5/2001 | Hong et al. | |
| 6,256,642 B1 | 7/2001 | Krueger et al. | |
| 6,279,069 B1 | 8/2001 | Robinson | |
| 6,289,413 B1 | 9/2001 | Rogers et al. | |
| 6,330,642 B1 | 12/2001 | Brown | |
| 6,330,688 B1 | 12/2001 | Brown | |
| 6,336,174 B1 | 1/2002 | Li et al. | |
| 6,356,986 B1 | 3/2002 | Solomon et al. | |
| 6,370,631 B1 | 4/2002 | Dye | |
| 6,385,710 B1 | 5/2002 | Goldman et al. | |
| 6,404,647 B1 | 6/2002 | Minne | |
| 6,412,080 B1 | 6/2002 | Fleming et al. | |
| 6,418,478 B1 | 7/2002 | Ignatius et al. | |
| 6,507,911 B1 | 1/2003 | Langford | |
| 6,523,102 B1 | 2/2003 | Dye et al. | |
| 6,553,511 B1 | 4/2003 | Dekoning | |
| 6,564,285 B1 | 5/2003 | Mills et al. | |
| 6,587,915 B1 | 7/2003 | Kim | |
| 6,601,211 B1 | 7/2003 | Norman | |
| 6,625,684 B1 | 9/2003 | Cho et al. | |
| 6,625,685 B1 | 9/2003 | Cho et al. | |
| 6,629,112 B1 | 9/2003 | Shank | |
| 6,658,438 B1 | 12/2003 | Moore et al. | |
| 6,671,757 B1 | 12/2003 | Multer et al. | |
| 6,715,027 B2 | 3/2004 | Kim et al. | |
| 6,751,155 B2 | 6/2004 | Gorobets | |
| 6,754,774 B2 | 6/2004 | Gruner et al. | |
| 6,775,185 B2 | 8/2004 | Fujisawa et al. | |
| 6,779,088 B1 | 8/2004 | Benveniste et al. | |
| 6,785,776 B2 | 8/2004 | Arimilli et al. | |
| 6,785,785 B2 | 8/2004 | Piccirillo et al. | |
| 6,877,076 B1 | 4/2005 | Cho et al. | |
| 6,880,049 B2 | 4/2005 | Gruner et al. | |
| 6,883,069 B2 | 4/2005 | Yoshida | |
| 6,883,079 B1 | 4/2005 | Priborsky | |
| 6,938,133 B2 | 8/2005 | Johnson et al. | |
| 6,957,158 B1 | 10/2005 | Hancock et al. | |
| 6,959,369 B1 | 10/2005 | Ashton et al. | |
| 6,981,070 B1 | 12/2005 | Luk et al. | |
| 6,996,676 B2 | 2/2006 | Megiddo | |
| 7,010,652 B2 | 3/2006 | Piccirillo et al. | |
| 7,010,662 B2 | 3/2006 | Aasheim et al. | |
| 7,013,376 B2 | 3/2006 | Hooper, III | |
| 7,013,379 B1 | 3/2006 | Testardi | |
| 7,093,101 B2 | 3/2006 | Aasheim et al. | |
| 7,035,974 B2 | 4/2006 | Shang | |
| 7,043,599 B1 | 5/2006 | Ware et al. | |
| 7,047,366 B1 | 5/2006 | Ezra | |
| 7,050,337 B2 | 5/2006 | Iwase et al. | |
| 7,058,769 B1 | 6/2006 | Danilak | |
| 7,076,599 B2 | 7/2006 | Aasheim et al. | |
| 7,082,495 B2 | 7/2006 | DeWhitt et al. | |
| 7,085,512 B2 | 7/2006 | Aasheim et al. | |
| 7,085,879 B2 | 8/2006 | Aasheim et al. | |
| 7,089,391 B2 | 8/2006 | Geiger et al. | |
| 7,096,321 B2 | 8/2006 | Modha | |
| 7,130,956 B2 | 10/2006 | Rao | |
| 7,130,957 B2 | 10/2006 | Rao | |
| 7,167,953 B2 | 1/2007 | Megiddo et al. | |
| 7,171,536 B2 | 1/2007 | Chang et al. | |
| 7,173,852 B2 | 2/2007 | Gorobets | |
| 7,181,572 B2 | 2/2007 | Walmsley | |
| 7,194,577 B2 | 3/2007 | Johnson et al. | |
| 7,194,740 B1 | 3/2007 | Frank et al. | |
| 7,203,815 B2 | 4/2007 | Haswell | |
| 7,215,580 B2 | 5/2007 | Gorobets | |
| 7,219,238 B2 | 5/2007 | Saito et al. | |
| 7,243,203 B2 | 7/2007 | Scheuerlein | |
| 7,246,179 B2 | 7/2007 | Camara et al. | |
| 7,254,686 B2 | 8/2007 | Islam | |
| 7,275,135 B2 | 9/2007 | Coulson | |
| 7,280,536 B2 | 10/2007 | Testardi | |
| 7,293,183 B2 | 11/2007 | Lee et al. | |
| 7,305,520 B2 | 12/2007 | Voight et al. | |
| 7,328,307 B2 | 2/2008 | Hoogterp | |
| 7,340,558 B2 | 3/2008 | Lee et al. | |
| 7,340,566 B2 | 3/2008 | Voth et al. | |
| 7,356,651 B2 | 4/2008 | Liu | |
| 7,360,015 B2 | 4/2008 | Matthews et al. | |
| 7,366,808 B2 | 4/2008 | Kano et al. | |
| 7,395,384 B2 | 7/2008 | Sinclair | |
| 7,398,348 B2 | 7/2008 | Moore et al. | |
| 7,437,510 B2 | 10/2008 | Rosenbluth et al. | |
| 7,447,847 B2 | 11/2008 | Louie et al. | |
| 7,450,420 B2 | 11/2008 | Sinclair et al. | |
| 7,464,221 B2 | 12/2008 | Nakamura et al. | |
| 7,487,235 B2 | 2/2009 | Andrews et al. | |
| 7,487,320 B2 | 2/2009 | Bansal et al. | |
| 7,516,267 B2 | 4/2009 | Coulson et al. | |
| 7,526,614 B2 | 4/2009 | Van Riel | |
| 7,529,905 B2 | 5/2009 | Sinclair | |
| 7,536,491 B2 | 5/2009 | Kano et al. | |
| 7,552,271 B2 | 6/2009 | Sinclair et al. | |
| 7,580,287 B2 | 8/2009 | Aritome | |
| 7,603,532 B2 | 10/2009 | Rajan et al. | |
| 7,610,348 B2 | 10/2009 | Kisley et al. | |
| 7,620,773 B2 | 11/2009 | Nicholson et al. | |
| 7,640,390 B2 | 12/2009 | Iwamura | |
| 7,644,239 B2 | 1/2010 | Ergan et al. | |
| 7,664,239 B2 | 1/2010 | Groff et al. | |
| 7,660,911 B2 | 2/2010 | McDaniel | |
| 7,660,941 B2 | 2/2010 | Lee et al. | |
| 7,669,019 B2 | 2/2010 | Fujibayashi et al. | |
| 7,676,628 B1 | 3/2010 | Compton et al. | |
| 7,702,873 B2 | 4/2010 | Griess et al. | |
| 7,721,059 B2 | 5/2010 | Mylly et al. | |

(56) References Cited

U.S. PATENT DOCUMENTS

| | | |
|---|---|---|
| 7,725,628 B1 | 5/2010 | Phan et al. |
| 7,831,783 B2 | 11/2010 | Pandit et al. |
| 7,853,772 B2 | 12/2010 | Chang et al. |
| 7,873,782 B2 | 1/2011 | Terry et al. |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0177687 A1 | 8/2005 | Rao |
| 2005/0193166 A1 | 9/2005 | Johnson et al. |
| 2005/0216653 A1 | 9/2005 | Johnson et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0268359 A1 | 12/2005 | Mach et al. |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0069318 A1 | 3/2007 | Chow et al. |
| 2007/0088666 A1 | 4/2007 | Saito |
| 2007/0118676 A1 | 5/2007 | Kano et al. |
| 2007/0118713 A1 | 5/2007 | Guterman |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets et al. |
| 2007/0147356 A1 | 6/2007 | Gorobets |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0209090 A1 | 5/2008 | Esmaili et al. |
| 2008/0140737 A1 | 6/2008 | Garst et al. |
| 2008/0109090 A1 | 8/2008 | Kano et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0294847 A1 | 11/2009 | Maruyama et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi |
| 2010/0017556 A1 | 1/2010 | Chin |
| 2010/0023674 A1 | 1/2010 | Aviles |
| 2010/0023676 A1 | 1/2010 | Moon |
| 2010/0023682 A1 | 1/2010 | Lee |
| 2010/0030946 A1 | 2/2010 | Kano et al. |
| 2010/0076936 A1 | 3/2010 | Rajan |
| 2010/0095059 A1 | 4/2010 | Kisley et al. |
| 2010/0169542 A1 | 7/2010 | Sinclair |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |

(56) References Cited

U.S. PATENT DOCUMENTS

| | | | |
|---|---|---|---|
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2010/0263894 A1 | 10/2010 | Swing et al. | |
| 2011/0022819 A1 | 1/2011 | Post et al. | |
| 2012/0030408 A1* | 2/2012 | Flynn | G06F 12/0246 711/102 |
| 2013/0166855 A1 | 6/2013 | Batwara | |

FOREIGN PATENT DOCUMENTS

| | | |
|---|---|---|
| EP | 1814039 | 3/2009 |
| GB | 0123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO1994019746 | 9/1994 |
| WO | WO1995018407 | 7/1995 |
| WO | WO199612225 | 4/1996 |
| WO | WO200201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2008070173 | 6/2008 |
| WO | WO2008073421 | 6/2008 |
| WO | WO2011106394 | 9/2011 |
| WO | WO2012/016089 A2 | 2/2012 |

OTHER PUBLICATIONS

Agigatech, "Bulletproof Memory for Raid Servers, Part 1," http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Nameless Writes," HotStorage '10, Boston, MA, Jun. 2010.
Asine, "ASPMC-660 Rugged IDE Flash Drive PMC Module", http://www.asinegroup.com/products/aspmc660.html, copyright 2002, visited Nov. 8, 2009.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Bonnet et al., "Flash Device Support for Database Management," published at the 5th Biennial Conference on Innovative Data Systems Research (CIDR '11), held in Asilomar, California, on Jan. 9-12, 2011.
Brandon, Jr., "Sparse Matrices in CS Education," Journal of Computing Sciences in Colleges, vol. 24 Issue 5, May 2009, pp. 93-98.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Dan, "Implementing MLC NAND Flash for Cost-Effective, High-Capacity Memory," M-Systems, White Paper, 91-SR-014-02-8L, Rev 1.1, Sep. 2003.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
European Patent Office, Office Action, EP Application No. 07865345.8, dated Nov. 17, 2010.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gutmann, "Secure Deletion of Data from Magnetic and Solid-State Memory", Usenix, 14 pages, San Jose, CA, published Jul. 1, 1996.
Hensbergen, IBM Research Report, "Dynamic Policy Disk Caching for Storage Networking," IBM Research Division, Computer Science, RC24123 (WO611-189), Nov. 28, 2006.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Mesnier, "Object-Based Storage," IEEE Communications Magazine, Aug. 2003, pp. 84-90.
Micron Technology, Inc., "NAND Flash 101: An Introduction to NAND Flash and How to Design it in to Your Next Product (TN-29-19)," http://www.micron.com/~/media/Documents/Products/Technical%20Note/NAND%20Flash/145tn2919_nand_101.pdf, 2006, visited May 10, 2010.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, "How NTFS Works," Apr. 9, 2010.
Morgenstern, David, "Is There a Flash Memory Raid in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.

(56) References Cited

OTHER PUBLICATIONS

Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13org.Documents/Uploaded-Documents/docs2008/e07154r6-Data_Set_Management_Proposal_for_ATA-ACS2.pdf, printed Apr. 5, 2010.
Singer, "Implementing MLC NAND Flash for Cost-Effective, High Capacity Memory," M-Systems, White Paper, 91-SR014-02-8L, Rev. 1.1, Sep. 2003.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
State Intellectual Property Office, Office Action, CN Application No. 200780050983.8, dated May 18, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
International Search Report and Written Opinion dated Jan. 8, 2015 for international application PCT/US2014/060952.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Oct. 28, 2010.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
United States Patent Office, Final Office Action, U.S. Appl. No. 11/952,109, dated Nov. 29, 2011.
United States Patent Office, Office Action, U.S. Appl. No. 11/952,113, dated Mar. 6, 2012.
United States Patent Office, Office Action, U.S. Appl. No. 11/952,113, dated Dec. 15, 2010.
United States Patent Office, Office Action, U.S. Appl. No. 11/952,109, dated May 1, 2012.
United States Patent Office, U.S. Appl. No. 60/912,728, published as U.S. Application Publication No. 20080263305 dated Oct. 23, 2008.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13,607,486 dated May 2, 2013.
USPTO, Office Action for U.S. Appl. No. 13/118,237 dated Apr. 22, 2013.
USPTO, Office Action for U.S. Appl. No. 13/424,333 dated Mar. 17, 2014.
USPTO, Office Action for U.S. Appl. No. 14/030,717 dated Apr. 11, 2014.
USPTO, Office Action, U.S. Appl. No. 11/952,109, dated Nov. 29, 2011.
Van Hensbergen, "Dynamic Policy Disk Caching for Storage Networking," IBM Research Division, RC24123 (W0611-189), Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wikipedia, "Object Storage Device," http://en.wikipedia.org/wiki/Object-storage-device, last visited Apr. 29, 2010.
WIPO, International Preliminary Report of Patentability for PCT/US2007/086691, dated Feb. 16, 2009.
WIPO, International Preliminary Report on Patentability for PCT/US2007/025048, dated Jun. 10, 2009.
WIPO, International Preliminary Report on Patentability for PCT/US2007/059048, dated Oct. 20, 2009.
WIPO, International Preliminary Report on Patentability for PCT/US2007/086687, dated Mar. 18, 2009.
WIPO, International Preliminary Report on Patentability for PCT/US2007/086688, dated Mar. 16, 2009.
WIPO, International Preliminary Report on Patentability for PCT/US2007/086701, Mar. 16, 2009.
WIPO, International Preliminary Report on Patentability for PCT/US2010/048325, dated Mar. 13, 2012.
WIPO, International Search Report and Written Opinion for PCT/US11/65927, dated Aug. 28, 2012.
WIPO, International Search Report and Written Opinion for PCT/US2010/048325, dated Jun. 1, 2011.
WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Search Report and Written Opinion for PCT/US2007/086687, dated Sep. 5, 2008.
WIPO, International Search Report and Written Opinion for PCT/US2007/086691, dated May 8, 2008.
WIPO, International Search Report and Written Opinion for PCT/US2007/086701, dated Jun. 5, 2008.
Wright, "Extending Acid Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
Zhang et al., "De-indirection for Flash-based SSDs with Nameless Writes," Usenix InFast 2012 (Feb. 14, 2012).

\* cited by examiner

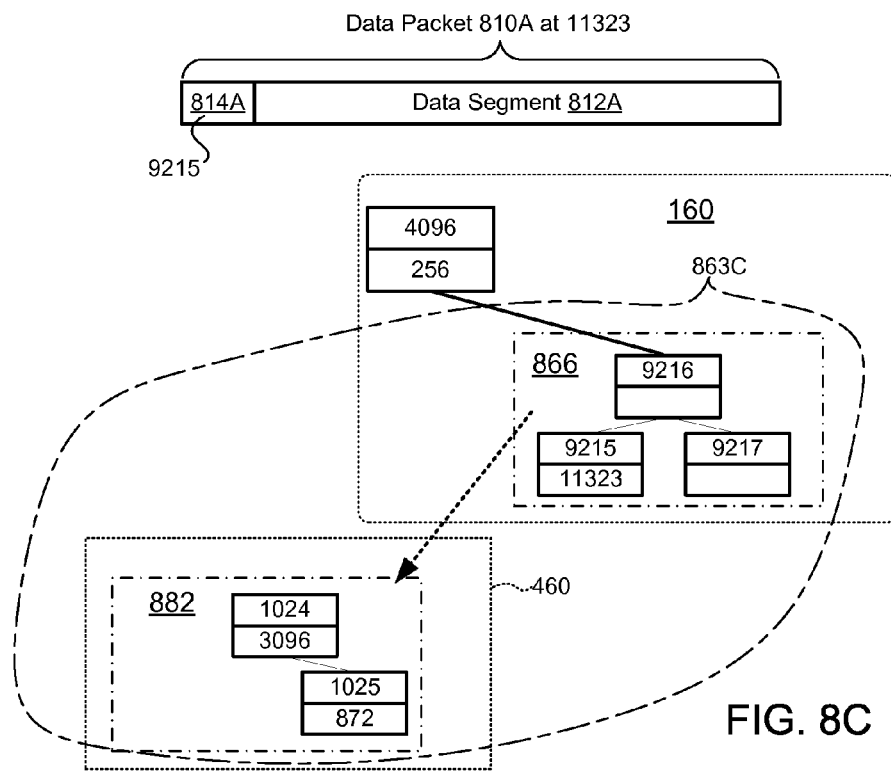
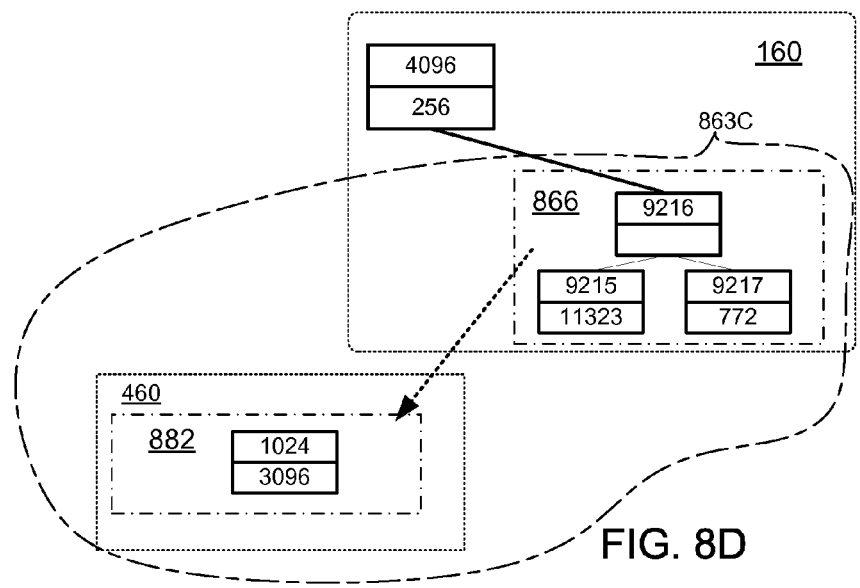
FIG. 8C
FIG. 8D

SYSTEMS AND METHODS FOR DISTRIBUTED ATOMIC STORAGE OPERATIONS

TECHNICAL FIELD

This disclosure relates to storage systems and, in particular, to systems and methods for distributed atomic storage operations.

SUMMARY

Disclosed herein are embodiments of a method for implementing atomic storage operations on two or more storage devices. The disclosed method may include assigning a completion sequence indicator to an atomic storage request pertaining to a conglomerate address space associated with address spaces of respective storage modules, generating sub-requests corresponding to the atomic storage request based on associations between identifiers of the atomic storage request and address spaces of the respective storage modules, and issuing the sub-requests to two or more of the storage modules, the sub-requests comprising the completion sequence indicator. Embodiments of the disclosed method may further comprise determining whether the sub-requests were completed by the two or more storage modules based on completion sequence indicators stored by the two or more storage modules, generating the completion sequence indicator in response to the atomic storage request, and/or identifying the two or more storage modules based on associations between identifiers of the conglomerate address space and address spaces of the storage modules.

In some embodiments, issuing the sub-requests comprises translating identifiers of the conglomerate address space to logical identifiers of respective logical address spaces of the storage modules. Determining whether the sub-requests were completed by the two or more storage modules may comprise comparing completion sequence indicators from each of the two or more storage modules.

The disclosed method may further include determining that a sub-request issued to a first one of the two or more storage modules failed based on a completion sequence indicator stored on the first storage module and/or determining that a sub-request issued to a first one of the two or more storage modules failed based on a completion sequence indicator stored on another one of the two or more storage modules. In response to an invalid shutdown, the method may comprise requesting completion tags from each of the two or more storage modules, identifying the two or more storage modules assigned sub-requests of the atomic storage request by use of the requested completion tags, and determining whether the sub-requests were successfully completed based on the requested completion tags. Alternatively, or in addition, in response to an invalid shutdown, the method may comprise receiving respective completion tags stored by the two or more storage layers, identifying a number of storage modules assigned sub-requests of the atomic storage request by use of the received completion tags, and determining whether the sub-requests of the atomic storage request were successfully completed based on the received completion tags.

Disclosed herein are embodiments of an apparatus for servicing atomic storage requests on two or more storage modules. The disclosed apparatus may comprise an atomic aggregation module configured to generate a transaction completion tag in response to an atomic storage request associated with two or more storage modules, and an aggregation storage module configured to assign respective atomic storage operations of the atomic storage request to the two or more storage modules, and to provide the two or more storage modules with the completion tag, wherein the two or more storage modules are configured to store the completion tag in response to completing the assigned atomic storage operations. The atomic storage request may correspond to identifiers of an aggregate address space corresponding to a plurality of logical address spaces of respective storage modules, and the atomic aggregation module may be configured to identify the two or more storage layers based on associations between the identifiers of the atomic storage request and the logical address spaces of the respective storage modules. The transaction completion tag may indicate a number of storage modules assigned atomic storage operations of the atomic storage request. Alternatively, or in addition, the completion tag may comprise a transaction sequence indicator associated with the atomic storage request. Each of the storage modules may comprise an atomic storage module configured to identify and/or invalidate data of failed atomic storage operations performed on the storage module.

The disclosed apparatus may include a recovery agent configured to determine whether the atomic storage operations assigned to the two or more storage modules were successfully completed based on completion tags stored on storage media of the respective two or more storage modules. The recovery agent may be configured to determine the storage modules assigned atomic storage operations of the atomic storage request in response to a completion tag stored on a storage medium of one of the storage modules. The recovery agent may be configured to inform one of the two or more storage modules that the atomic storage request is incomplete in response to another one of the two or more storage modules failing to store the completion tag. In some embodiments, the recovery agent is configured to access information pertaining to completion tags stored on the storage modules and to determine whether the atomic storage request was fully completed based on the accessed information pertaining to the completion tags. Alternatively, or in addition, the recovery agent configured determine that the atomic storage request was completed on the two or more storage modules in response to determining that each of the two or more storage modules stored the completion tag on a respective storage device.

Disclosed herein are further embodiments of operations for servicing atomic storage requests. The disclosed operations may comprise forming a virtual address space comprising a plurality of virtual identifiers by combining a plurality of logical address spaces of respective storage modules, selecting two or more of the storage modules to implement respective portions of an atomic storage request based on mappings between virtual identifiers of the atomic storage request and the storage modules, and providing completion information comprising a completion sequence number corresponding to the atomic storage request to the selected storage modules, wherein the selected storage modules are configured to write the completion information to persistent storage in response to completing the respective portions of the atomic storage request. The completion information may comprise one or more of a count of the two or more selected storage modules, and identifiers of the two or more storage modules. Configuring the selected storage modules may comprise translating virtual identifiers of the atomic storage request to logical identifiers of logical address spaces of the respective storage modules.

In some embodiments, the disclosed operations may further comprise identifying the two or more designated storage modules by use of completion information stored on one of the two or more designated storage modules, issuing the atomic sub-requests to the designated storage modules, wherein each of the designated storage modules is configured to store the completion information in response to completing a respective atomic sub-request, and/or determining whether the atomic storage request was fully completed based on completion information stored on the designated storage modules.

BRIEF DESCRIPTION OF THE DRAWINGS

FIGS. 8A-E depict embodiments of range move operations;

DETAILED DESCRIPTION

Figure 1A:
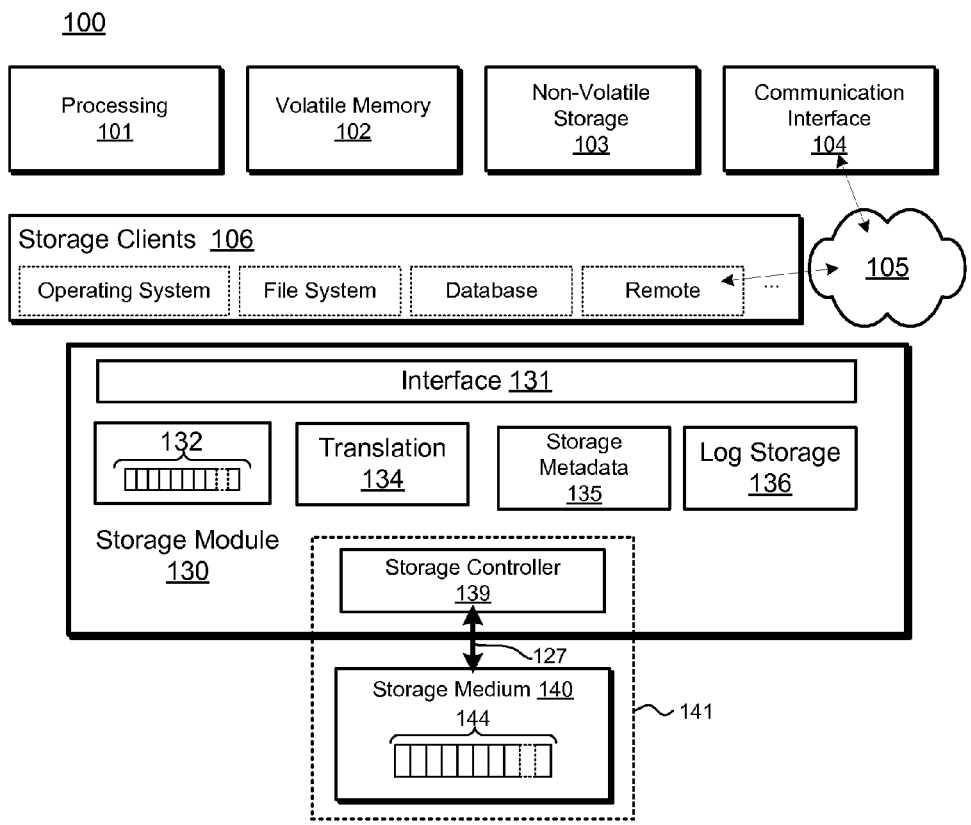
FIG. 1A is a block diagram of one embodiment of a system for open-to-close consistency.

FIG. 1A is a block diagram of one embodiment of a computing system 100 comprising a storage module 130 configured to provide storage services to one or more storage clients 106. The storage module 130 may be configured to provide open-to-close file services, as disclosed in further detail herein. The computing system 100 may comprise any suitable computing device, including, but not limited to, a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 104. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, solid-state storage medium, optical storage medium, and/or the like. The communication interface 104 may be configured to communicatively couple the computing system 100 to a network 105. The network 105 may comprise any suitable communication network including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The computing system 100 may comprise a storage module 130, which may be configured to provide storage services to one or more storage clients 106. The storage clients 106 may include, but are not limited to, operating systems (including bare metal operating systems, guest operating systems, virtual machines, virtualization environments, and the like), file systems, database systems, remote storage clients (e.g., storage clients communicatively coupled to the computing system 100 and/or storage module 130 through the network 105), and/or the like.

The storage module 130 (and/or modules thereof) may be implemented in software, hardware, or a combination thereof. In some embodiments, portions of the storage module 130 are embodied as executable instructions, such as computer program code, which may be stored on a persistent, non-transitory storage medium, such as the non-volatile storage resources 103. The instructions and/or computer program code may be configured for execution by the processing resources 101. Alternatively, or in addition, portions of the storage module 130 may be embodied as machine components, such as general and/or application-specific components, programmable hardware, FPGAs, ASICs, hardware controllers, storage controllers, and/or the like.

The storage module 130 may be configured to perform storage operations on a storage medium 140. The storage medium 140 may comprise any storage medium capable of storing data persistently. As used herein, "persistent" data storage refers to storing information on a persistent, non-volatile storage medium. The storage medium 140 may include non-volatile storage media such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-ray drives, etc.), and/or the like.

In some embodiments, the storage medium 140 comprises non-volatile solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory including both non-volatile and volatile forms. Accordingly, although particular embodiments of the storage module 130 are disclosed in the context of non-volatile, solid-state storage devices 140, the storage module 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to memory of the processing resources 101, such as a CPU cache (e.g., L1, L2, L3 cache, etc.), graphics memory, and/or the like. In some embodiments, the storage medium 140 is communicatively coupled to the storage module 130 by use of an interconnect 127. The interconnect 127 may include, but is not limited to, peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), and/or the like. Alternatively, the storage medium 140 may be a remote storage device that is communicatively coupled to the storage module 130 through the network 105 (and/or other communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage module 130 may be configured to manage storage operations on the storage medium 140 by use of, inter alia, a storage controller 139. The storage module 130 and/or storage controller 139 may comprise software and/or hardware components including, but not limited to, one or more drivers and/or other software modules operating on the computing system 100, such as one or more drivers, storage drivers, I/O drivers, filter drivers, services, kernel-level modules, user-level modules, libraries, and/or the like; hardware components, such as hardware controllers, communication interfaces, and/or the like; and so on. The storage medium 140 may be embodied on a storage device 141. Portions of the storage module 130 (e.g., storage controller 139) may be implemented as hardware and/or software components (e.g., firmware) of the storage device 141.

The storage controller 139 may be configured to implement storage operations at particular storage locations of the storage medium 140. As used herein, a storage location refers to a unit of storage of a storage resource (e.g., a storage medium and/or device) that is capable of storing data persistently; storage locations may include, but are not limited to, pages, groups of pages (e.g., logical pages and/or offsets within a logical page), storage divisions (e.g., physical erase blocks, logical erase blocks, etc.), sectors, locations on a magnetic disk, battery-backed memory locations, and/or the like. The storage locations may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage locations.

The storage module 130 may comprise an interface 131 through which storage clients 106 may access storage services provided by the storage module 130. The storage interface 131 may include one or more of a block device interface, an object storage interface, a file storage interface, a key-value storage interface, a virtualized storage interface, one or more virtual storage units (VSUs), an object storage interface, a database storage interface, and/or other suitable interface and/or an Application Programming Interface (API), and the like.

The storage module 130 may provide for referencing storage resources through a front-end storage interface. As used herein, a "front-end storage interface" refers to an interface and/or namespace through which storage clients 106 may refer to storage resources of the storage module 130. A storage interface may correspond to a logical address space (LAS) 132. The logical address space 132 may comprise a group, set, collection, range, and/or extent of identifiers. As used herein, a "identifier" or "logical identifier" (LID) refers to an identifier for referencing a source resource; LIDs may include, but are not limited to, names (e.g., file names, distinguished names, and/or the like), data identifiers, references, links, front-end identifiers, logical addresses, logical block addresses (LBAs), storage unit addresses, virtual storage unit (VSU) addresses, logical unit number (LUN) addresses, virtual unit number (VUN) addresses, virtual logical unit number (VLUN) addresses, virtual storage addresses, storage addresses, physical addresses, media addresses, back-end addresses, unique identifiers, globally unique identifiers (GUIDs), and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage module 130 is configured to provide a 64-bit logical address space 132 (e.g., a logical address space comprising 2^26 unique LIDs), which may exceed the physical storage capacity of the storage medium 140. The large, thinly-provisioned logical address space 132 may allow storage clients 106 to efficiently allocate and/or reference contiguous ranges of LIDs, while reducing the chance of naming conflicts.

The translation module 134 of the storage module 130 may be configured to map LIDs of the logical address space 132 to storage resources (e.g., data stored within the storage address space 144 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 144. In some embodiments, the logical address space 132 is sparse, thinly provisioned, and/or over-provisioned, such that the size of the logical address space 132 differs from the storage address space 144 of the storage medium 140.

The storage module 130 may be configured to maintain storage metadata 135 pertaining to storage operations performed on the storage medium 140. The storage metadata 135 may include, but is not limited to, a forward map comprising any-to-any mappings between LIDs of the logical address space 132 and storage addresses within the storage address space 144, a reverse map pertaining to the contents of storage locations of the storage medium 140, validity bitmaps, reliability testing and/or status metadata, status information (e.g., error rate, retirement status, and so on), cache metadata, and/or the like. Portions of the storage metadata 135 may be maintained within the volatile memory resources 102 of the computing system 100. Alternatively, or in addition, portions of the storage metadata 135 may be stored on non-volatile storage resources 103 and/or the storage medium 140.

Figure 1B:
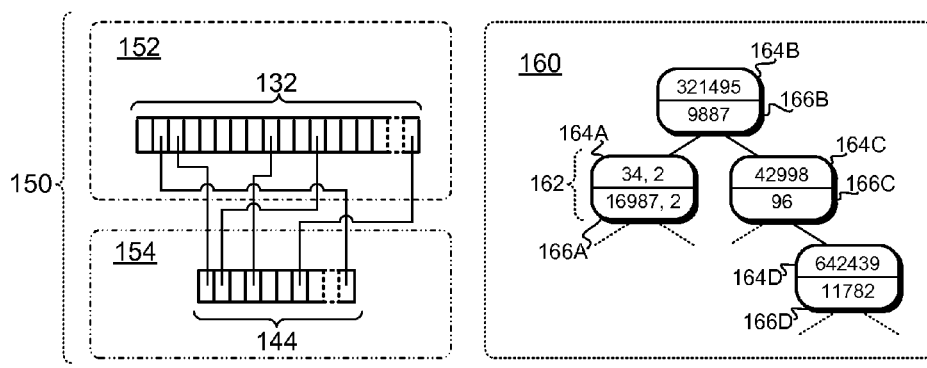
FIG. 1B depicts embodiments of storage metadata.

FIG. 1B depicts one embodiment of any-to-any mappings 150 between LIDs of the logical address space 132 and back-end identifiers (e.g., storage addresses) within the storage address space 144. The any-to-any mappings 150 may be maintained in one or more data structures of the storage metadata 135. As illustrated in FIG. 1B, the translation module 134 may be configured to map any storage resource identifier (any LID) to any back-end storage location. As further illustrated, the logical address space 132 may be sized differently than the underlying storage address space 144. In the FIG. 1B embodiment, the logical address space 132 may be thinly provisioned, and, as such, may comprise a larger range of LIDs than the range of storage addresses in the storage address space 144.

As disclosed above, storage clients 106 may reference storage resources through the LIDs of the logical address space 132. Accordingly, the logical address space 132 may correspond to a logical interface 152 of the storage resources, and the mappings to particular storage addresses within the storage address space 144 may correspond to a back-end interface 154 of the storage resources.

The storage module 130 may be configured to maintain the any-to-any mappings 150 between the logical interface 152 and back-end interface 154 in a forward map 160. The forward map 160 may comprise any suitable data structure, including, but not limited to, an index, a map, a hash map, a hash table, a tree, a range-encoded tree, a b-tree, and/or the like. The forward map 160 may comprise entries 162 corresponding to LIDs that have been allocated for use to reference data stored on the storage medium 140. The entries 162 of the forward map 160 may associate LIDs 164A-D with respective storage addresses 166A-D within the storage address space 144. The forward map 160 may be sparsely populated, and as such, may omit entries corresponding to LIDs that are not currently allocated by a storage client 106 and/or are not currently in use to reference valid data stored on the storage medium 140. In some embodiments, the forward map 160 comprises a range-encoded data structure, such that one or more of the entries 162 may correspond to a plurality of LIDs (e.g., a range, extent, and/or set of LIDs). In the FIG. 1B embodiment, the forward map 160 includes an entry 162 corresponding to a range of LIDs 164A mapped to a corresponding range of storage addresses 166A. The entries 162 may be indexed by LIDs. In the FIG. 1B embodiment, the entries 162 are arranged into a tree data structure by respective links. The disclosure is not limited in this regard, however, and could be adapted to use any suitable data structure and/or indexing mechanism.

Figure 1C:
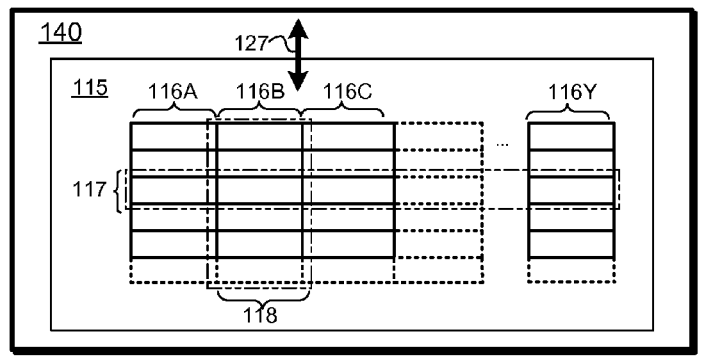
FIG. 1C is a block diagram depicting one embodiment of a storage array.

Referring to FIG. 1C, in some embodiments, the storage medium 140 may comprise a solid-state storage array 115 comprising a plurality of solid-state storage elements 116A-Y. As used herein, a solid-state storage array (or storage array) 115 refers to a set of two or more independent columns 118. A column 118 may comprise one or more solid-state storage elements 116A-Y that are communicatively coupled to the storage module 130 in parallel using, inter alia, the interconnect 127. Rows 117 of the array 115 may comprise physical storage units of the respective columns 118 (solid-state storage elements 116A-Y). As used herein, a solid-state storage element 116A-Y includes, but is not limited to, solid-state storage resources embodied as a package, chip, die, plane, printed circuit board, and/or the like. The solid-state storage elements 116A-Y comprising the array 115 may be capable of independent operation. Accordingly, a first one of the solid-state storage elements 116A may be capable of performing a first storage operation while a second solid-state storage element 116B performs a different storage operation. For example, the solid-state storage element 116A may be configured to read data at a first physical address, while another solid-state storage element 116B reads data at a different physical address.

A solid-state storage array 115 may also be referred to as a logical storage element (LSE). As disclosed in further detail herein, the solid-state storage array 115 may comprise logical storage units (rows 117). As used herein, a "logical storage unit" or row 117 refers to combination of two or more physical storage units, each physical storage unit on a respective column 118 of the array 115. A logical erase block refers to a set of two or more physical erase blocks, a logical page refers to a set of two or more pages, and so on. In some embodiments, a logical erase block may comprise erase blocks within respective logical storage elements 115 and/or banks. Alternatively, a logical erase block may comprise erase blocks within a plurality of different arrays 115 and/or may span multiple banks of solid-state storage elements.

Referring back to FIG. 1A, the storage module 130 may further comprise a log storage module 136 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. Accordingly, the storage module 130 may be configured to store data in a contextual, self-describing format. As used herein, a contextual or self-describing format refers to a data format in which data is stored in association with persistent metadata. In some embodiments, the persistent metadata may be configured to identify the data, and as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

Figure 1D:
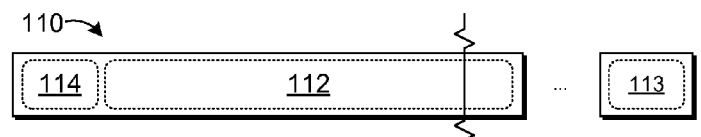
FIG. 1D depicts one embodiment of a data packet format.

FIG. 1D illustrates one embodiment of a contextual data format. The packet format 110 of FIG. 1D comprises a data segment 112 and persistent metadata 114. The data segment 112 may be of any arbitrary length and/or size. The persistent metadata 114 may be embodied as one or more header fields of the data packet 110. As disclosed above, the persistent metadata 114 may comprise the logical interface of the data segment 112, and as such, may include the LID(s) associated with the data segment 112. Although FIG. 1D depicts a packet format 110, the disclosure is not limited in this regard and could associate data (e.g., data segment 112) with contextual metadata in other ways including, but not limited to, an index on the storage medium 140, a storage division index, and/or the like. Data packets 110 may be associated with sequence information 113. The sequence information may be used to determine the relative order of the data packets within the storage log. In some embodiments, data packets are appended sequentially within storage divisions of the storage medium 140. The storage divisions may correspond to erase blocks, logical erase blocks, or the like. Each storage division may be capable of storing a large number of data packets 110. The relative position of the data packets 110 within a storage division may determine the order of the packets within the storage log. The order of the storage divisions may be determined, inter alia, by storage division sequence information 113. Storage divisions may be assigned respective sequence information 113 at the time the storage division is initialized for use (e.g., erased), programmed, closed, or the like. The storage division sequence information 113 may determine an ordered sequence of storage divisions within the storage address space 144. Accordingly, the relative order of a data packet 110 within the storage log may be determined by: a) the relative position of the data packet 110 within a particular storage division and b) the order of the storage division relative to other storage divisions in the storage address space 144.

In some embodiments, the storage module 130 may be configured to manage an asymmetric, write-once storage medium 140, such as a solid-state storage medium, flash storage medium, or the like. As used herein, a "write once" storage medium refers to a storage medium that is reinitialized (e.g., erased) each time new data is written or programmed thereon. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage medium 140 may be partitioned into storage divisions that can be erased as a group (e.g., erase blocks). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage module 130 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

Figure 1E:
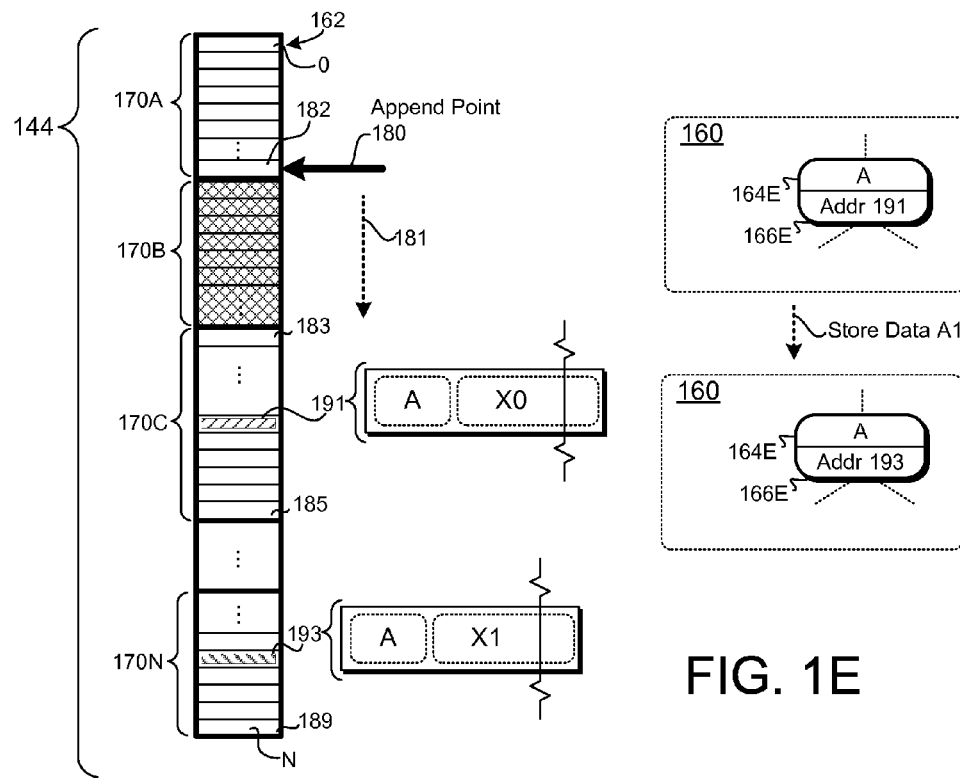
FIG. 1E depicts one embodiment of a storage log.

The storage module 130 may be configured to perform storage operations out-of-place by use of, inter alia, the log storage module 136. The log storage module 136 may be configured to append data at a current append point within the storage address space 144 in a manner that maintains the relative order of storage operations performed by the storage module 130, forming a "storage log" on the storage medium 140. FIG. 1E depicts one embodiment of append-only storage operations performed within the storage address space 144 of the storage medium 140. As disclosed above, the storage address space 144 comprises a plurality of storage divisions 170A-N (e.g., erase blocks, logical erase blocks, or the like), each of which can be initialized for use in storing data (e.g., erased). The storage divisions 170A-N may comprise respective storage locations, which may correspond to pages, logical pages, and/or the like, as disclosed herein. The storage locations may be assigned respective storage addresses (e.g., storage address 0 to storage address N).

The log storage module 136 may be configured to store data sequentially from an append point 180 within the physical address space 144. In the FIG. 1E embodiment, data may be appended at the append point 180 within storage location 182 of storage division 170A and, when the storage location 182 is filled, the append point 180 may advance 181 to a next available storage location. As used herein, an "available" storage location refers to a storage location that has been initialized and has not yet been programmed (e.g., has been erased). As disclosed above, some types of storage media can only be reliably programmed once after erasure. Accordingly, an available storage location may refer to a storage location within a storage division 170A-N that is in an initialized (or erased) state.

In the FIG. 1E embodiment, the logical erase block 170B may be unavailable for storage due to, inter alia, not being in an erased state (e.g., comprising valid data), being out-of-service due to high error rates, or the like. Therefore, after filling the storage location 182, the log storage module 136 may skip the unavailable storage division 170B, and advance the append point 180 to the next available storage division 170C. The log storage module 136 may be configured to continue appending data to storage locations 183-185, at which point the append point 180 continues at a next available storage division 170A-N, as disclosed above.

After storing data on the "last" storage location within the storage address space 144 (e.g., storage location N 189 of storage division 170N), the log storage module 136 may advance the append point 180 by wrapping back to the first storage division 170A (or the next available storage division, if storage division 170A is unavailable). Accordingly, the log storage module 136 may treat the storage address space 144 as a loop or cycle.

As disclosed above, sequentially appending data within the storage address space 144 may generate a storage log on the storage medium 140. In the FIG. 1E embodiment, the storage log may comprise the ordered sequence of storage operations performed by sequentially storing data packets (and/or other data structures) from the append point 180 within the storage address space 144. The append-only storage format may be used to modify and/or overwrite data out-of-place, as disclosed above. Performing storage operations out-of-place may avoid write amplification, since existing valid data on the storage divisions 170A-N comprising the data that is being modified and/or overwritten need not be erased and/or recopied. Moreover, writing data out-of-place may remove erasure from the latency path of many storage operations (the erasure latency is no longer part of the "critical path" of a write operation).

In the FIG. 1E embodiment, a data segment X0 corresponding to LID A may be stored at storage location 191. The data segment X0 may be stored in the self-describing packet format 110, disclosed above. The data segment 112 of the packet 110 may comprise the data segment X0, and the persistent metadata 114 may comprise the LID(s) associated with the data segment (e.g., the LID A). A storage client 106 may request an operation to modify and/or overwrite the data associated with the LID A, which may comprise replacing the data segment X0 with data segment X1. The storage module 130 may perform this operation out-of-place by appending a new packet 110 comprising the data segment X1 at a different storage location 193 on the storage medium 144, rather than modifying the existing data packet 110, in place, at storage location 191. The storage operation may further comprise updating the storage metadata 135 to associate the LID A with the storage address of storage location 193 and/or to invalidate the obsolete data X0 at storage location 191. As illustrated in FIG. 1E, updating the storage metadata 135 may comprise updating an entry of the forward map 160 to associate the LID A 164E with the storage address of the modified data segment X1.

Performing storage operations out-of-place (e.g., appending data to the storage log) may result in obsolete or invalid data remaining on the storage medium 140 (e.g., data that has been erased, modified, and/or overwritten out-of-place). As illustrated in FIG. 1E, modifying the data of LID A by appending the data segment X1 to the storage log as opposed to overwriting and/or replacing the data segment X0 in place at storage location 191 results in keeping the obsolete version of the data segment X0 on the storage medium 140. The obsolete version of the data segment X0 may not be immediately removed from the storage medium 140 (e.g., erased), since, as disclosed above, erasing the data segment X0 may involve erasing an entire storage division 170A and/or relocating valid data on the storage division 170A, which is a time-consuming operation and may result in write amplification. Similarly, data that is no longer is use (e.g., deleted or subject to a TRIM operation) may not be immediately removed. As such, over time, the storage medium 140 may accumulate a significant amount of "invalid" data.

The storage module 130 may identify invalid data, such as the data segment X0 at storage location 191, by use of the storage metadata 135 (e.g., the forward map 160). The storage module 130 may determine that storage locations that are not associated with valid identifiers (LIDs) in the forward map 160 comprise data that does not need to be retained on the storage medium 140. Alternatively, or in addition, the storage module 130 may maintain other storage metadata 135, such as validity bitmaps, reverse maps, and/or the like to efficiently identify data that has been deleted, has been TRIMed, is obsolete, and/or is otherwise invalid.

The storage module 130 may be configured to reclaim storage resources occupied by invalid data. The storage module 130 may be further configured to perform other media management operations including, but not limited to, refreshing data stored on the storage medium 140 (to prevent error conditions due to data degradation, write disturb, read disturb, and/or the like), monitoring media reliability conditions, and/or the like. As used herein, reclaiming a storage resource, such as a storage division 170A-N, refers to erasing the storage division 170A-N so that new data may be stored/programmed thereon. Reclaiming a storage division 170A-N may comprise relocating valid data on the storage division 170A-N to a new storage location. The storage module 130 may identify storage divisions 170A-N for reclamation based upon one or more factors, which may include, but are not limited to, the amount of invalid data in the storage division 170A-N, the amount of valid data in the storage division 170A-N, wear levels (e.g., number of program/erase cycles), time since the storage division 170A-N was programmed or refreshed, and so on.

The storage module 130 may be configured to reconstruct the storage metadata 135, including the forward map 160, by use of contents of the storage log on the storage medium 140. In the FIG. 1E embodiment, the current version of the data associated with LID A may be determined based on the relative log order of the data packets 110 at storage locations 191 and 193, respectively. Since the data packet at storage location 193 is ordered after the data packet at storage location 191 in the storage log, the storage module 130 may determine that storage location 193 comprises the most recent, up-to-date version of the data corresponding to LID A. The storage module 130 may reconstruct the forward map 160 to associate the LID A with the data packet at storage location 193 (rather than the obsolete data at storage location 191).

Figure 2:
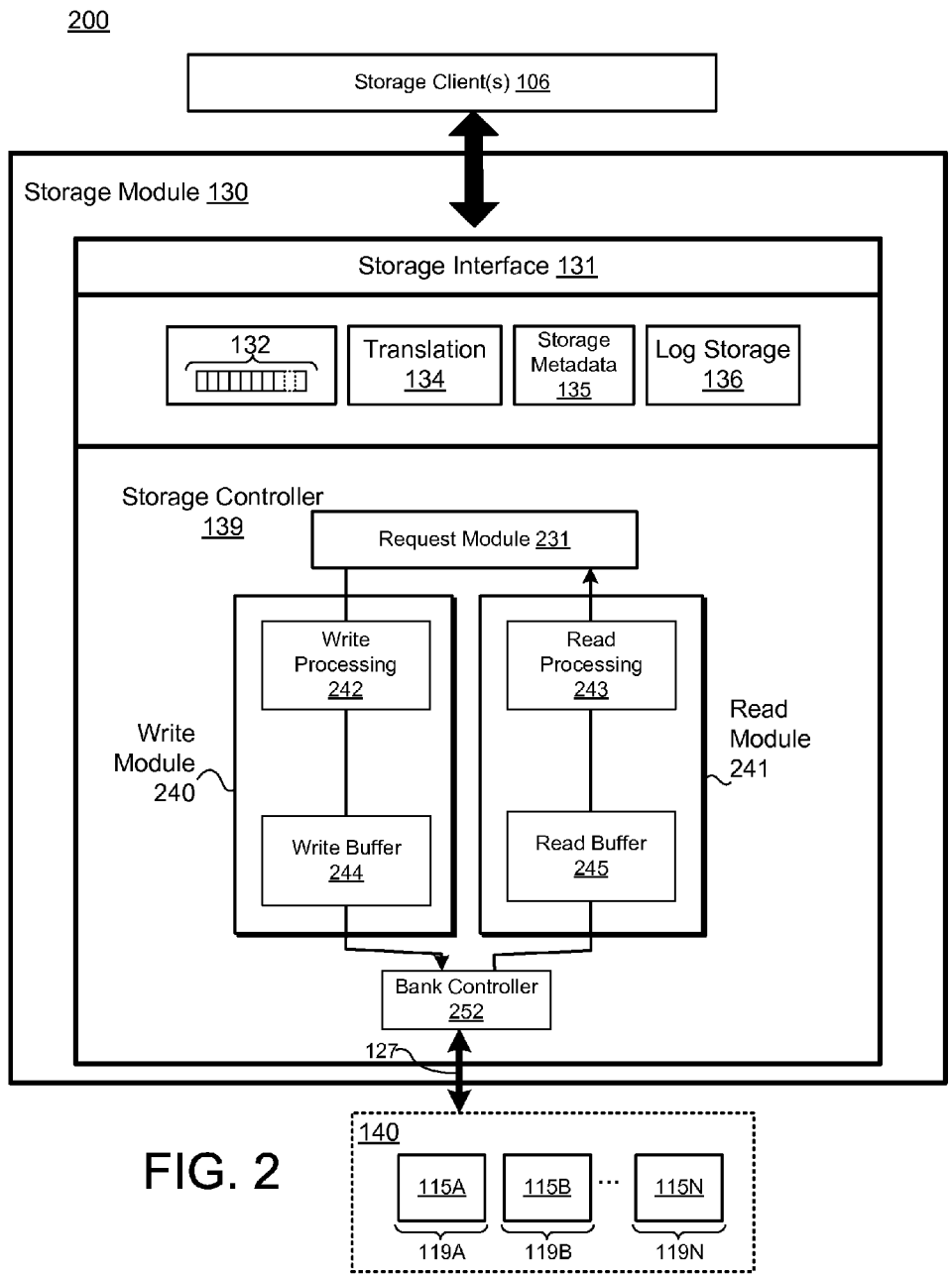
FIG. 2 is a block diagram of another embodiment of a system for open-to-close consistency.

FIG. 2 depicts another embodiment of a system 200 comprising a storage module 130. The storage medium 140 may comprise a plurality of independent banks 119A-N, each of which may comprise one or more storage arrays 115A-N. Each independent bank 119A-N may be coupled to the storage controller 139 via the interconnect 127.

The storage controller 139 may comprise a storage request receiver module 231 configured to receive storage requests from the storage module 130 via a bus 127. The storage request receiver 231 may be further configured to transfer data to/from the storage module 130 and/or storage clients 106. Accordingly, the storage request receiver module 231 may comprise one or more direct memory access (DMA) modules, remote DMA modules, bus controllers, bridges, buffers, and so on.

The storage controller 139 may comprise a write module 240 that is configured to store data on the storage medium 140 in response to requests received via the request module 231. The storage requests may comprise and/or reference the logical interface of the data pertaining to the requests. The write module 240 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data). The write module 240 may comprise a write processing module 242 configured to process data for storage. Processing data for storage may comprise one or more of: a) compression processing, b) encryption processing, c) encapsulating data into respective data packets 110 (and/or other containers), d) performing error-correcting code (ECC) processing, and so on. The write buffer 244 may be configured to buffer data for storage on the storage medium 140. In some embodiments, the write buffer 244 may comprise one or more synchronization buffers configured to synchronize a clock domain of the storage controller 139 with a clock domain of the storage medium 140 (and/or interconnect 127).

The log storage module 136 may be configured to select storage location(s) for data storage operations and may provide addressing and/or control information to the storage arrays 115A-N of the independent banks 119A-N. As disclosed herein, the log storage module 136 may be configured to append data sequentially in a log format within the storage address space 144 of the storage medium 140.

Storage operations to write data may comprise: a) appending one or more data packets to the storage log on the storage medium 140 and b) updating storage metadata 135 to associate LID(s) of the data with the storage addresses of the one or more data packets. In some embodiments, the storage metadata 135 may be maintained on memory resources of the storage controller 139 (e.g., on dedicated volatile memory resources of the storage device 141 comprising the storage medium 140). Alternatively, or in addition, portions of the storage metadata 135 may be maintained within the storage module 130 (e.g., on a volatile memory 112 of the computing device 110 of FIG. 1A). In some embodiments, the storage metadata 135 may be maintained in a volatile memory by the storage module 130, and may be periodically stored on the storage medium 140.

The storage controller 139 may further comprise a data read module 241 configured to read data from the storage log on the storage medium 140 in response to requests received via the storage request receiver module 231. The requests may comprise LID(s) of the requested data, a storage address of the requested data, and/or the like. The read module 241 may be configured to: a) determine the storage address(es) of the data packet(s) 110 comprising the requested data by use of, inter alia, the forward map 160, b) read the data packet(s) 110 from the determined storage address(es) on the storage medium 140, and c) processing data for use by the requesting entity. Data read from the storage medium 140 may stream into the read module 241 via the read buffer 245. The read buffer 245 may comprise one or more read synchronization buffers for clock domain synchronization, as described above. The read processing module 243 may be configured to processes data read from the storage medium 144, which may include, but is not limited to, one or more of: a) decompression processing, b) decryption processing, c) extracting data from one or more data packet(s) 110 (and/or other containers), d) performing ECC processing, and so on.

The storage controller 139 may further comprise a bank controller 252 configured to selectively route data and/or commands of the write module 240 and/or read module 241 to/from particular independent banks 119A-N. In some embodiments, the storage controller 139 is configured to interleave storage operations between the independent banks 119A-N. The storage controller 139 may, for example, read from the storage array 115A of bank 119A into the read module 241 while data from the write module 240 is being programmed to the storage array 115B of bank 119B. Further embodiments of multi-bank storage operations are disclosed in U.S. patent application Ser. No. 11/952,095, entitled, "Apparatus, System, and Method for Managing Commands for Solid-State Storage Using Bank Interleave," filed Dec. 12, 2006 for David Flynn et al., which is hereby incorporated by reference.

The write processing module 242 may be configured to encode data packets 110 into ECC codewords. As used herein, an ECC codeword refers to data and corresponding error detection and/or correction information. The write processing module 242 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more packets. Alternatively, the write processing module 242 may be configured to generate arbitrarily sized ECC codewords. Further embodiments of error-correcting code processing are disclosed in U.S. patent application Ser. No. 13/830,652, entitled, "Systems and Methods for Adaptive Error-Correction Coding," filed Mar. 14, 2013 for Jeremy Fillingim et al., which is hereby incorporated by reference.

In some embodiments, the storage module 130 leverages the logical address space 132 to efficiently implement high-level storage operations. The storage module 130 may be configured to implement "clone" or "logical copy" operations. As used herein, a "clone" or "logical copy" refers to operations to efficiently copy or replicate data managed by the storage module 130. A clone operation may comprise creating a set of "cloned" LIDs that correspond to the same data as a set of "original" LIDs. A clone operation may, therefore, comprise referencing the same set of storage locations using two (or more) different logical interfaces (e.g., different sets of LIDs). A clone operation may, therefore, modify the logical interface of one or more data packets 110 stored on the storage medium 140. A "logical move" may refer to an operation to modify the logical interface of data managed by the storage module 130. A logical move operation may comprise changing the LIDs used to reference data stored on the storage medium 140. A "merge" operation may comprise merging different portions of the logical address space 132. As disclosed in further detail herein, clone and/or move operations may be used to efficiently implement higher-level storage operations, such as deduplication, snapshots, logical copies, atomic operations, transactions, and/or the like.

Figure 3A:
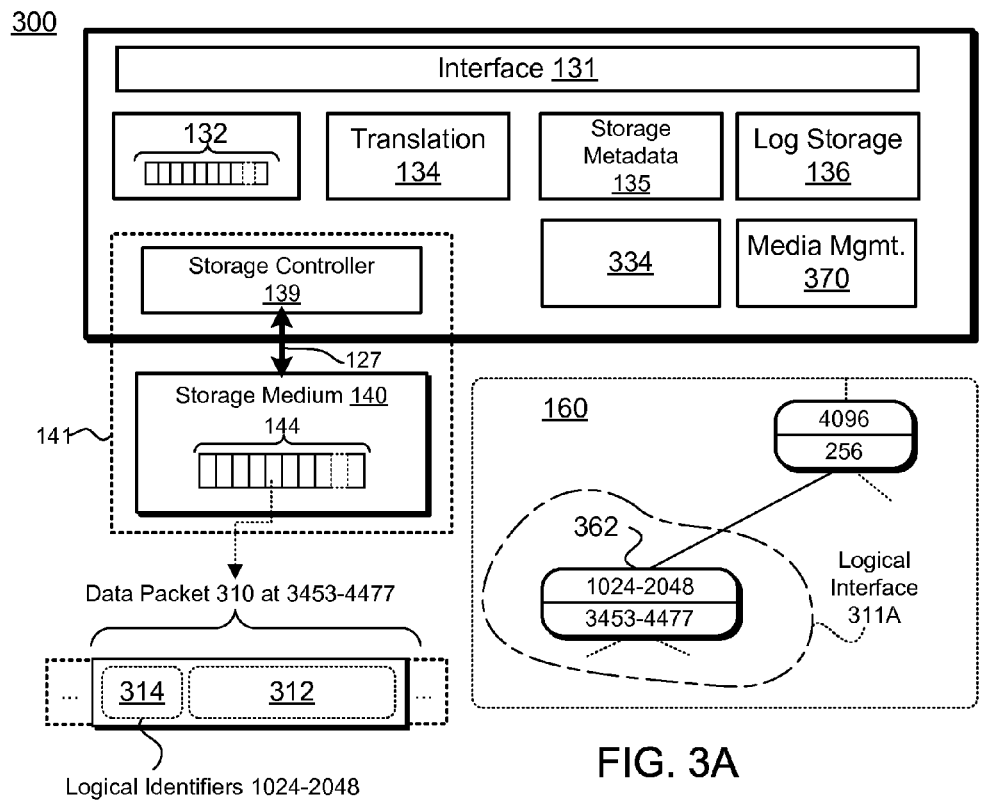
FIG. 3A is a block diagram of one embodiment of a system comprising a storage module configured to efficiently implement range clone, move, merge, and other higher-level storage operations.

Referring to FIG. 3A, the storage module 130 may comprise a logical interface management module 334 that is configured to manage logical interface operations pertaining to data managed by the storage module 130, such as clone operations, move operations, merge operations, and so on. Cloning LIDs may comprise modifying the logical interface of data stored in the storage medium 140 in order to, inter alia, allow the data to be referenced by use of two or more different sets of LIDs. Accordingly, creating a clone may comprise: a) allocating a set of LIDs in the logical address space 132 (or dedicated portion thereof) and b) associating the allocated LIDs with the same storage location(s) as an "original" set of LIDs by use of, inter alia, the storage metadata 135. Creating a clone may, therefore, comprise adding one or more entries to a forward map 160 configured to associate the new set of cloned LIDs with a particular set of storage locations.

The logical interface management module 334 may be configured to implement clone operations according to a clone synchronization policy. A clone synchronization policy may be used to determine how operations performed in reference to a first one of a plurality of clones or copies is propagated to the other clones or copies. For example, clones may be synchronized with respect to allocation operations, such that a request to expand one of the clones comprises expanding the other clones and/or copies. As used herein, expanding a file (or other data segment) refers to increasing a size, range, and/or extent of the file, which may include adding one or more logical identifiers to the clone, modifying one or more of the logical identifiers allocated to the clone, and/or the like. The clone synchronization policy may comprise a merge policy, which may, inter alia, determine how differences between clones are managed when the clones are combined in a merge and/or fold operation (disclosed in additional detail below).

FIG. 3A depicts one embodiment of a range clone operation implemented by the storage module 130. The range clone operation of FIG. 3A may be implemented in response to a request from a storage client 106. In some embodiments, the interface 131 of the storage module 130 may be configured to provide interfaces and/or APIs for performing clone operations. Alternatively, or in addition, the range clone operation may be performed as part of a higher-level operation, such as an atomic operation, transaction, snapshot, logical copy, file management operation, and/or the like.

As illustrated in FIG. 3A, the forward map 160 of the storage module 130 comprises an entry 362 configured to bind the LIDs 1024-2048 to media storage locations 3453-4477. Other entries are omitted from FIG. 3A to avoid obscuring the details of the depicted embodiment. As disclosed herein, the entry 362, and the bindings thereof, may define a logical interface 311A through which storage clients 106 may reference the corresponding data (e.g., data segment 312); storage clients 106 may access and/or reference the data segment 312 (and/or portions thereof) through the storage module 130 by use of the LIDs 1024-2048. Accordingly, the LIDs 1024-2048 define, inter alia, the logical interface 311A of the data segment 312.

As disclosed herein, the storage module 130 may be configured to store data in a contextual format on a storage medium 140 (e.g., packet format 110). In the FIG. 3A embodiment, the data packet 310 at storage locations 3453-4477 comprises a data segment 312. The data packet 310 further includes persistent metadata 314 that indicates the logical interface of the data segment 312 (e.g., associates the data segment 312 with LIDs 1024-2048). As disclosed above, storing data in association with descriptive, persistent metadata may enable the storage module 130 to rebuild the forward map 160 (and/or other storage metadata 135) from the contents of the storage log. In the FIG. 3A embodiment, the entry 362 may be reconstructed by associating the data stored at storage addresses 3453-4477 with the LIDs 1024-2048 referenced by the persistent metadata 314 of the packet 310. Although FIG. 3A depicts a single packet 310, the disclosure is not limited in this regard. In some embodiments, the data of the entry 362 may be stored in multiple, different packets 310, each comprising respective persistent metadata 314 (e.g., a separate packet for each storage location, etc.).

Figure 3B:
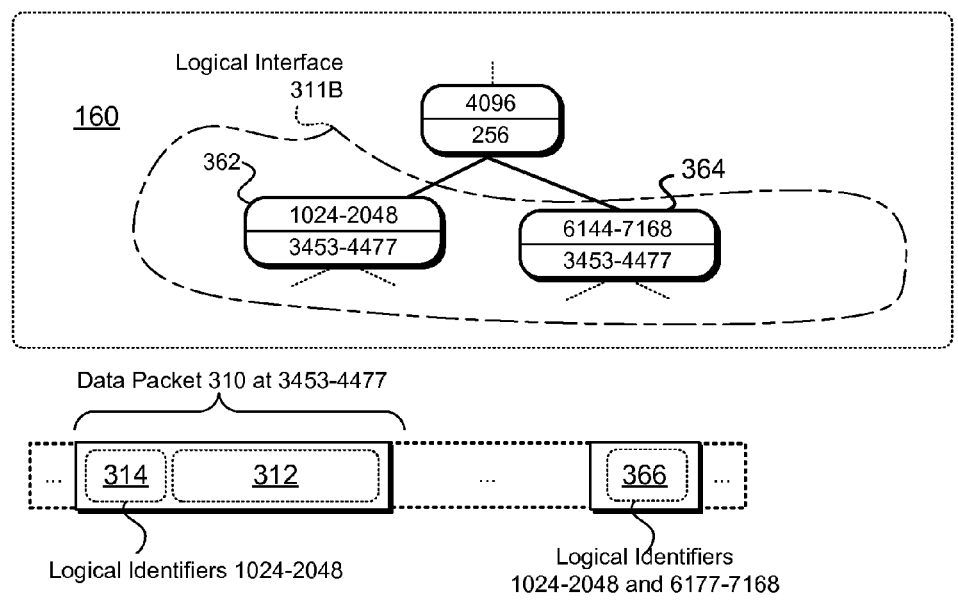
FIG. 3B depicts embodiments of range clone operations.

The logical interface management module 334 may be configured to clone the entry 362 by, inter alia, allocating a new set of LIDs corresponding to the original LIDs to be cloned and binding the new LIDs to the storage locations of the original, source LIDs. As illustrated in FIG. 3B, creating the clone of the LIDs 1024-2048 may comprise the logical interface management module 334 allocating an equivalent set of LIDs 6144-7168 and binding the cloned set of identifiers to the storage addresses 3453-4477. Creating the clone may, therefore, comprise modifying the storage metadata 135 to expand the logical interface 311B of the data segment 312 to include LIDs 6144-7168 without requiring the underlying data segment 312 to be copied and/or replicated on the storage media 140.

The modified logical interface 311B of the data segment 312 may be inconsistent with the contextual format of the corresponding data packet 310 stored at storage locations 3453-4477. As disclosed above, the persistent metadata 314 of the data packet 310 references LIDs 1024-2048, but does not include and/or reference the cloned LIDs 6144-7168. The contextual format of the data segment 312 may be updated to be consistent with the modified logical interface 311B (e.g., updated to associate the data with LIDs 1024-2048 and 6144-7168, as opposed to only LIDs 1024-2048), which may comprise rewriting the data segment in a packet format that associates the data segment with both sets of LIDs. If the storage device 141 is a random-access, write-in-place storage device, the persistent metadata 314 may be updated in place. In other embodiments comprising a write-once, asymmetric storage medium 140, such in-place updates may be inefficient. Therefore, the storage module 130 may be configured to maintain the data in the inconsistent contextual format until the data is relocated in a media management operation, such as storage recovery, relocation, and/or the like (by the media management module 370). Updating the contextual format of the data segment 312 may comprise relocating and/or rewriting the data segment 312 on the storage medium 140, which may be a time-consuming process and may be particularly inefficient if the data segment 312 is large and/or the clone comprises a large number of LIDs. Therefore, in some embodiments, the storage module 130 may defer updating the contextual format of cloned data segment 312 and/or may update the contextual format in one or more background operations. In the meantime, the storage module 130 may be configured to provide access to the data segment 312 while stored in the inconsistent contextual format (data packet 310).

The storage module 130 may be configured to acknowledge completion of clone operations before the contextual format of the corresponding data segment 312 is updated. The data may be subsequently rewritten (e.g., relocated) in the updated contextual format on the storage medium 140. The update may occur outside of the "critical path" of the clone operation and/or other foreground storage operations. In some embodiments, the data segment 312 is relocated by the media management module 370 as part of one or more of a storage recovery process, data refresh operation, and/or the like. Accordingly, storage clients 106 may be able to access the data segment 312 through the modified logical interface 311B (e.g., in reference to LIDs 1024-2048 and/or 6144-7168) without waiting for the contextual format of the data segment 312 to be updated in accordance with the modified logical interface 311B.

Until the contextual format of the data segment 312 is updated on the storage medium 140, the modified logical interface 311B of the data segment 312 may exist only in the storage metadata 135 (e.g., map 160). Therefore, if the forward map 160 is lost due to, inter alia, power failure or data corruption, the clone operation may not be reflected in the reconstructed storage metadata 135 (the clone operation may not be persistent and/or crash safe). As illustrated above, the persistent metadata 314 of the data packet 310 indicates that the data segment 312 is associated only with LIDs 1024-2048, not 6144-7168. Therefore, only entry 362 will be reconstructed (as in FIG. 3A), and entry 364 will be omitted; as a result, subsequent attempts to access the data segment 312 through the modified logical interface 311B (e.g., through 6144-7168) may fail.

In some embodiments, the clone operation may further comprise storing a persistent note on the storage medium 140 to make a clone operation persistent and/or crash safe. As used herein, a "persistent note" refers to metadata stored on the storage medium 140. Persistent notes 366 may correspond to a log order and/or may be stored in a packet format, as disclosed herein. The persistent note 366 may comprise an indication of the modified logical interface 311B of the data segment 312. In the FIG. 3B embodiment, the persistent note 366 corresponding to the depicted clone operation may be configured to associate the data stored at storage addresses 3453-4477 with both ranges of LIDs 1024-2048 and 6144-7168. During reconstruction of the forward map 160 from the contents of the storage medium 140, the persistent note 366 may be used to reconstruct both entries 362 and 364, to associate the data segment 312 with both LID ranges of the updated logical interface 311B. In some embodiments, the storage module 130 may acknowledge completion of the clone operation in response to updating the storage metadata 135 (e.g., creating the entry 364) and storing the persistent note 366 on the storage medium 140. The persistent note 366 may be invalidated and/or marked for removal from the storage medium 140 in response, updating the contextual format of the data segment 312 to be consistent with the updated logical interface 311B (e.g., relocating and/or rewriting the data segment 312, as disclosed above).

Figure 3C:
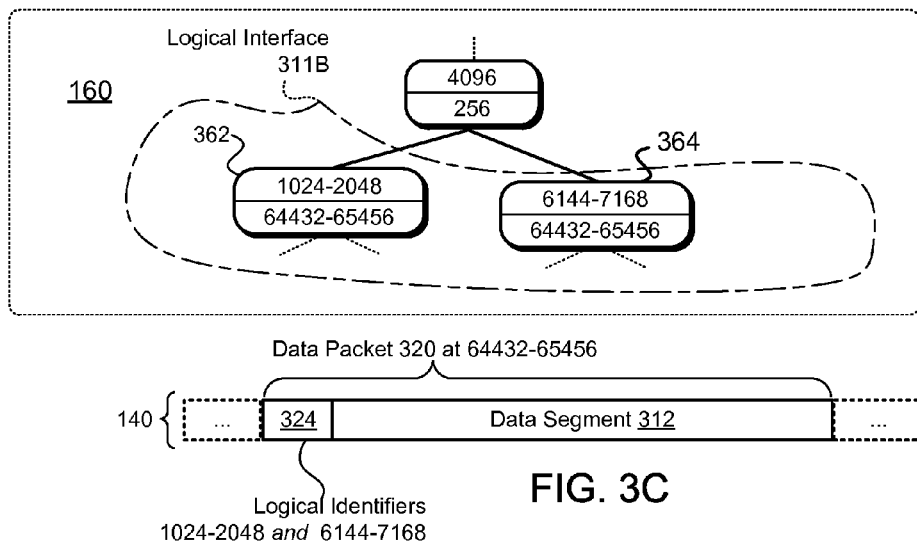
FIG. 3C depicts further embodiments of range clone operations.

In some embodiments, the updated contextual format of the data segment 312 may comprise associating the data segment 312 with both LID ranges 1024-2048 and 6144-7168. FIG. 3C depicts one embodiment of an updated contextual format (data packet 320) for the data segment 312. As illustrated in FIG. 3C, the persistent metadata 324 of the data packet 320 associates the data segment 312 with both LID ranges 1024-2048 and 6144-7168 of the updated logical interface 311B. The data packet 320 may be written out-of-place, at different storage addresses (64432-65456) than the original data packet 310, which may be reflected in updated entries 362 and 364 of the forward map 160. In response to appending the data packet 320 to the storage log, the corresponding persistent note 366 (if any) may be invalidated (removed and/or marked for subsequent removal from the storage medium 140). In some embodiments, removing the persistent note 366 may comprise issuing one or more TRIM messages indicating that the persistent note 366 no longer needs to be retained on the storage medium 140. Alternatively, or in addition, portions of the forward map 160 may be stored in a persistent, crash safe storage location (e.g., non-transitory storage resources 103 and/or the storage medium 140). In response to persisting the forward map 160 (e.g., the entries 362 and 364), the persistent note 366 may be invalidated, as disclosed above, even if the data segment 312 has not yet been rewritten in an updated contextual format.

Figure 3D:
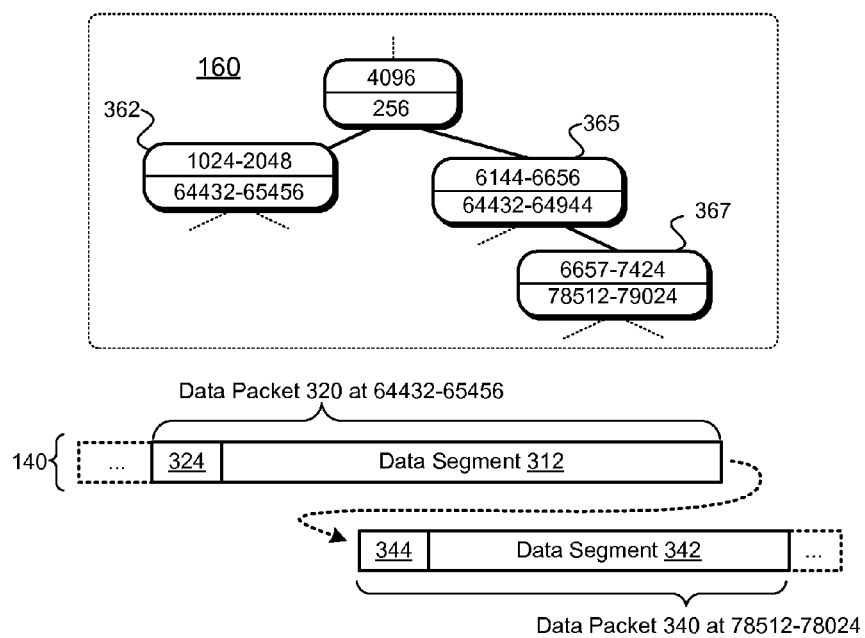
FIG. 3D depicts further embodiments of range clone operations.

The logical interface management module 334 may be configured to implement clone operations according to one or more different modes, including a "copy-on-write mode." FIG. 3D depicts one embodiment of a storage operation performed within a cloned range in a copy-on-write mode. In a copy-on-write mode, storage operations that occur after creating a clone may cause the clones to diverge from one another (e.g., the entries 362 and 364 may refer to different storage addresses, ranges, and/or extents). In the FIG. 3D embodiment, the storage module 130 has written the data segment 312 in the updated contextual data format (packet 320) that is configured to associate the data segment 312 with both LID ranges 1024-2048 and 6144-7168 (as depicted in FIG. 3C). A storage client 106 may then issue one or more storage requests to modify and/or overwrite data corresponding to the LIDs 6657-7168. In the FIG. 3D embodiment, the storage request comprises modifying and/or overwriting data of the LIDs 6657-7168. In response, the storage module 130 may store the new and/or modified data on the storage medium 130, which may comprise appending a new data packet 340 to the storage log, as disclosed above. The data packet 340 may associate the data segment 342 with the LIDs 6657-7424 (e.g., by use of persistent metadata 344 of the packet 340). The forward map 160 may be updated to associate the LIDs 6657-7424 with the data segment 342, which may comprise splitting the entry 364 into an entry 365 configured to continue to reference the unmodified portion of the data in the data segment 312 and an entry 367 that references the new data segment 342 stored at storage addresses 78512-79024. In the copy-on-write mode depicted in FIG. 3D, the entry 362 corresponding to the LIDs 1024-2048 may be unchanged, and continue to reference the data segment 312 at storage addresses 64432-65456. Although not depicted in FIG. 3D, modifications within the range 1024-2048 may result in similar diverging changes affecting the entry 362. Moreover, the storage request(s) are not limited to modifying and/or overwriting data. Other operations may comprise expanding the set of LIDs (appending data), removing LIDs (deleting, truncating, and/or trimming data), and/or the like.

In some embodiments, the storage module 130 may support other clone modes, such as a "synchronized clone" mode. In a synchronized clone mode, changes made within a cloned range of LIDs may be reflected in one or more other, corresponding ranges. In the FIG. 3D embodiment, implementing the described storage operation in a "synchronized clone" mode may comprise updating the entry 362 to reference the new data segment 342, as disclosed herein, which may comprise, inter alia, splitting the entry 362 into an entry configured to associate LIDs 1024-1536 with portions of the original data segment 312 and adding an entry configured to associate the LIDs 1537-2048 with the new data segment 342.

Referring back to the copy-on-write embodiment of FIG. 3D, the logical interface management module 334 may be further configured to manage clone merge operations. As used herein, a "merge" or "clone merge" refers to an operation to combine two or more different sets and/or ranges of LIDs. In the FIG. 3D embodiment, a range merge operation may comprise merging the entry 362 with the corresponding cloned entries 365 and 367. The logical interface management module 334 may be configured to implement range merge operations according to a merge policy, such as: a write-order policy in which more recent changes override earlier changes; a priority-based policy based on the relative priority of storage operations (e.g., based on properties of the storage client(s) 106, applications, and/or users associated with the storage operations); a completion indicator (e.g., completion of an atomic storage operation, failure of an atomic storage operation, or the like); fadvise parameters; ioctrl parameters; and/or the like.

Figure 3E:
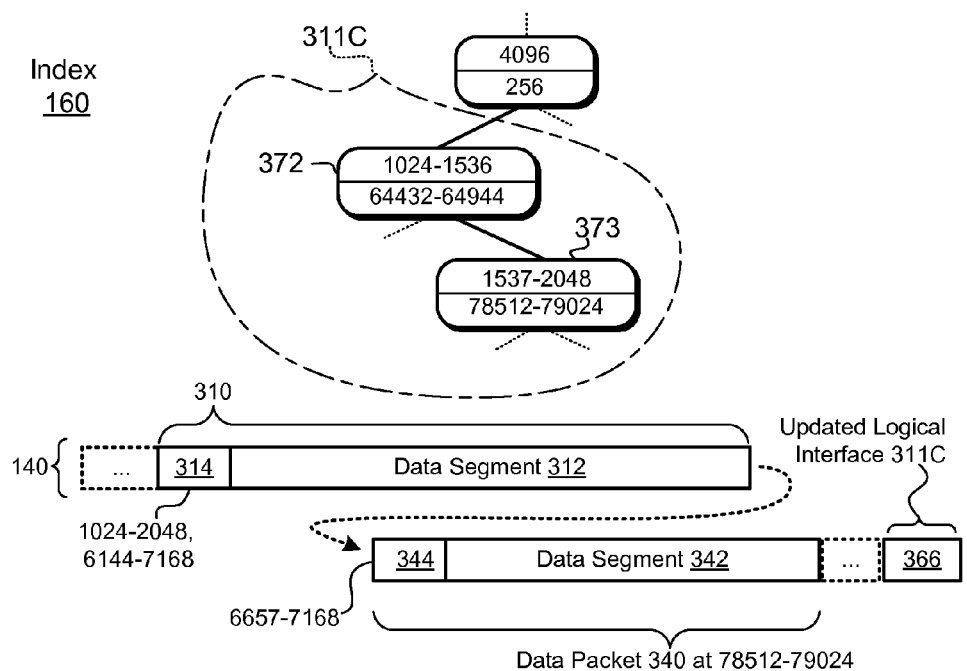
FIG. 3E depicts further embodiments of range clone operations.

FIG. 3E depicts one embodiment of a range merge operation. The range merge operation of FIG. 3E may comprise merging the range 6144-6656 into the range 1024-2048. Accordingly, the range merge operation may comprise selectively applying changes made within the LID range 6144-6656 to the LID range 1024-2048 in accordance with the merge policy. The range merge operation may, therefore, comprise updating the LID range 1024-2048 to associate LIDs 1537-2048 with the storage addresses 78512-79024 comprising the new/modified data segment 342. The update may comprise splitting the entry 362 in the forward map 160; the entry 372 may be configured to associate the LIDs 1024-1536 with portions of the original data segment 312, and entry 373 may be configured to associate LIDs 1537-2048 with the new data segment 342. Portions of the data segment 312 that are no longer referenced by the LIDs 1537-2048 may be invalidated, as disclosed herein. The LID range 6144-7168 that was merged into the original, source range may be deallocated and/or removed from the forward map 160.

The range merge operation illustrated in FIG. 3E may result in modifying the logical interface 311C to portions of the data. The contextual format of the data segment 342 (the data packet 340) may associate the data segment 342 with LIDs 6657-7168, rather than the merged LIDs 1537-2048. As disclosed above, the storage module 130 may provide access to the data segment 342 stored in the inconsistent contextual format. The storage module 130 may be configured to store the data segment 342 in an updated contextual format, in which the data segment 342 is associated with the LIDs 1537-2048 in one or more background operations (e.g., storage recovery operations). In some embodiments, the range merge operation may further comprise storing a persistent note 366 on the storage medium 140 to associate the data segment 342 with the updated logical interface 311C (e.g., associate the data segment 342 at storage addresses 78512-79024 with the LIDs 1537-2048). As disclosed above, the persistent note 366 may be used to ensure that the range merge operation is persistent and crash safe. The persistent note 366 may be removed in response to relocating the data segment 342 in a contextual format that is consistent with the logical interface 311C (e.g., associates the data segment 342 with the LIDs 1537-2048), persisting the forward map 160, and/or the like.

The clone operations disclosed in conjunction with FIGS. 3A-E may be used to implement other logical operations, such as a range move operation. Referring back to FIGS. 3A-C, a clone operation to replicate entry 362 of the forward map 160 may comprise modifying the logical interface associated with the data segment 312 to associate the data segment 312 with both the original set of LIDs 1024-2048 and a new set of cloned LIDs 6144-7168 (of entry 364). The clone operation may further include storing a persistent note 366 indicating the updated logical interface 311B of the data segment 312 and/or rewriting the data segment 312 in accordance with the updated logical interface 311B in one or more background storage operations.

The logical interface management module 334 may be further configured to implement "range move" operations. As used herein, a "range move" operation refers to modifying the logical interface of one or more data segments to associate the data segments with different sets of LIDs. A range move operation may, therefore, comprise updating storage metadata 135 (e.g., the forward map 160) to associate the one or more data segments with the updated logical interface, storing a persistent note 366 on the storage medium 140 indicating the updated logical interface of the data segments, and rewriting the data segments in a contextual format (packet format 310) that is consistent with the updated logical interface, as disclosed herein. Accordingly, the storage module 130 may implement range move operations using the same mechanisms and/or processing steps as those disclosed above in conjunction with FIGS. 3A-E.

The clone and/or range move operations disclosed in FIGS. 3A-E may impose certain limitations on the storage module 130. As disclosed above, storing data in a contextual format may comprise associating the data with each LID that references the data. In the FIG. 3C embodiment, the persistent metadata 324 comprises references to both LID ranges 1024-2048 and 6144-7168. Increasing the number references to a data segment may, therefore, impose a corresponding increase in the overhead of the contextual data format (e.g., increase the size of the persistent metadata 324). In some embodiments, the size of the persistent metadata 314 may be limited, which may limit the number of references and/or clones that can reference a particular data segment 312. Moreover, inclusion of multiple references to different LID(s) may complicate storage recovery operations. The number of forward map entries that need to be updated when a data segment 312 is relocated may vary in accordance with the number of LIDs that reference the data segment 312. Referring back to FIG. 3C, relocating the data segment 312 in a grooming and/or storage recovery operation may comprise updating two separate entries 362 and 364. Relocating a data segment referenced by N different LIDs (e.g., N different clones) may comprise updating N different entries in the forward map 160. Similarly, storing the data segment may comprise writing N entries into the persistent metadata 314. This variable overhead may reduce the performance of background storage recovery operations and may limit the number of concurrent clones and/or references that can be supported.

In some embodiments, the logical interface management module 334 may comprise and/or leverage an intermediate mapping layer to reduce the overhead imposed by clone operations. The intermediate mapping layer may comprise "reference entries" configured to facilitate efficient cloning operations (as well as other operations, as disclosed in further detail herein). As used herein, a "reference entry" refers to an entry of a mapping data structure that is used to reference other entries within the forward map 160 (and/or other storage metadata 135). A reference entry may only exist while it is referenced by one or more other entries within the logical address space 132. In some embodiments, reference entries may not be accessible to the storage clients 106 and/or may be immutable. The storage module 130 may leverage reference entries to allow storage clients to reference the same set of data through multiple, different logical interfaces via a single reference entry interface. The contextual format of data on the storage medium 140 (data that is referenced by multiple LIDs) may be simplified to associate the data with the reference entries which, in turn, are associated with N other logical interface(s) through other persistent metadata (e.g., persistent notes 366). Relocating cloned data may, therefore, comprise updating a single mapping between the reference entry and the new storage address of the data segment.

Figure 4A:
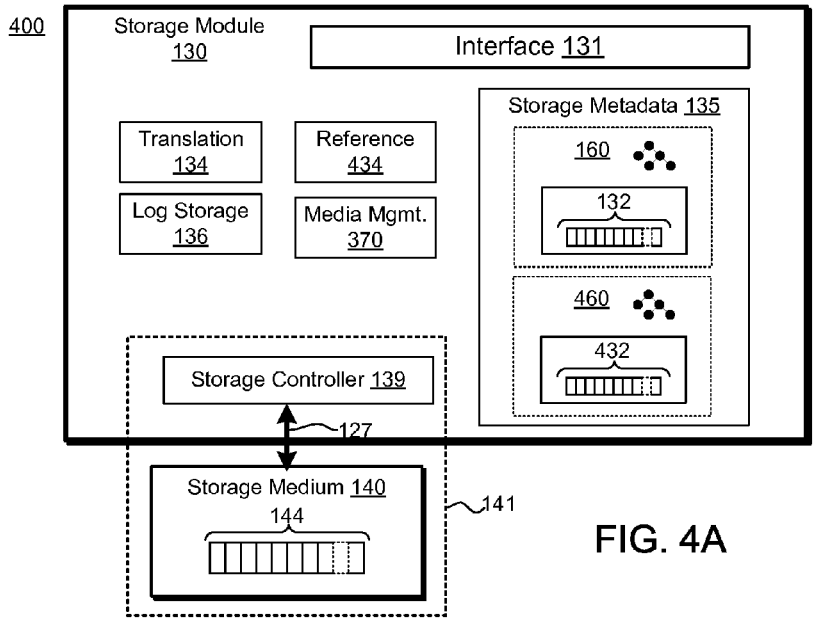
FIG. 4A is a block diagram of another embodiment of a system for open-to-close consistency.

FIG. 4A is a block diagram of another embodiment of a system 400 for efficient open-to-close consistency. The system 400 includes a storage module 130 that is configured to implement range clone operations by use of an intermediate mapping layer. The storage metadata 135 may comprise a forward map 160 pertaining to the logical address space 132. The forward map 160 (and/or other storage metadata 135) may include information pertaining to allocations of the logical address space by the storage clients 106, bindings between LIDs and storage addresses within the storage address space 144, and so on, as disclosed above.

In the FIG. 4A embodiment, the logical interface management module 334 may comprise a reference module 434 configured to manage clone operations by use of a reference map 460. The reference map 460 may comprise reference entries that correspond to data that is being referenced by one or more logical interfaces of the logical address space 132 (e.g., one or more sets of LIDs). The reference module 434 may be configured to remove reference entries that are no longer being used to reference valid data and/or are no longer being referenced by entries within the forward map 160. As illustrated in FIG. 4A, reference entries may be maintained separately from the forward map 160 (e.g., in a separate reference map 460). The reference entries may be identified by use of reference identifiers, which may be maintained in a separate namespace than the logical address space 132. Accordingly, the reference entries may be part of an intermediate, "virtual" or "reference" address space 432 that is separate and distinct from the logical address space 132 that is directly accessible to the storage clients 106 through the storage module interface 131. Alternatively, in some embodiments, reference entries may be assigned LIDs selected from pre-determined ranges and/or portions of the logical address space 132 that are not directly accessible by the storage clients 106.

The logical interface management module 334 may be configured to implement clone operations by linking one or more LID entries in the forward map 160 to reference entries in the reference map 460. The reference entries may be bound to the storage address(es) of the cloned data. Accordingly, LIDs that are associated with cloned data may reference the underlying data indirectly through the reference map 460 (e.g., the LID(s) may map to reference entries which, in turn, map to storage addresses). Accordingly, entries in the forward map 160 corresponding to cloned data may be referred to as "indirect entries." As used herein, an "indirect entry" refers to an entry in the forward map 160 that references and/or is linked to a reference entry in the reference map 460. Indirect entries may be assigned a LID within the logical address space 132, and may be accessible to the storage clients 106.

As disclosed above, after cloning a particular set of LIDs, the storage clients 106 may perform storage operations within one or more of the cloned ranges, which may cause the clones to diverge from one another (in accordance with the clone mode). In a "copy-on-write" mode, changes made to a particular clone may not be reflected in the other cloned ranges. In the FIG. 4A embodiment, changes made to a clone may be reflected in "local" entries associated with an indirect entry. As used herein, a "local entry" refers to a portion of an indirect entry that is directly mapped to one or more storage addresses of the storage medium 140. Accordingly, local entries may be configured to reference data that has been changed in a particular clone and/or differs from the contents of other clones. Local entries may, therefore, correspond to data that is unique to a particular clone.

The translation module 134 may be configured to access data associated with cloned data by use of, inter alia, the reference map 460 and/or reference module 434. The translation module 134 may implement a cascade lookup, which may comprise traversing local entries first and, if the target front-identifier(s) are not found within local entries, continuing the traversal within the reference entries to which the indirect entry is linked.

The log storage module 136 and media management module 370 may be configured to manage the contextual format of cloned data. In the FIG. 4A embodiment, cloned data (data that is referenced by two or more LID ranges within the forward map 160) may be stored in a contextual format that associates the data with one or more reference entries of the reference map 460. The persistent metadata stored with such cloned data segments may correspond to a single reference entry, as opposed to identifying each LID associated with the data segment. Creating a clone may, therefore, comprise updating the contextual format of the cloned data in one or more background operations by use of, inter alia, the media management module 370, as disclosed above.

Figure 4B:
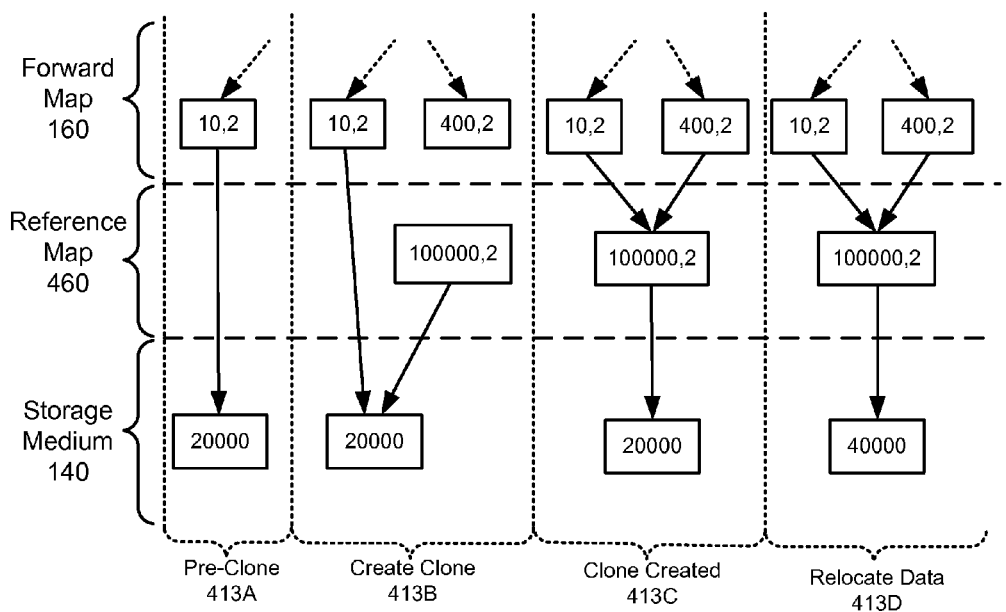
FIG. 4B depicts embodiments of range clone operations implemented by use of a reference map.

FIG. 4B depicts one embodiment of a clone operation using a reference map 460. In state 413A, an entry corresponding to LID 10 extent 2 in the logical address space 132 (denoted 10,2 in FIG. 4B) may directly reference data at storage address 20000 on the storage medium 140. Other entries are omitted from FIG. 4B to avoid obscuring the details of the disclosed embodiment. In state 413B, the storage module 130 implements an operation to clone the range 10,2. Cloning the range 10,2 may comprise: a) allocating a new range of LIDs (denoted 400,2 in FIG. 4B) in the logical address space 132 and b) allocating reference entries in the reference map 460 through which the entries 10,2 and 400,2 may reference the cloned data at storage address 20000 (denoted 100000,2 in FIG. 4B). The clone operation may further comprise associating the entries 10,2 and 400,2 with the reference entry 100000,2 as illustrated at state 413C. As disclosed above, associating the entries 10,2 and 400,2 with the reference entry 100000,2 may comprise indicating that the entries 10,2 and 400,2 are indirect entries. State 413C may further comprise storing a persistent note 366 on the storage medium 140 to associate the data at storage address 20000 with the reference entry 100000,2 and/or to associate the entries 10,2 and 400,2 with the reference entry 100000,2 in the reference map 460.

The storage module 130 may provide access to the data segment at storage address 20000 through either LID 10 or 400 (through the reference entry 100000,2). In response to a request pertaining to LID 10 or 400, the translation module 134 may determine that the corresponding entry in the forward map 160 is an indirect entry that is associated with an entry in the reference map 460. In response, the reference module 434 performs a cascade to determine the storage address by use of local entries within the forward map 160 (if any) and the corresponding reference entries in the reference map 460 (e.g., reference entry 100000,2).

Creating the clone at step 413C may comprise modifying the logical interface of the data segment stored at step 20000 to associate the data with both LID ranges 10,2 and 400,2. The contextual format of the data, however, may only associate the data with LIDs 10,2. As disclosed above, creating the clone may further comprise storing a persistent note 366 on the storage medium 140 to associate the data segment with the LIDs 10,2 and 400,2 through the reference entry 100000,2. The data segment may be rewritten in an updated contextual format in one or more background operations performed by the media management module 370. The data may be stored with persistent metadata 314 that associates the data segment with the reference entry 100000,2 as opposed to the separate LID ranges 10,2 and 400,2. Therefore, relocating the data segment (as shown in state 413D) may only require updating a single entry in the reference map 460 as opposed to multiple entries corresponding to each LID range that references the data (e.g., multiple entries 10,2 and 400,2). Moreover, any number of LID ranges in the forward map 160 may reference the data segment, without increasing the size of the persistent metadata 314 associated with the data on the storage medium 140 and/or complicating the operation of the media management module 370.

Figure 4C:
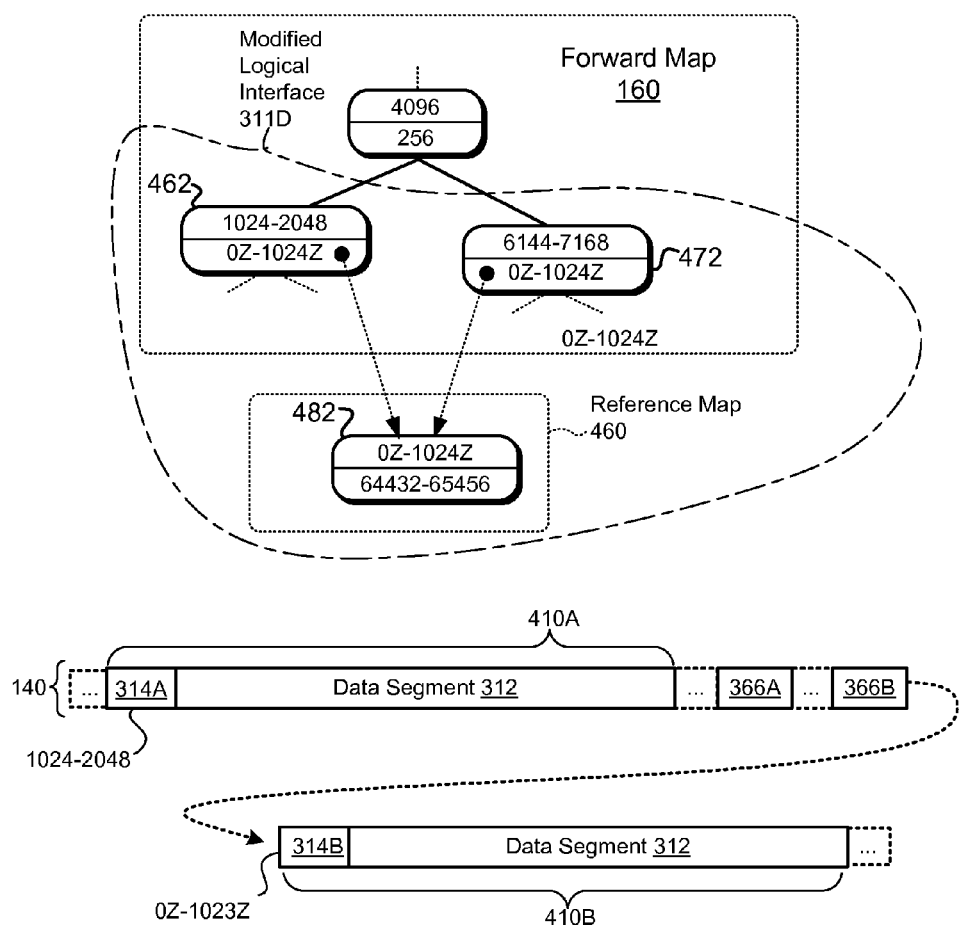
FIG. 4C depicts further embodiments of range clone operations implemented by use of a reference map.

FIG. 4C depicts another embodiment of a clone operation implemented using reference entries. In response to a request to create a clone of the LIDs 1024-2048 and/or data segment 312, the logical interface management module 334 may be configured to allocate a reference entry 482 in the reference map 460 to represent the data segment 312. Any number of LID(s) in the forward map 160 may reference the data through the reference entry 482, without increasing the overhead of the persistent metadata associated with the data segment 312 and/or complicating the operation of the media management module 370. As depicted in FIG. 4C, the reference entry 482 may be bound to the storage addresses of the data segment 312 (storage addresses 64432-65456). The entries 462 and 472 in the forward map 160 may reference the storage addresses indirectly, through the reference entry 482 (e.g., may be linked to the reference entry 482 as illustrated in FIG. 4C).

In the FIG. 4C embodiment, the reference entry 482 is assigned identifiers 0Z-1024Z. The identifier(s) of the reference entry 482 may correspond to a particular portion of the logical address space 132 or may correspond to a different, separate namespace. The storage module 130 may link the entries 462 and 472 to the reference entry 482 by use of, inter alia, metadata associated with the entries 462 and/or 472. Alternatively, or in addition, the indirect entries 462 and/or 472 may replace storage address metadata with references and/or links to the reference entry 482. The reference entry 482 may not be directly accessible by storage clients 106 via the storage module 130.

The clone operation may further comprise modifying the logical interface 311D of the data segment 312; the modified logical interface 311D may allow the data segment 312 to be referenced through the LIDs 1024-2048 of the indirect entry 462 and/or 6144-7168 of the indirect entry 472. Although the reference entry 482 may not be accessible to the storage clients 106, the reference entry 482 may be used to access the data by the translation module 134 (through the indirect entries 462 and 472), and as such, may be considered to be part of the modified logical interface 311B of the data segment 312.

The clone operation may further comprise storing a persistent note 366A on the storage medium 140. As disclosed above, storage of the persistent note(s) 366A and/or 366B may ensure that the clone operation is persistent and crash safe. The persistent note 366A may be configured to identify the reference entry 482 associated with the data segment 312. Accordingly, the persistent note 366A may associate the storage addresses 64432-65456 with the reference entry identifier(s) 0Z-1024Z. The clone operation may further comprise storing another persistent note 366B configured to associate the LIDs of the entries 462 and/or 472 with the reference entry 482. Alternatively, metadata pertaining to the association between entries 462, 472, and 482 may be included in a single persistent note. The persistent notes 366A and/or 366B may be retained on the storage medium 140 until the data segment 312 is relocated in an updated contextual format and/or the forward map 160 (and/or reference map 460) is persisted.

The modified logical interface 311D of the data segment 312 may be inconsistent with the contextual format original data packet 410A; the persistent metadata 314A may reference LIDs 1024-2048 rather than the reference entry 482 and/or the cloned entry 472. The storage module 130 may be configured to store the data segment 312 in an updated contextual format (packet 410B) that is consistent with the modified logical interface 311D; the persistent metadata 314B may associate the data segment 312 with the reference entry 482, as opposed to separately identifying the LID(s) within each cloned range (e.g., entries 462 and 472). Accordingly, the use of the indirect entry 482 allows the logical interface 311D of the data segment 312 to comprise any number of LIDs, independent of size limitations of the persistent metadata 314A-B. Moreover, additional clones of the reference entry 482 may be made without updating the contextual format of the data segment 312; such updates may be made by associating the new LID ranges with the reference entry 482 in the forward map 160 and/or by use of, inter alia, persistent notes 366.

As disclosed above, the indirect entries 462 and/or 472 may initially reference the data segment 312 through the reference entry 482. Storage operations performed subsequent to the clone operation may be reflected by use of local entries within the forward map 160. After completion of the clone operation, the storage module 130 may modify data associated with one or more of the cloned LID(s). In the FIG. 4D embodiment, a storage client 106 modifies and/or overwrites data corresponding to LIDs 1024-1052 of the indirect entry 462, which may comprise appending a new data segment 412 to the storage log (in data packet 420 at storage addresses 7823-7851).

The data segment 412 may be stored in a contextual format (data packet 420) comprising persistent metadata 414A configured to associate the data segment 412 with LIDs 1024-1052. The storage module 130 may be configured to associate the data segment 412 with the LIDs 1024-1052 in a local entry 465. The local entry 465 may reference the updated data directly, as opposed to referencing the data through the indirect entry 462 and/or reference entry 482.

In response to a request pertaining to data 1024-1052 (or subset thereof), the logical interface management module 334 may search for references to the requested LIDs in a cascade lookup operation, which may comprise searching for references to local entries (if available) followed by the reference entries. In the FIG. 4D embodiment, the local entry 465 may be used to satisfy requests pertaining to the LID range 1024-1052 (storage addresses 7823-7851) rather than 64432-64460 per the reference entry 462. Requests for LIDs that are not found in a local entry (e.g., LIDs 1053-2048) may continue to be serviced through the reference entry 482. The logical interface 311E of the data pertaining to the range 1024-2048 may, therefore, comprise one or more local entries 465, one or more indirect entries 462, and/or one or more reference entries 482.

Figure 4D:
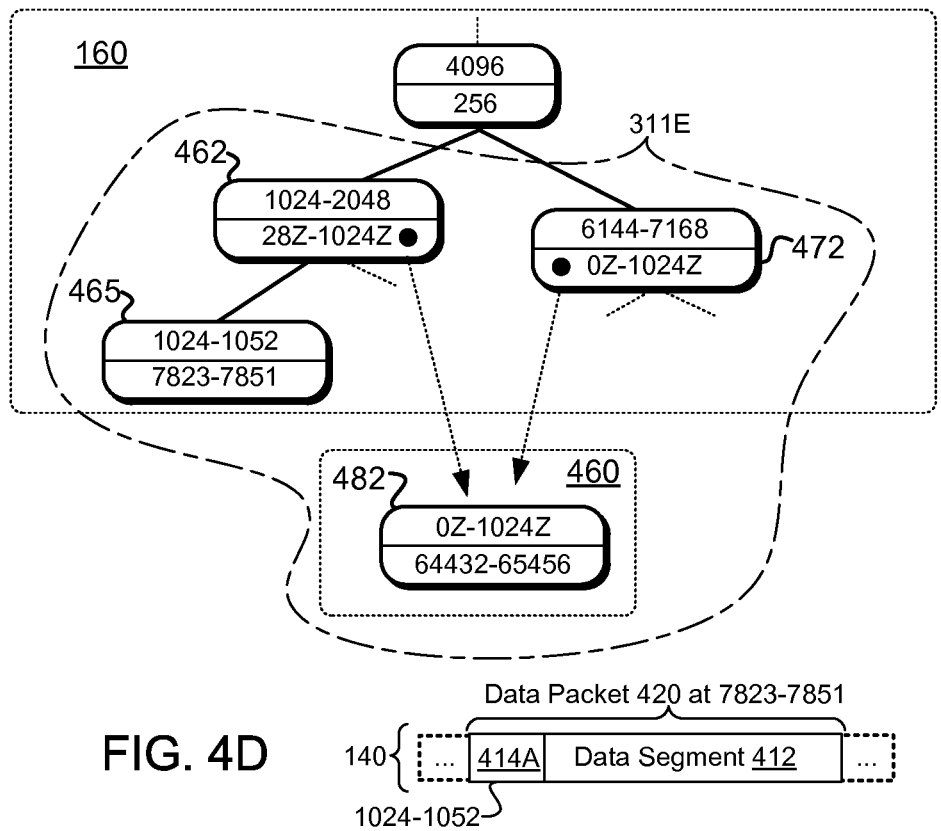
FIG. 4D depicts further embodiments of range clone operations implemented by use of a reference map.
Figure 4E:
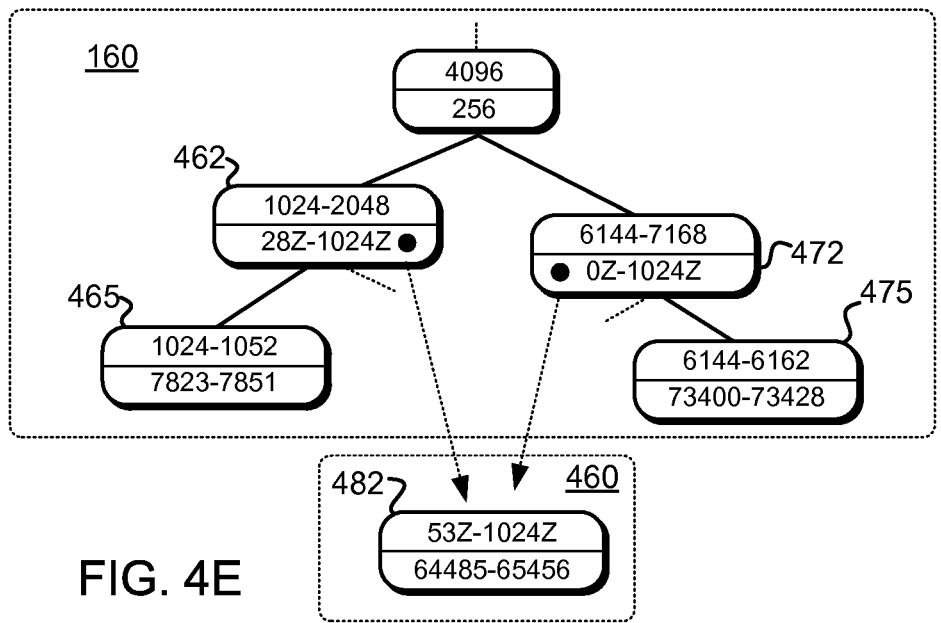
FIG. 4E depicts further embodiments of range clone operations implemented by use of a reference map.

In a further embodiment, illustrated in FIG. 4E, a storage module 130 may modify data of the clone through another one of the LIDs of the logical interface 311E (e.g., LIDs 6144-6162); the logical interface delimiters are not shown in FIG. 4E to avoid obscuring the details of the illustrated embodiment. The modified data may be referenced using a local entry 475, as disclosed above. In the FIG. 4E embodiment, each of the ranges 462 and 472 has its own, respective local version of the data formerly referenced through identifiers 0Z-52Z of the reference entry 482. As such, neither entry 462 nor 472 includes a reference to the range 0Z-52Z. The reference module 434 may determine that the corresponding data (and reference identifiers) is no longer being referenced, and as such, may be marked for removal from the storage medium 140 (e.g., invalidated). As depicted in FIG. 4E, invalidating the data may comprise removing references to the data from the reference map 460 by, inter alia, modifying the reference entry 482 to remove the range 0Z-52Z. Invalidating the data may further comprise updating other storage metadata 135, such as a reverse map, validity bitmaps, and/or the like (e.g., to indicate that the data stored at storage addresses 64432-64484 does not need to be retained). The ranges of entries 462 and 472 may continue to diverge, until neither references any portion of the reference entry 482, at which point the reference entry 482 may be removed and the data referenced thereby may be invalidated, as disclosed above.

Although FIGS. 4D and 4E depict local entries 465 and 475 that comprise overlapping LID ranges with the corresponding indirect entries 462 and 472, the disclosure is not limited in this regard. In some embodiments, the storage operation of FIG. 4D may be reflected by creating the local entry 465 and modifying the indirect entry 462 to reference only the LIDs 1053-2048. Similarly, the operation of FIG. 4E may comprise creating the local entry 475 and modifying the indirect entry 472 to reference a truncated LID range 6163-7168.

Referring back to FIG. 4A, the reference module 434 may be configured to manage or "groom" the reference map 460.

In some embodiments, each entry in the reference map 460 comprises metadata that includes a reference count. The reference count may be incremented as new references or links to the reference entry are added, and may be decremented in response to removing references to the entry. In some embodiments, reference counts may be maintained for each reference identifier in the reference map 460. Alternatively, reference counts may be maintained for reference entries as a whole. When the reference count of a reference entry reaches 0, the reference entry (and/or a portion thereof) may be removed from the reference map 460. Removing a reference entry (or portion of a reference entry) may comprise invalidating the corresponding data on the storage medium 140, as disclosed herein (indicating that the data no longer needs to be retained).

In another embodiment, the reference module 434 may remove reference entries using a "mark-and-sweep" approach. The reference module 434 (or other process, such as the translation module 134) may periodically check references to entries in the reference map 460 by, inter alia, following links to the reference entries from indirect entries (or other types of entries) in the forward map 160. Reference entries that are not accessed during the mark-and-sweep may be removed, as disclosed above. The mark-and-sweep may operate as a background process, and may periodically perform a mark-and-sweep operation to identify and remove reference entries that are no longer in use.

In some embodiments, the reference map 460 disclosed herein may be created on demand (e.g., in response to creation of a clone, or other indirect data reference). In other embodiments, all data storage operations may be performed through intermediate mappings. In such embodiments, storage clients 106 may allocate indirect, virtual identifiers (VIDs) of a virtual address space (VAS), which may be linked to and/or reference storage addresses through an intermediate mapping layer, such as the logical address space 132. The VAS may add an intermediate mapping layer between storage clients 106 and the storage medium 140. Storage clients 106 may reference data using VIDs of a virtualized address space that map to logical identifiers of the logical address space 132, and which, in turn, are associated with storage addresses on respective storage device(s) 141 and/or storage medium 140. As used herein, a VAS may include, but is not limited to, a LUN address space, a virtual LUN (vLUN) address space, and/or the like.

Figure 5A:
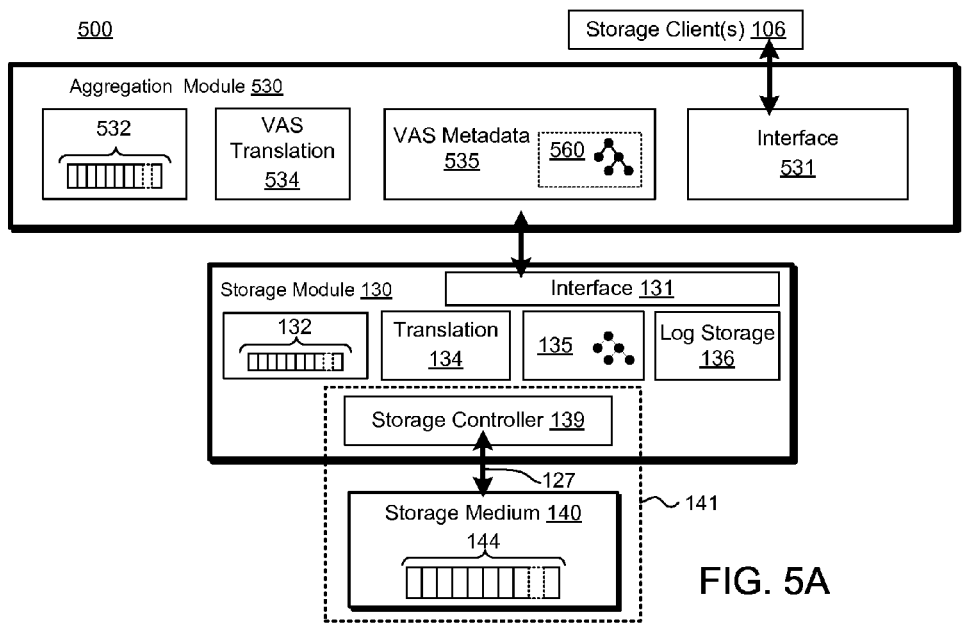
FIG. 5A is a block diagram of one embodiment of a system comprising an aggregation module.

FIG. 5A depicts one embodiment of an aggregation module 530 configured to implement, inter alia, efficient range clone operations using a virtualized address space 532. The aggregation module 530 may comprise software and/or hardware components including, but not limited to, one or more drivers and/or other software modules operating on the computing system 100, such as one or more drivers, storage drivers, I/O drivers, filter drivers, services, kernel-level modules, user-level modules, libraries, and/or the like; hardware components, such as hardware controllers, communication interfaces, and/or the like; and so on.

The aggregation module 530 may be configured to present a VAS 532 to the storage clients 106 through an interface 531. Like the interface 131 disclosed herein, the interface 531 may comprise one or more of a block device interface, virtual storage interface, cache interface, and/or the like. Storage clients 106 may perform storage operations pertaining to storage resources managed by the aggregation module 530 by reference to VIDs of the VAS 532 through the interface 531.

The aggregation module 530 may further comprise a VAS translation module 534 configured to map VIDs to storage resources through one or more intermediary storage modules (e.g., storage module 130). Accordingly, the VAS metadata 535 of the aggregation module 530 may include a VAS forward map 560 comprising any-to-any mappings between VIDs of the VAS 532 and LIDs of the VAS 532. Although not depicted in FIG. 5A, the VAS translation module 534 and/or VAS forward map 560 may be configured to aggregate a plurality of logical address spaces 132 of a plurality of different storage modules 130 into a single VAS 532. Accordingly, in some embodiments, a VAS 532 may correspond to a plurality of different logical address spaces 132, each comprising a separate set of LIDs, and each corresponding to a respective storage module 130, storage device 141, and/or storage medium 140.

Although FIG. 5A depicts the aggregation module 530 separately from the storage module 130, the disclosure is not limited in this regard. In some embodiments, VAS 532, VAS forward map 560, VAS translation module 534, and/or other modules of the aggregation module 530 may be implemented as part of the storage module 130.

The aggregation module 530 may be configured to leverage the intermediary virtual address space provided by the VAS 532 to, inter alia, implement efficient range clone, move, merge, and/or other high-level operations. Alternatively, or in addition, the intermediary mapping layer(s) may be leveraged to enable efficient clone operations on random access, write-in-place storage devices, such as hard disks and/or the like.

Storage clients 106 may perform storage operations in reference to VIDs of the VAS 532. Accordingly, storage operations may comprise two (or more) translation layers. The VAS forward map 560 may comprise a first translation layer between VIDs of the VAS 532 and identifiers of the logical address space 132 of the storage module 130. The forward map 160 of the storage module 130 may implement a second translation layer between LIDs and storage address(es) on the storage medium 140.

The aggregation module 530 may be configured to manage allocations within the VAS 532 by use of, inter alia, the VAS metadata 535, VAS forward map 560, and/or VAS translation module 534. In some embodiments, allocating a VID in the VAS 532 may comprise allocating one or more corresponding LIDs in the logical address space 132 (and/or identifiers of one or more other storage modules). Accordingly, each VID allocated in the VAS 532 may correspond to one or more LIDs of the logical address space 132. The any-to-any mappings between the VIDs of the aggregation module 530 and the logical address space 132 may be sparse and/or any-to-any, as disclosed herein. Moreover, in some embodiments, the aggregation module 530 may be configured to maintain any-to-any and/or range managed mappings between VIDs and a plurality of different logical address spaces 132. Accordingly, the aggregation module 530 may aggregate and/or combine the logical address spaces 132 of a plurality of different storage devices 141 managed by different respective storage modules 130 into a single, aggregate VAS 532.

In the FIG. 5A embodiment, the logical address space 132 may not be directly accessible, and as such, storage clients 106 may reference storage resources using VIDs through the interface 531. Therefore, performing a storage operation through the aggregation module 530 in reference to one or more VIDs may comprise: a) identifying the storage module 130 corresponding to the VIDs, b) determining the LID(s) of the storage module 130 that are mapped to the VIDs by use of the VAS translation module 534 and/or VAS forward map 560; and c) implementing the storage operation by use of the storage module 130 in reference to the determined LID(s).

Figure 5B:
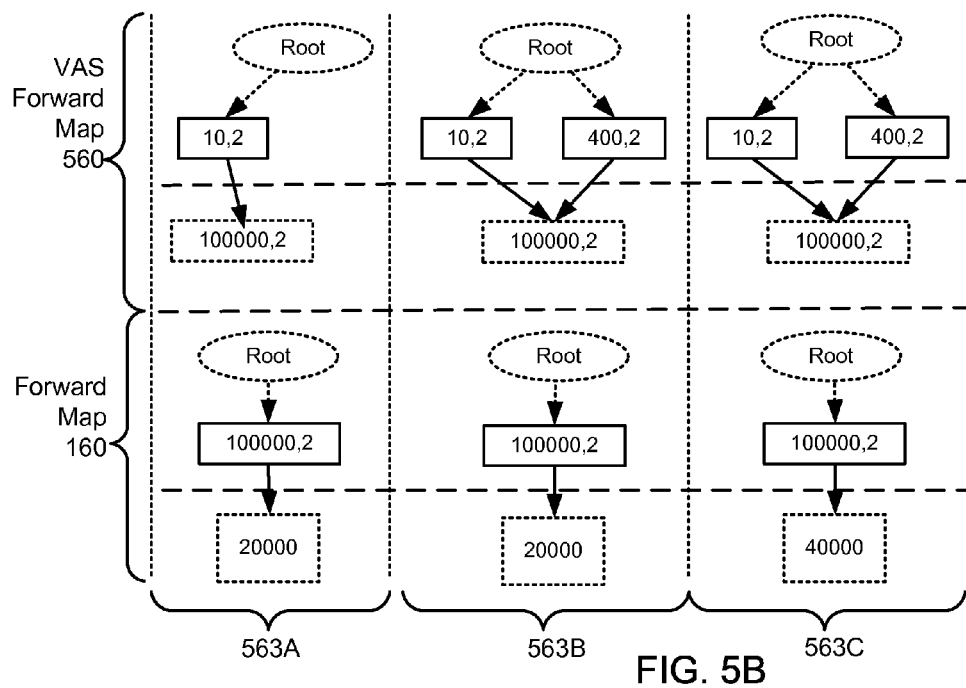
FIG. 5B depicts embodiments of range clone operations implemented by use of an aggregation module.

FIG. 5B depicts one embodiment of a clone operation implemented by use of the aggregation module 530. As disclosed above, the VAS forward map 560 may correspond to a VAS 532 that is indirectly mapped to storage addresses through a logical address space 132 of a storage module 130. FIG. 5B illustrates the addressing layers used to implement storage operations through the aggregation module 530. The VIDs of the VAS 532 may comprise the top-level addressing layer that is accessible to storage clients 106 through, inter alia, the interface 531 of the aggregation module 530. The logical address space 132 of the storage module 130 may comprise an intermediary addressing layer. The VAS forward map 560 may comprise any-to-any mappings between VIDs and LIDs. The LIDs may be mapped to storage addresses within the storage address space 144 by use of the forward map 160. Accordingly, VIDs may be mapped to the storage address space 144 through the intermediate logical address space of the storage module 130.

As illustrated in FIG. 5B, in state 563A, the VAS forward map 560 may comprise an entry 10,2 that represents two VIDs (10 and 11) in the VAS 532. The VAS forward map 560 associates the VID entry 10,2 with LIDs of the logical address space 132. In the FIG. 5B embodiment, the VAS forward map 560 binds the VID entry 10,2 to LIDs 100000 and 100001 (entry 100000,2). The entry 10,2 may be allocated to a particular storage client 106, which may perform storage operations in reference to the VIDs. In state 563A, the storage module 130 may be configured to map the entry 100000,2 to one or more storage addresses on the storage medium 140 (storage address 20000).

In state 536B, the aggregation module 530 may implement a clone operation to clone the VID entry 10,2. The clone operation may comprise: a) allocating a new VID entry 400,2 and b) associating the new VID entry 400,2 with the corresponding entry 100000,2 in the VAS forward map 560. The corresponding entry 100000,2 in the forward map 160 may remain unchanged. Alternatively, a reference count (or other indicator) of the entry 100000,2 in the forward map 160 may be updated to indicate that the entry is being referenced by multiple VID ranges. The contextual format of the data stored at storage address 20000 may be left unchanged (e.g., continue to associate the data with the logical interface 100000,2). The clone operation may further comprise storing a persistent note 366 on the storage medium 140 to indicate the association between the VID entry 400,2 and the entry 100000,2 in the forward map 160. Alternatively, or in addition, the clone operation may be made persistent and/or crash safe by persisting the VAS forward map 560 (and/or portions thereof).

In state 536C, the data at storage address 20000 may be relocated to storage address 40000. The relocation may occur in a standard storage media maintenance operation, and not to update the contextual format of the cloned data. Relocating the data may comprise updating a single entry in the forward map 160. The VAS forward map 560 may remain unchanged. Modifications to the different versions of the VID ranges 10,2 and 400,2 may be managed through the intermediary, logical address space 132. A modification to VID 10 may comprise: a) allocating a new LID in the logical address space 132, b) storing the modified data in association with the new LID, and c) mapping the new LID to VID 10 in the VAS forward map 560.

The embodiments for implementing range clone, move, and/or merge operations disclosed herein may be used to efficiently implement other, higher-level storage operations, such as snapshots, deduplication, atomic operations, transactions, file-system management functionality, and/or the like. Referring back to FIG. 4A, the storage module 130 may comprise a deduplication module 374 configured to identify duplicate data on the storage medium 140. Duplicate data may be identified using any suitable mechanism. In some embodiments, duplicate data is identified by: a) scanning the contents of the storage medium 140, b) generating signature values for various data segments, and c) comparing data signature values to identify duplicate data. The signature values may include, but are not limited to, cryptographic signatures, hash codes, cyclic codes, and/or the like. Signature information may be stored within storage metadata 135, such as the forward map 160 (e.g., in metadata associated with the entries), and/or may be maintained and/or indexed in one or more separate data structures of the storage metadata 135. The deduplication module 374 may compare data signatures and, upon detecting a signature match, may perform one or more deduplication operations. The deduplication operations may comprise verifying the signature match (e.g., performing a byte-by-byte data comparison) and performing one or more range clone operations to reference the duplicate data through two or more LID ranges.

Figure 6:
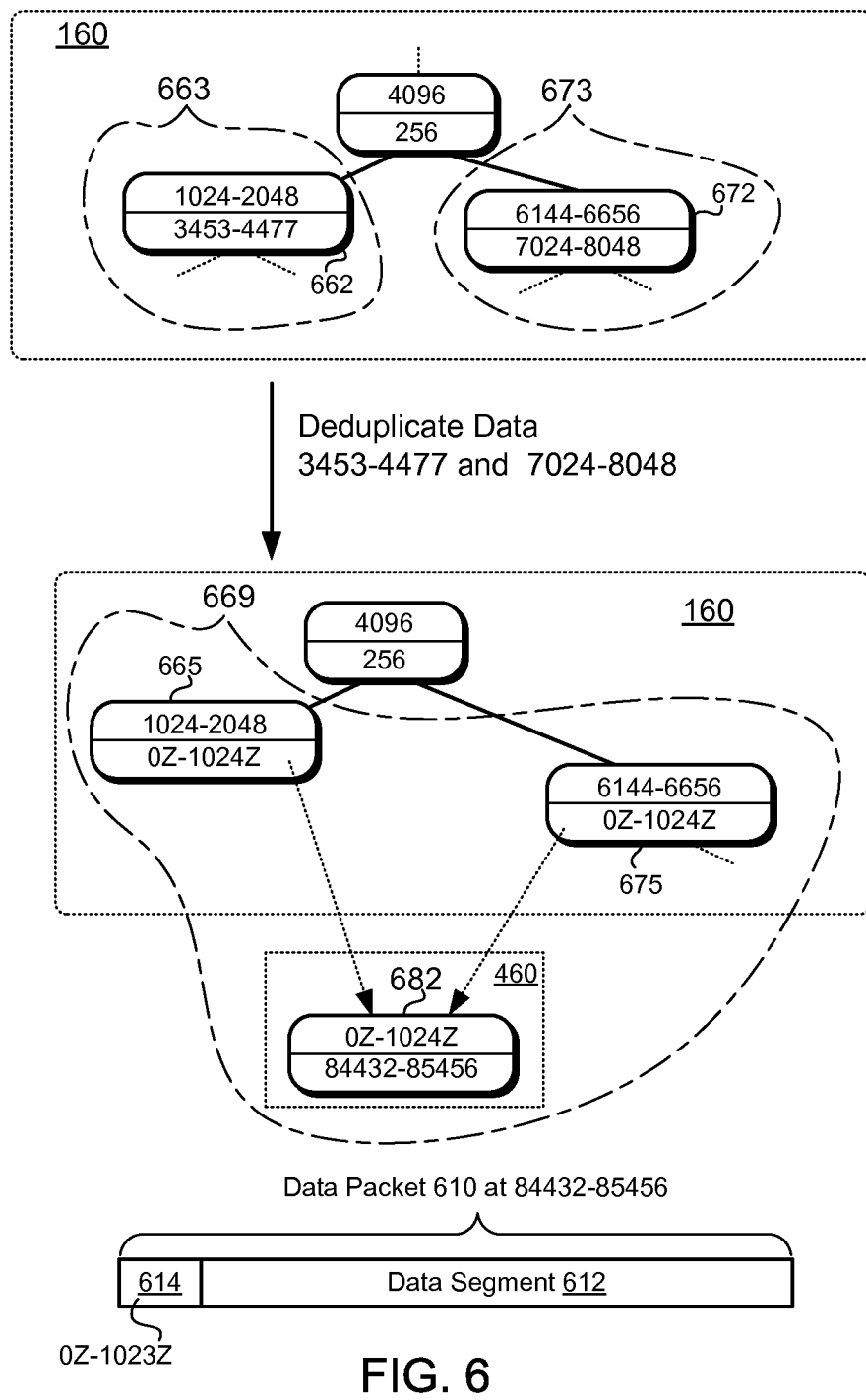
FIG. 6 depicts embodiments of deduplication operations.

FIG. 6 depicts one embodiment of a deduplication operation. The forward map 160 may comprise entries 662 and 672, which may reference duplicated data stored at different respective storage addresses 3453-4477 and 7024-8048. The entries 662 and 672 may correspond to different, respective logical interfaces 663 and 673 corresponding to LIDs 1024-2048 and 6144-6656, respectively. The duplicated data segment (data segment 612) may be identified and/or verified by the deduplication module 374, as disclosed above. Alternatively, the duplicated data may be identified as data is received for storage at the storage module 130. Accordingly, the data may be deduplicated before an additional copy of the data is stored on the storage medium 140.

In response to identifying and/or verifying that the entries 662 and 672 reference duplicate data, the storage module 130 may be configured to deduplicate the data, which may comprise creating one or more range clones to reference a single copy of the duplicate data through two different sets of LIDs. As disclosed above, creating a range clone may comprise modifying the logical interface(s) 663 and 673 of a data segment. In the FIG. 6 embodiment, the duplicated data is stored as a data segment 612 within a packet 610 at storage locations 3453-4477 and 7024-8048, respectively. The clone operation may comprise modifying the logical interface of one of the data segments (or a new version and/or copy of the data segment), such that the data segment can be referenced by both entries 663 and 673.

The range clone operation may be implemented using any of the clone embodiments disclosed herein including the range clone embodiments of FIGS. 3A-E, the reference entry embodiments of FIGS. 4A-E, and/or the intermediate mapping embodiments of FIGS. 5A-B. In the de-deduplication embodiment of FIG. 6, both LID ranges 1024-2048 and 6144-7168 may be modified to reference a single version of the data segment 612 (the other data segment may be invalidated) through a reference entry 682. As such, the deduplication operation may comprise creating a reference entry 682 to represent the deduplicated data segment 612 (reference the packet 610). The deduplication operation may further comprise modifying and/or converting the entries 662 and 672 into respective indirect entries 665 and 675, which may be mapped to the data segment 612 through the reference entry 682, as disclosed above. The deduplication operations may further comprise modifying the logical interface 669 of the data segment 612 to associate the data segment 612 with both sets of LIDs 1024-2048 and 6144-7168 (as well as the reference entry 682). The deduplication operations may further comprise storing a persistent note 366 on the storage medium 140, as disclosed above.

The deduplication operation may further comprise updating the contextual format of the data segment 612 to be consistent with the modified logical interface 669, as disclosed above. Updating the contextual format may comprise appending the data segment 612 in an updated contextual format (data packet 610) to the storage log (e.g., at storage locations 84432-85456) in one or more background operations. The updated data packet 610 may comprise persistent metadata 614 that associates the data segment 612 with the updated logical interface 669 (e.g., LIDs 1024-2048 and 6144-6656 through reference identifiers 0Z-1023Z).

Although FIG. 6 illustrates cloning and/or deduplicating a single entry or range of LIDs, the disclosure is not limited in this regard. In some embodiments, a plurality of front-identifier ranges may be cloned in a single clone operation. This type of clone operation may be used to create a "snapshot" of an address range (or entire logical address space 132). As used herein, a snapshot refers to the state of a storage device (or set of LIDs) at a particular point in time. The snapshot may maintain an "original" state of a LID range regardless of changes that occur within the range after completing the snapshot operation.

Figure 7:
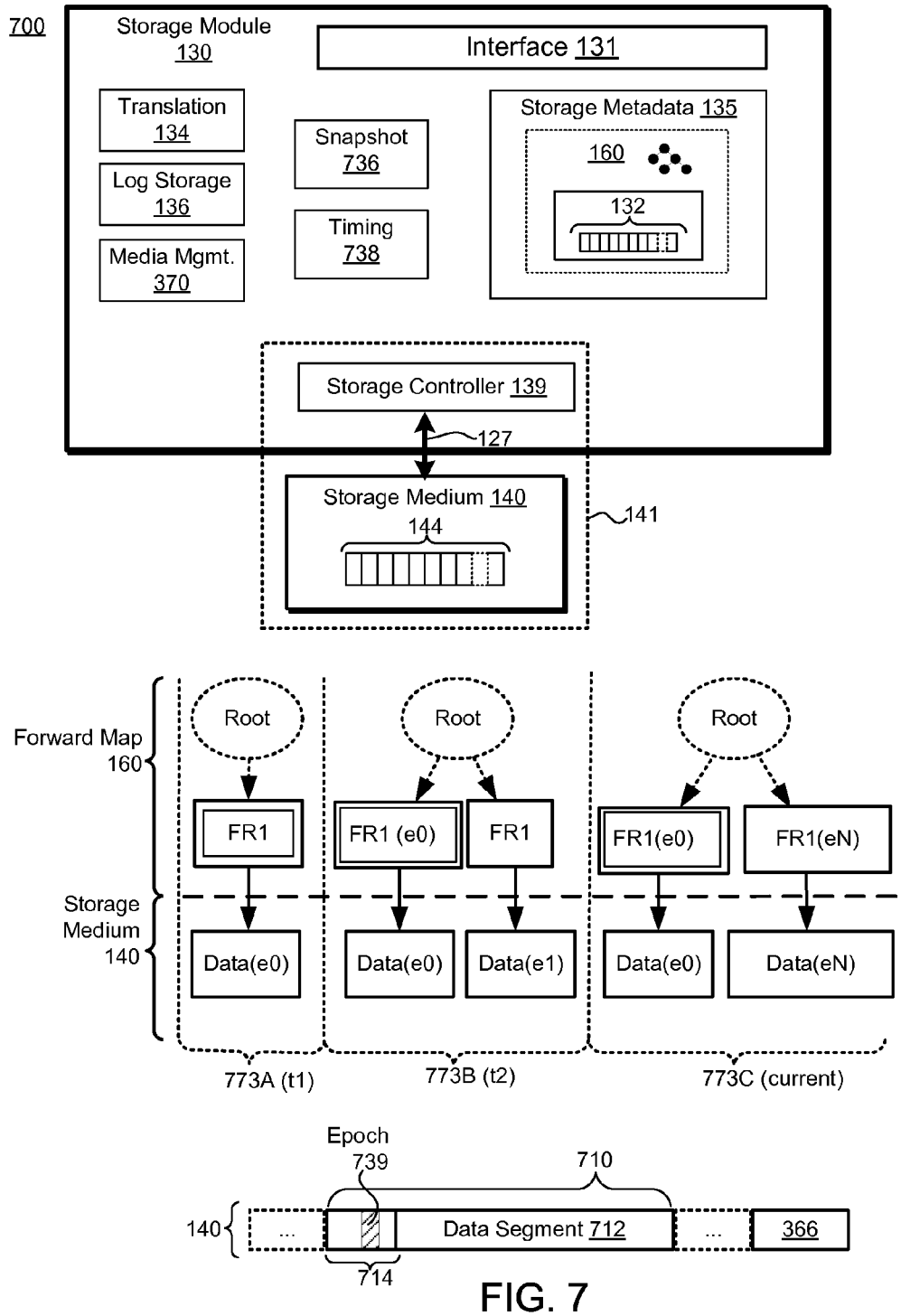
FIG. 7 is a block diagram depicting one embodiment of a system comprising a storage module configured to efficiently implement snapshot operations.

FIG. 7 is a block diagram depicting one embodiment of a system 700 comprising a storage module 130 configured to efficiently implement snapshot operations. The FIG. 7 embodiment pertains to an address range within a logical address space 132. The disclosure is not limited in this regard, however, and could be adapted for use with other types of address ranges, such as ranges and/or extents within a VAS 532, as disclosed above. The storage module 130 may comprise a snapshot module 736 and timing module 738 configured to implement snapshot operations as disclosed herein.

In state 773A, the storage module 130 may be configured to create a snapshot of a LID range FR1. Creating the snapshot may comprise preserving the state of the LID range FR1 at a particular time. The snapshot operation may further comprise preserving the LID range FR1 while allowing subsequent storage operations to be performed within the LID range.

As disclosed above, the storage module 130 may be configured to store data in a storage log on the storage medium 140 by use of, inter alia, the log storage module 136. The log order of storage operations may be determined using sequence information associated with data packets, such as sequence indicators 113 on storage divisions 170A-N and/or sequential storage locations within the storage address space 144 of the storage medium 144 (as disclosed in conjunction with FIGS. 1D and 1E).

The storage module 130 may be further configured to maintain other types of ordering and/or timing information, such as the relative time ordering of data in the log. However, in some embodiments, the log order of data may not accurately reflect timing information due to, inter alia, data being relocated within the storage device in media management operations. Relocating data may comprise reading the data from its original storage location on the storage medium 140 and appending the data at a current append point within the storage log. As such, older, relocated data may be stored with newer, current data in the storage log. Therefore, although the storage log may preserve the relative log order of data operations pertaining to particular LIDs, the storage log may not accurately reflect absolute timing information.

In some embodiments, the log storage module 136 is configured to associate data with timing information, which may be used to establish relative timing information of the storage operations performed on the storage medium 130. In some embodiments, the timing information may comprise respective timestamps (maintained by the timing module 738), which may be applied to each data packet stored on the storage medium 140. The timestamps may be stored within persistent metadata 314 of the data packets 310. Alternatively, or in addition, the timing module 738 may be configured to track timing information at a coarser level of granularity. In some embodiments, the timing module 738 maintains one or more global timing indicators (an epoch identifier). As used herein, an "epoch identifier" refers to an identifier used to determine relative timing of storage operations performed through the storage module 130. The log storage module 136 may be configured to include an epoch indicator 739 in data packets 710. The epoch indicator 739 may correspond to the current epoch (e.g., global timing indicator) maintained by the timing module 738. The epoch indicator 739 may correspond to the epoch in which the corresponding data segment 712 was written to the storage log. The epoch indicator 739 may be stored within the persistent metadata 714 of the packet 710, and as such, may remain associated with the data packet 710 during relocation operations. The timing module 738 may be configured to increment the global epoch identifier in response to certain events, such as the creation of a new snapshot, a user request, and/or the like. The epoch indicator 739 of the data segment 712 may remain unchanged through relocation and/or other media maintenance operations. Accordingly, the epoch indicator 739 may correspond to the original storage time of the data segment 712 independent of the relative position of the data packet 710 in the storage log.

A snapshot operation may comprise preserving the state of a particular LID range (FR1) at a particular time. A snapshot operation may, therefore, comprise preserving data pertaining to FR1 on the storage medium 140. Preserving the data may comprise: a) identifying data pertaining to a particular timeframe (epoch) and b) preserving the identified data on the storage medium 140 (e.g., preventing the identified data being removed from the storage medium 140 in, inter alia, storage recovery operations). Data pertaining to a snapshot may be retained despite being invalidated by subsequent storage operations (e.g., operations that overwrite, modify, TRIM, and/or otherwise obviate the data). Data that needs to be preserved for a particular snapshot may be identified by use of the epoch indicators 739 disclosed above.

In state 773A (time t1, denoted by epoch indicator e0), the storage module 130 may receive a request to implement a snapshot operation. In response to the request, the snapshot module 736 may determine the current value of the epoch identifier maintained by the timing module 738. The current value of the epoch identifier may be referred to as the current "snapshot epoch." In the FIG. 7 embodiment, the snapshot epoch is 0. The snapshot module 736 may be further configured to cause the timing module 738 to increment the current, global epoch indicator (e.g., increment the epoch identifier to 1). Creating the snapshot may further comprise storing a persistent note 366 on the storage medium configured to indicate the current, updated epoch indicator. The persistent note 366 may be further configured to indicate that data pertaining to the snapshot epoch is to be preserved (e.g., identify the particular range of LIDs FR1 to be preserved in the snapshot operation). The persistent note 366 may be used during metadata reconstruction operations to: a) determine the current epoch identifier and/or b) configure the snapshot module 736 and/or media management module 370 to preserve data associated with a particular snapshot epoch (e.g., epoch e0).

The snapshot module 736 may be further configured to instruct the media management module 370 to preserve data associated with the snapshot epoch. In response, the media management module 370 may be configured to: a) identify data to preserve for the snapshot (snapshot data), and b) prevent the identified data from being removed from the storage medium 140 in, inter alia, storage recovery operations. The media management module 370 may identify snapshot data by use of the epoch indicators 739 of the data packets 710. As disclosed in conjunction with FIG. 1E, data may be written out-of-place on the storage medium 140. The most current version of data associated with a particular LID may be determined based on the order of the corresponding data packets 710 within the log. The media management module 370 may be configured to identify the most current version of data within the snapshot epoch as data that needs to be preserved. Data that has been rendered obsolete by other data in the snapshot epoch may be removed. Referring to the FIG. 1E embodiment, if the data X0 and X1 (associated with the same LID A) were both marked with the snapshot epoch 0, the media management module 370 would identify the most current version of the data in epoch 0 as X1, and would mark the data X0 for removal. If, however, data X0 were marked with snapshot epoch 0 and X1 where marked with a later epoch (e.g., epoch 1, after the snapshot operation), the media management module 370 may preserve the data X0 on the storage medium 140 in order to preserve the data of the snapshot.

In state 773B, the snapshot module 738 may be configured to preserve data pertaining to the snapshot FR1 (data associated with epoch e0), while allowing storage operations to continue to be performed during subsequent epochs (e.g., epoch e1). Preserving FR1 may comprise cloning FR1 to preserve the original status of the LID range at epoch e0 (FR1 (e0)), while allowing storage operations to continue with reference to FR1. The clone operation may be implemented as disclosed above using one or more of duplicated entries, reference entries, and/or an intermediate mapping layer. The storage operations may comprise appending data to the storage log on the storage medium 140 in reference to the LIDs FR1. The cloned LIDs corresponding to the snapshot FR1 (e0) may be immutable. Accordingly, the snapshot of FR1 (e0) may be preserved despite changes to the LID range. Data stored in state 773B may be stored with an epoch indicator 739 of the current epoch (e1). The snapshot module 736 may be configured to preserve data that is rendered obsolete and/or invalidated by storage operations performed during epoch e1 (and subsequent epochs). Referring back to the FIG. 1E embodiment, the media management module 370 may identify data X0 as data to preserve for the snapshot FR1 (the data X1 may have been stored after the snapshot operation was performed). The snapshot module 738 and/or media management module 370 may be configured to preserve the data X0 even through the data was subsequently made obsolete by data X1 in epoch e1. The data X0 may be retained even if the LID A is deleted, TRIMed, or the like.

The snapshot of FR1 (e0), including the LID range FR1 (e0) and the data marked with epoch indicator e0, may be preserved until the corresponding snapshot is deleted. The snapshot may be deleted in response to a request received through the interface 131. As indicated in state 773C, the epoch 0 may be retained on the storage medium 140 even after other, intervening epochs (epochs e1-eN) have been created and/or deleted. Deleting the epoch e0 may comprise configuring the snapshot module 738 and/or media management module 370 to remove invalid/obsolete data associated with the epoch e0.

Storage operations performed after creating the snapshot at state 773A may modify the logical address space 132 and specifically the forward map 160. The modifications may comprise updating storage address bindings in response to appending data to the storage medium 140, adding and/or removing LIDs to FR1, and so on. In some embodiments, the snapshot module 736 is configured to preserve the snapshot range FR1 (e0) within separate storage metadata 135, such as a separate region of the logical address space 132, in a separate namespace, in a separate map, and/or the like. Alternatively, the snapshot module 736 may allow the changes to take place in the forward map 160 without preserving the original version of FR1 at time e0. The snapshot module 736 may be configured to reconstruct the forward map 160 for e0 (time t1) using the snapshot data preserved on the storage medium 140. The forward map 160 at time t1 may be reconstructed, as disclosed above, which may comprise sequentially accessing data stored on the storage medium 140 (in a log-order) and creating forward map entries based on persistent metadata 714 associated with the data packets 710. In the FIG. 7 embodiment, forward map 160 corresponding to epoch e0 may be reconstructed by referencing data packets 710 that are marked with the epoch indicator 739 e0 (or lower). Data associated with epoch indicators 739 greater than e0 may be ignored (since such data corresponds to operations after creation of the snapshot FR1 (e0) was created).

Figure 8A:
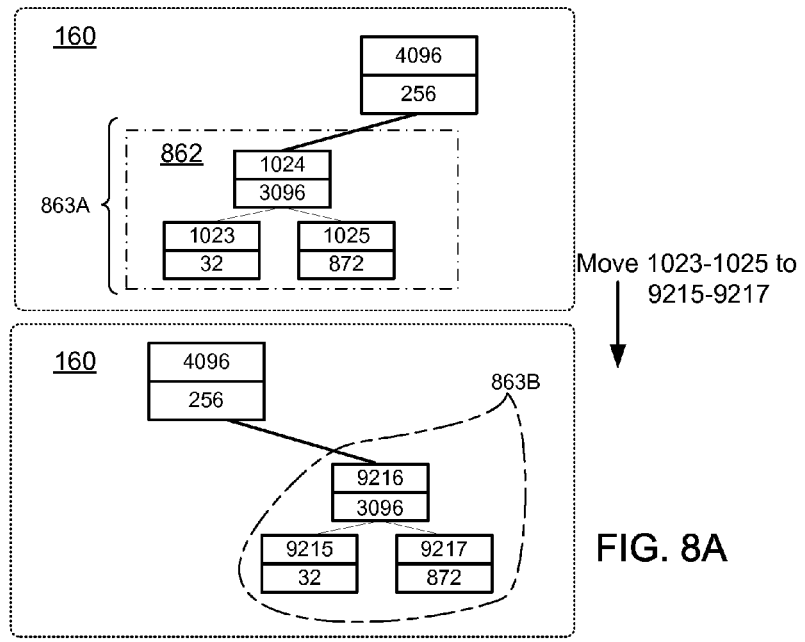

The storage module 130 disclosed herein may be further configured to implement efficient range move operations. FIG. 8A depicts one embodiment of a move operation implemented by the storage module 130 disclosed herein. The forward map 160 includes entries 862 configured to bind LIDs 1023-1025 to respective data segments on the storage medium 140. The entries 862 are depicted separately to better illustrate details of the embodiment; however, the entries 862 could be included in a single entry comprising the full range of LIDs 1023-1025. The entries 862 may define a logical interface 863 of the data stored at storage addresses 32, 3096, and 872. As disclosed above, the data stored at storage addresses 32, 3096, and 872 may be stored in a contextual format that associates the data with the corresponding LID(s) 1023, 1024, and 1025.

The storage module 130 may be configured to move the entries 862 to LIDs 9215-9217 by, inter alia, replacing the association between the LIDs 1023, 1024, and 1025 and the data at the respective media storage locations 32, 3096, and 872 with a new logical interface 863B corresponding to the new set of LIDs (e.g., 9215, 9216, and 9217). The move operation may be performed in response to a request received via the interface 131 and/or as part of a higher-level storage operation (e.g., a request to rename a file, operations to balance and/or defragment the forward map 160, or the like).

The move operation may be implemented in accordance with one or more of the cloning embodiments disclosed above. In some embodiments, the move operation may comprise associating the storage addresses mapped to LIDs 1023, 1024, and 1025 with the destination LIDs 9215, 9216, and 9217, which may result in modifying the logical interface 863A of the data in accordance with the move operation. The move operation may further comprise storing a persistent note 366 on the storage medium 140 to ensure that the move operation is persistent and crash safe. The data stored at storage addresses 32, 872, and 3096 may be rewritten in accordance with the updated logical interface 863B in one or more background operations, as disclosed above.

Figure 8B:
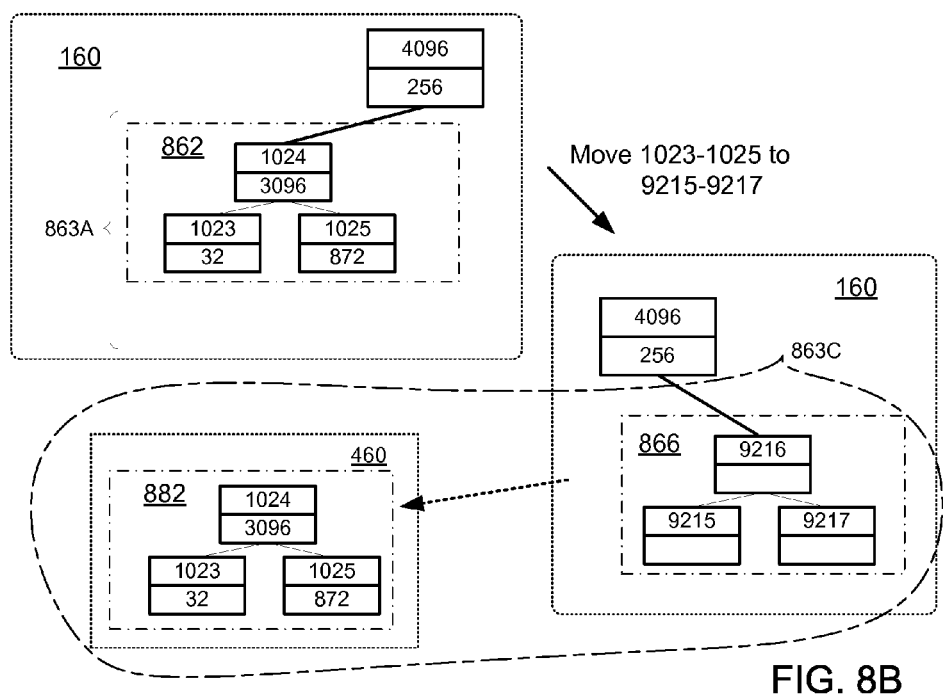

FIG. 8B depicts another embodiment of a move operation. As above, the move operation may comprise moving the data associated with LIDs 1023-1025 to LIDs 9215-9217. The move operation of FIG. 8B may utilize the reference entries as disclosed in conjunction with FIGS. 4A-E. Accordingly, the move operation may comprise creating reference entries 882 in a reference map 460 to represent the move operation. The move operation may further comprise allocating new indirect entries 866 to reference the data through the reference entries 882. reference entries 882 may comprise the pre-move LIDs 1023, 1024, and 1025, which may be associated with the addresses 32, 3096, and 872. The new logical interface 863C of the data may, therefore, comprise the indirect entries 866 and the corresponding reference entries 882. The move operation may further comprise storing a persistent note 366 on the storage medium to ensure that the move operation is persistent and crash safe, as disclosed above.

The contextual format of the data stored at storage addresses 32, 3096, and 872 may be inconsistent with the updated logical interface 863C; the contextual format of the data may associate the respective data segments with LIDs 1023, 1024, and 1025 as opposed to 9215, 9216, and 9217 (and/or the reference entries). The persistent note 366 may comprise the updated logical interface 863C of the data, so that the storage metadata 135 (e.g., forward map 160 and/or reference map 460) can be correctly reconstructed if necessary.

The storage module 130 may provide access to the data in the inconsistent contextual format through the modified logical interface 863C (LIDs 9215, 9216, and 9217). The data may be rewritten and/or relocated in a contextual format that is consistent with the modified logical interface 863C subsequent to the move operation (outside of the path of the move operation and/or other storage operations). In some embodiments, the data at storage addresses 32, 3096, and/or 872 may be rewritten by a media management module 370 in one or more background operations, as described above. Therefore, the move operation may complete (and/or return an acknowledgement) in response to updating the forward map 160 and/or storing the persistent note 366.

As illustrated in FIG. 8C, the forward map 160 and/or other storage metadata 135 may be updated in response to rewriting data of the move operation. In the FIG. 8C embodiment, the data segment 812A stored at media storage location 32 may be relocated in a storage recovery operation, which may comprise storing the data in a contextual format (data packet 810A) that is consistent with the modified logical interface 863C. The data packet 810A may comprise persistent metadata 814A that associates the data segment 812A with LID 9215. The forward map 160 may be updated to reference the data in the updated contextual format, which may comprise modifying the indirect entry of the LID 9215 to directly reference the data packet 810A rather than the reference entry. The entry corresponding to LID 9215 may revert from an indirect entry to a standard, local entry, and the reference entry for LID 1023 may be removed from the reference map 460.

Referring to FIG. 8D, a storage client 106 may modify data associated with LID 9217, which may comprise storing a data segment out-of-place (e.g., at storage address 772). The data segment may be written in a contextual format that is consistent with the modified logical interface 863C (e.g., associates the data with LID 9217). In response, the forward map 160 may be updated to associate the entry for LID 9217 with the storage address of the data segment (e.g., storage address 772) and to remove the reference entry for LID 1025 from the reference map 460, as disclosed above.

Figure 8E:
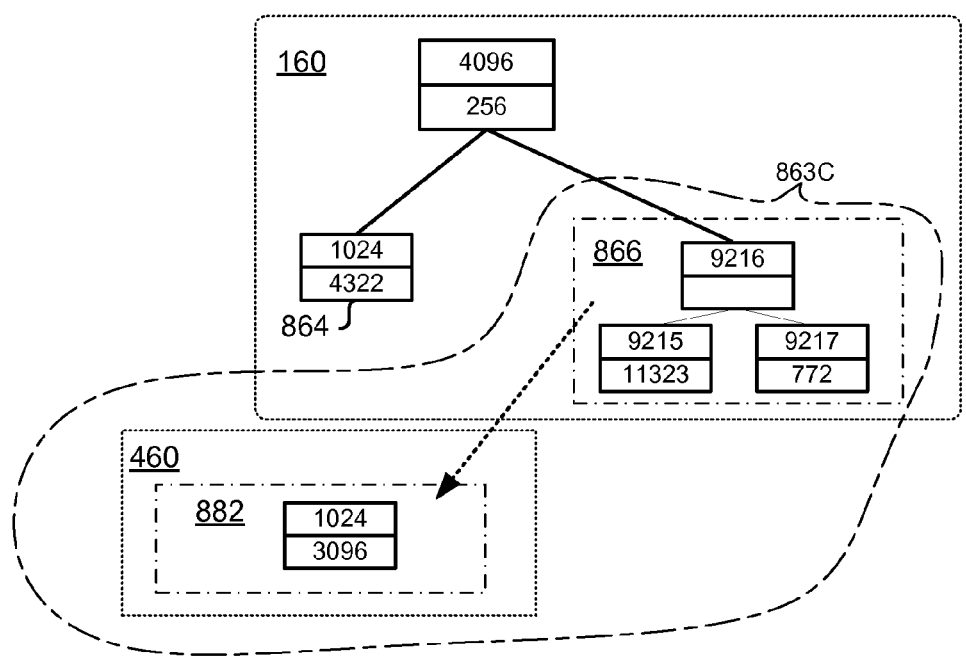

In some embodiments, the reference map 460 may be maintained separately from the forward map 160, such that the entries therein (e.g., entries 882) cannot be directly referenced by storage clients 106. This segregation may allow storage clients 106 to operate more efficiently. For example, rather than stalling operations until data is rewritten and/or relocated in the updated contextual format, data operations may proceed while the data is rewritten in one or more background processes. Referring to FIG. 8E, following the move operation disclosed above, a storage client 106 may store data in connection with the LID 1024. The reference entry 882 corresponding to the LID 1024 may be included in the reference map 460, due to, inter alia, the data at storage address 3096 not yet being rewritten in the updated contextual format. However, since the reference map 460 is maintained separately from the forward map 160, a name collision may not occur and the storage operation may complete. The forward map 160 may include a separate entry 864 comprising the logical interface for the data stored at media storage location 4322, while continuing to provide access to the data formerly bound to LID 1024 through the logical interface 863C (and reference map 460).

In the disclosed move operation, when the indirect entries are no longer linked to reference entries of the reference map 460 due to, inter alia, rewriting, relocating, modifying, deleting, and/or overwriting the corresponding data, the reference entries may be removed, and the indirect entries may revert to direct, local entries. In addition, the persistent note 366 associated with the move operation may be invalidated and/or removed from the storage medium 140, as disclosed above.

Referring back to FIG. 1A, the interface 131 of the storage module 130 may be configured to provide APIs and/or interfaces for performing the storage operations disclosed herein. The APIs and/or interfaces may be exposed through one or more of the block interface, an extended storage interface, and/or the like. The block interface may be extended to include additional APIs and/or functionality by use of interface extensions, such as fadvise parameters, I/O control parameters, and the like. The interface 131 may provide APIs to perform range clone operations, range move operations, range merge operations, deduplication, snapshot, and other, higher-level operations disclosed herein. The interface 131 may allow storage clients 106 to apply attributes and/or metadata to LID ranges (e.g., freeze a range), manage range snapshots, and so on. As disclosed herein, a range clone operation comprises creating a logical copy of a set of one or more source LIDs. Range clone, move, and/or merge operations may be implemented using any of the embodiments disclosed herein including, but not limited to, the range clone embodiments depicted in FIGS. 3A-E, the reference entry embodiments of FIGS. 4A-E, and/or the intermediate mapping layer embodiments of FIGS. 5A-B.

The range clone, move, and/or merge operations disclosed herein may be used to implement higher-level operations, such as deduplication, snapshots, efficient file copy operations (logical file copies), file consistency management, address space management, mmap checkpoints, atomic writes, and the like. These higher-level operations may also be exposed through the interface 131 of the storage module 130. The disclosed operations may be leveraged by various different storage clients 106, such as operations systems, file systems, data base services, and/or the like.

Figure 9A:
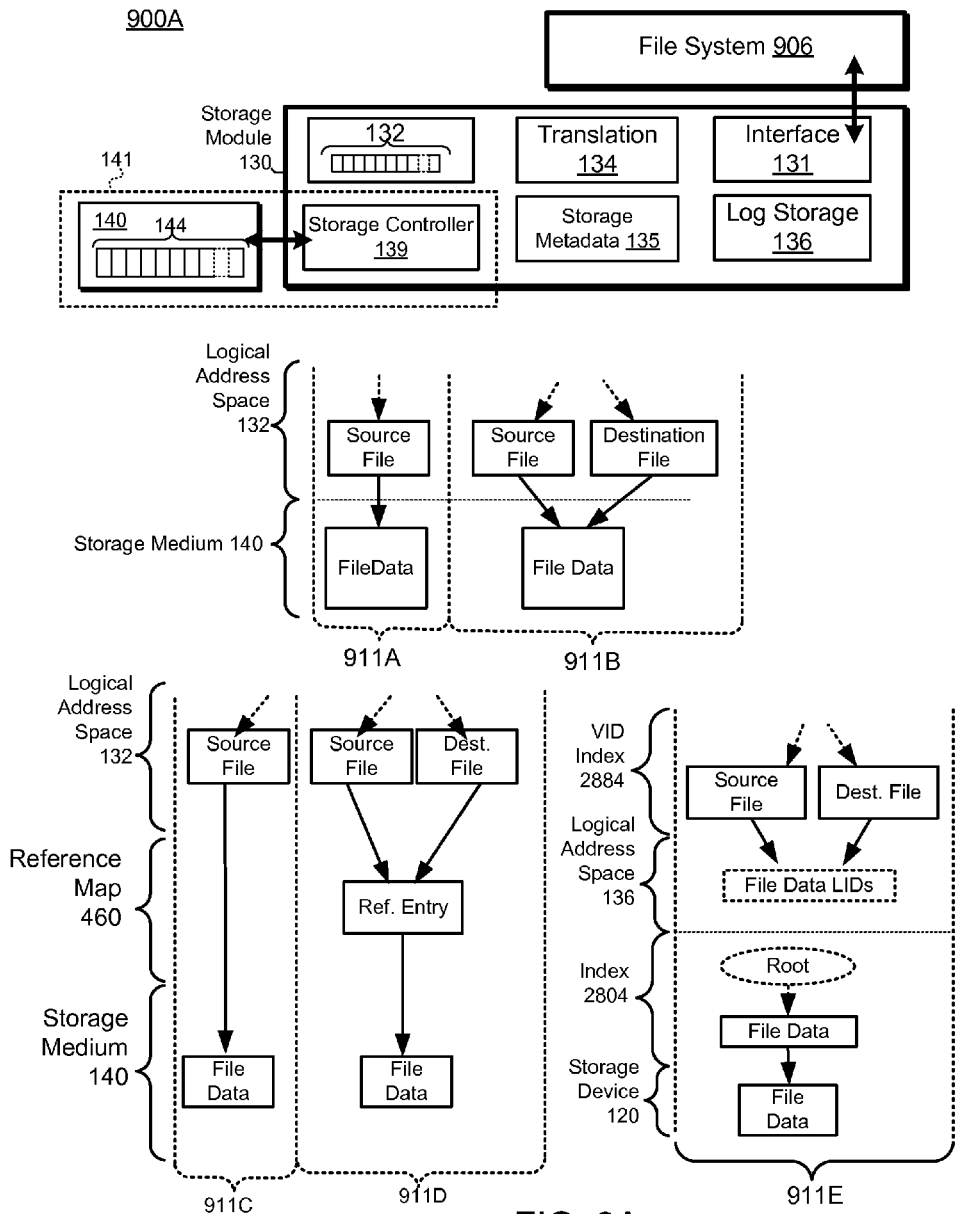
FIG. 9A is a block diagram of a system comprising a storage module configured to implement efficient file management operations.

FIG. 9A depicts one embodiment of a system 900A comprising a storage module 130 configured to implement file management operations. The system 900A may comprise a file system 906 that may be configured to leverage functionality of the storage module 130 to reduce complexity, overhead, and the like. The file system 906 may be configured to leverage the range clone, move, move, snapshot, deduplication, and/or other functionality disclosed herein to implement efficient file-level snapshot and/or copy operations. The file system 906 may be configured to implement such operations in response to client requests (e.g., a copy command, a file snapshot ioctrl, or the like). The file system 906 may be configured to implement efficient file copy and/or file-level snapshot operations on a source file by, inter alia, a) flushing dirty pages of the source file (if any), b) creating a new destination file to represent the copied file and/or file-level snapshot, and c) instructing the storage module 130 to perform a range clone operation configured to clone the source file to the destination file.

FIG. 9A depicts various embodiments for implementing range clone operations for a file system 906. In some embodiments, and as depicted in state 911A, the storage module 130 may be configured to maintain a logical address space 132 in which LIDs of the source file (the file to be cloned) are mapped to file data on the storage medium by use of the forward map 160. The corresponding range clone operation depicted in state 911B may comprise: a) allocating a set of LIDs for the destination file, and b) mapping the LIDs of the source file and the destination file to the file data on the storage medium 140. The range clone operation may further comprise storing a persistent note 366 on the storage medium 140 to indicate that the file data is associated with both the source file and destination file LIDs. The range clone operation may further comprise rewriting the file data in accordance with the updated contextual format, as disclosed herein.

In other embodiments, the storage module 130 may leverage a reference map 460 to implement range clone operations (e.g., as disclosed in FIGS. 4A-E). Before the range clone operation, in state 911C, the LIDs of the source file may be directly mapped to the corresponding file data in the forward map 160. Creating the range clone in state 911D may comprise associating one or more reference entries in the reference map 460 with the file data, and linking indirect entries corresponding to the source file LIDs and the destination file LIDs to the reference entry. The range clone operation may further comprise storing a persistent note 366 on the storage medium 140 and/or updating the contextual format of the file data, as disclosed herein.

In some embodiments, the storage module 130 may be configured to implement range clone operations using an intermediate layer mapping layer (e.g., as disclosed in FIGS. 5A-B). As indicated in state 911E, the source file may correspond to a set of VIDs of a VAS 532, which may be mapped to file data on the storage medium 140 through an intermediary address space (e.g., logical address space 132 of the storage module 130). Performing the range clone operation may comprise: a) allocating VIDs in the VAS 532 for the destination file, and b) associating the VIS of the destination file with the LIDs of the intermediate mapping layer (e.g., the same set of LIDs mapped to the source file VIDs). The range clone operation may further comprise storing a persistent note 366 on the storage medium 140 indicating that the destination VIDs are associated with the file data LIDs. Since the file data is already bound to the intermediate identifiers, the contextual format of the file data may not need to be updated.

The file system 906 may be further configured to leverage the storage module 130 to checkpoint mmap operations. As used herein, an "mmap" operation refers to an operation in which the contents of files are accessed as pages of memory through standard load and store operations rather than the standard read/write interfaces of the file system 906. An "msync" operation refers to an operation to flush the dirty pages of the file (if any) to the storage medium 140. The use of mmap operations may make file checkpointing difficult. File operations are performed in memory and an msync is issued when the state has to be saved. However, the state of the file after msync represents the current in-memory state and the last saved state may be lost. Therefore, if the file system 906 were to crash during an msync, the file could be left in an inconsistent state.

Figure 9B:
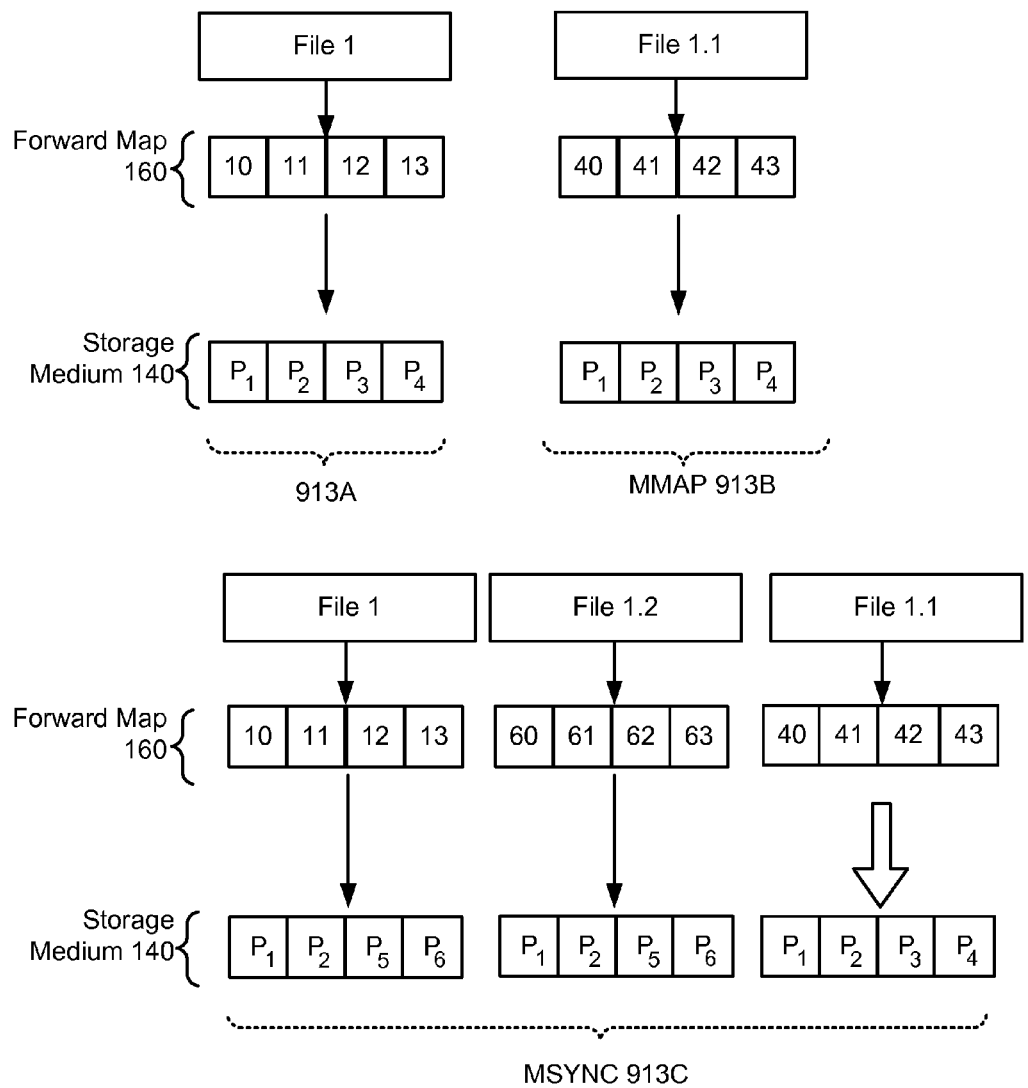
FIG. 9B depicts one embodiment of a storage module configured to implement mmap checkpoints.

In some embodiments, the file system 906 is configured to checkpoint the state of an mmap-ed file during calls with msync. Checkpointing the file may comprise creating a file-level snapshot (and/or range clone), as disclosed above. The file-level snapshot may be configured to save the state of the file before the changes are applied. When the msync is issued, another clone may be created to reflect the changes applied in the msync operation. As depicted in FIG. 9B, in state 913A (prior to the mmap operation), file 1 may be associated with LIDs 10-13 and corresponding storage addresses P1-P4 on the storage medium 140. In response to the mmap operation, the file system 906 may perform a range clone operation through the interface 131 of the storage module 130, which may comprise creating a clone of file 1 (denoted file 1.1). The file 1.1 may be associated with a different set of LIDs 40-43 that reference the same file data (e.g., the same storage addresses P1-P4). In other embodiments, file 1 may be cloned using a reference map 460 and/or an intermediate translation layer, as disclosed above.

In response to an msync call, the file system 906 may perform another range clone operation (by use of the storage module 130). As illustrated in state 913C, the range clone operation associated with the msync operation may comprise updating the file 1 with the contents of one or more dirty pages (storage addresses P5 and P6) and cloning the updated file 1 as file 1.2. The file 1.1 may reflect the state of the file before the msync operation. Accordingly, in the event of a failure, the file system 906 may be capable of reconstructing the previous state of the file 1.

As disclosed above, storage module 130 may be configured to implement range clone and range merge operations, which may be leveraged to implement higher-level operations such as file consistency (e.g., close-to-open file consistency, as disclosed in further detail herein), atomic operations, and the like. These operations may comprise: a) cloning a particular region of the logical address space 132, b) performing storage operations within the cloned region, and c) selectively merging and/or folding the cloned region into another portion of the logical address space 132. As used herein, merging and/or folding regions of the logical address space 132 refers to combining two or more LID ranges by, inter alia, incorporating changes implemented in one of the ranges into one or more other ranges. A merge operation may be implemented according to a merge policy, which may be configured to resolve conflicts between different LID ranges. The merge policy may include, but is not limited to, an "overwrite" mode, in which the contents of one of one LID range "overwrites" the contents of another LID range; an "OR" mode, in which the contents of the LID ranges are combined together (e.g., in a logical OR operation); a copy-on-conflict mode in which conflicts are resolved by creating separate independent copies of one or more LID ranges; and/or the like. In the overwrite mode, the LID range that overwrites the contents of the one or more other LID ranges may be determined based on any suitable criteria including, but not limited to, commit time (e.g., more recent operations overwrite earlier operations), priority, and/or the like.

Figure 9C:
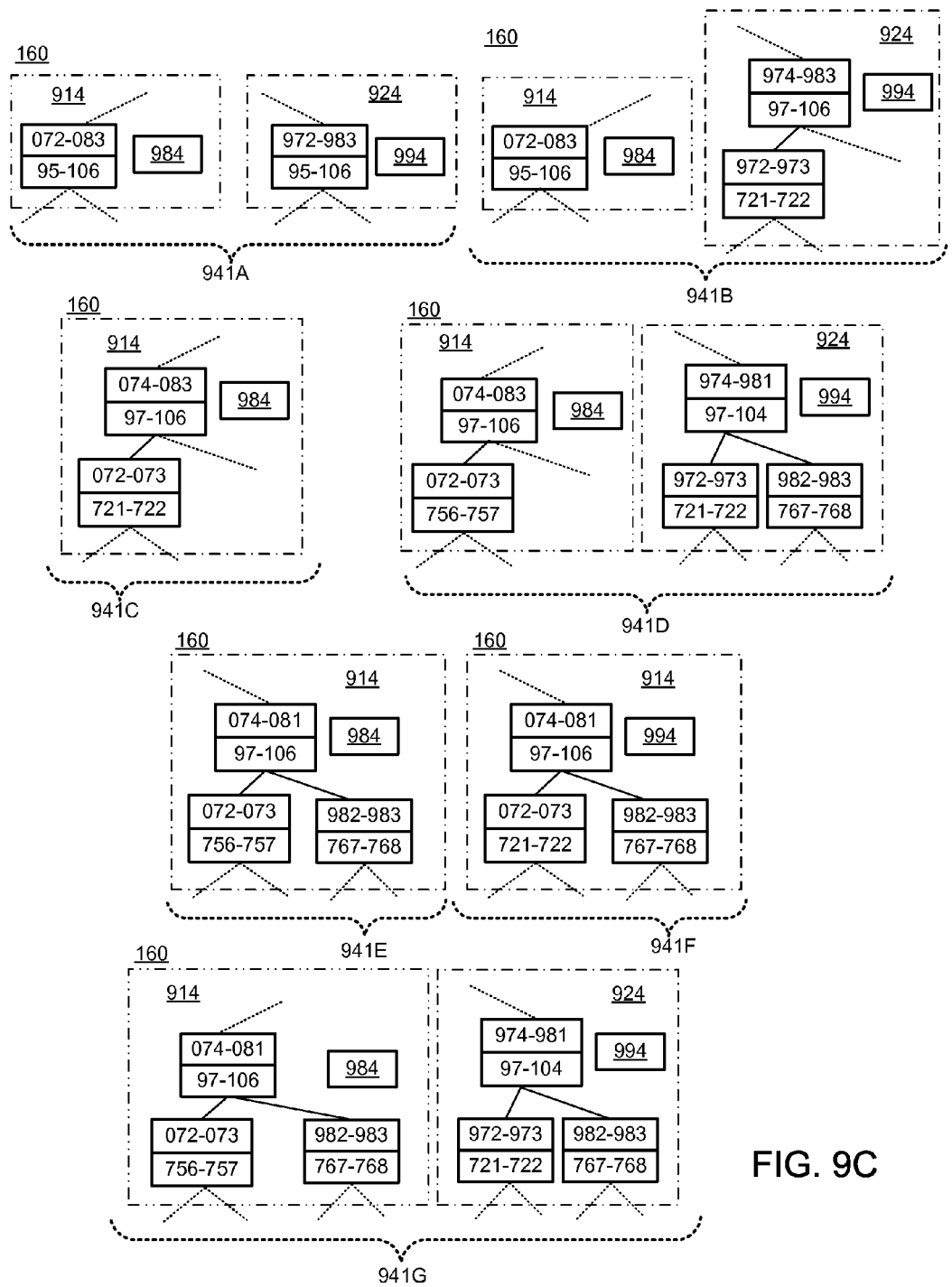
FIG. 9C depicts embodiments of range clone and range merge operations implemented by a storage module.

FIG. 9C depicts embodiments of range merge operations implemented by use of the storage module 130. In the FIG. 9C embodiment, the storage module 130 may be configured to clone the identifier range 914, which may be represented by one or more entries within the forward map 160. The LIDs 072-083 within the range 914 may be bound to storage addresses 95-106. The range clone and/or merge operations disclosed herein may be implemented using any of the range clone and/or move embodiments of FIGS. 3A-E, the reference entry embodiments of FIGS. 4A-E, and/or the intermediate mapping layer embodiments of FIGS. 5A-B. Accordingly, in some embodiments, the LIDs 072-083 may be bound to the storage addresses 95-106 through one or more reference entries and/or intermediate mapping layers.

The storage module 130 may be configured to clone the range 914, which, as illustrated at state 941A, may comprise binding a new range of LIDs 924 to the storage addresses 95-106. The ranges 914 and/or 924 may comprise respective metadata 984 and/or 994 configured to indicate that the ranges 914 and 924 are related (e.g., bound to the same set of storage addresses). The metadata 984 and/or 994 may be configured to link the LIDs 072-083 to 972-983 such that modifications pertaining to one of the LID ranges can be correlated to LIDs in the other range (e.g., data written in association with LID 972 can be associated with the corresponding LID 072, and so on). The metadata 984 and/or 994 may indicate a synchronization policy for the cloned LID ranges which, as disclosed above, may indicate whether allocation operations between clones are to be synchronized. The metadata 984 and/or 994 may further comprise and/or reference a merge policy, which may specify how merge conflicts are to be managed. The merge policy may be specified through the interface 131 of the storage module 130, may be determined based on a global and/or default merge policy, may be specified through request parameters (e.g., fadvise, ioctrl, etc.), and/or the like. The clone operation may further comprise appending a persistent note 366 to the storage medium 140 that is configured to associate the data at storage addresses 95-106 with the LID range 972-983 (and/or rewriting the data in an updated contextual format), as disclosed above.

The storage module 130 may perform storage operations within one or more of the ranges 914 and/or 924 in response to storage requests from one or more storage clients 106. As illustrated in state 941B, a storage operation may modify data associated with the LIDs 972-973, which may comprise associating the identifiers 972-973 with a new set of storage addresses 721-722. Following the storage operation(s) of state 941B, the storage module 130 may perform a range merge operation to merge the LID range 972-983 with the range 072-083. The range merge operation may comprise incorporating the modifications made in reference to the LID range 924 into the LID range 914 in accordance with a merge policy. The merge policy may specify that modifications made in the cloned range 924 overwrite data within the source range 914. Accordingly, the result of the merge operation illustrated in state 941C may comprise binding LIDs 072-073 of the source range 914 to the modified data at storage addresses 721-722. The range merge operation may further comprise deallocating the cloned LID range 972-983, storing a persistent note 366 configured to associate the data at storage addresses 756-757 with LIDs 072-073, and/or rewriting the data at storage addresses 721-722 in an updated contextual format, as disclosed herein. Data stored at storage addresses 95-96 that has been obviated by the new data at 721-722 may be invalidated, as disclosed above.

Storage operations performed within the ranges 914 and/or 924 may result in conflicts. In some embodiments, the merge policy associated with the LID ranges may preempt conflicts. As disclosed in further detail herein, in an atomic storage operation, the storage module 130 may lock one or more LID ranges while atomic storage operations are completed in one or more corresponding ranges. In other implementations, however, the storage module 130 may allow storage operations to be performed concurrently within cloned ranges. In state 941D, the storage module 130 may implement storage operation(s) configured to overwrite and/or modify data associated with the LIDs 972-973 and 982-983 in the range 924. The storage module 130 may implement other storage operation(s) configured to overwrite and/or modify data associated with LIDs 072-073 of range 914. The storage operation(s) pertaining to the LIDs 072-073 and 972-973 may create a merge conflict between the ranges 914 and 924. The merge conflict may be resolved according to a merge policy, as disclosed above. In some embodiments, the merge policy may comprise applying the most recent modification, based on, inter alia, the relative order of the storage operations in the storage log. In other implementations, the merge policy may resolve conflicts based on relative priority of the storage clients 106 (processes, applications, and/or the like) that requested the respective storage operations. In another implementation, the merge policy may resolve conflicts by creating two (or more) versions of the ranges 914 and/or 924 to represent the different, conflicting versions.

State 941E depicts one embodiment of a result of a merge operation configured to incorporate the operations operation(s) associated with LIDs 072-073 instead of the conflicting modifications associated with LIDs 972-973. Therefore, in state 941E, the LIDs 072-073 are bound to the storage addresses 756-757 corresponding to the storage operation(s) performed in reference to the LIDs 072-073, rather than storage addresses 721-722 corresponding to the storage operation(s) performed in reference to the LIDs 972-973.

State 941F depicts one embodiment of a result of a merge operation configured to incorporate the modifications of the range 972-973 instead of the conflicting modifications made in reference to the LIDs 072-073. Accordingly, in state 941F, the identifiers 072-073 are bound to the storage addresses 721-722 corresponding to the storage operation(s) performed in reference to the LIDs 972-973, rather than the storage addresses 756-757 associated with the LIDs 072-073.

State 941G depicts one embodiment of a result of a merge operation configured to manage merge conflicts by creating separate range copies or versions. The range 914 may incorporate the non-conflicting modifications made in reference to identifiers 982-983 and may retain the result of the conflicting storage operations pertaining to identifiers 072-073 (rather than incorporating storage addresses 721-722). The other LID range 924 may retain the modifications of state 941D without incorporating the results of the conflicting storage operation(s) made in reference to identifiers 072-073. Although state 941G depicts the copies using the original cloned LID ranges 072-083 914 and 974-981 924, the disclosure is not limited in this regard and could be configured to create the range copies and/or versions within any region of the logical address space 132. The range merge operations disclosed in reference to states 941E-G may further comprise appending one or more persistent notes 366 to the storage medium 140 to associate the data stored at storage addresses 721-722, 756-757, and/or 767-768 with the corresponding LIDs and/or rewriting the data in one or more background storage operations, as disclosed herein.

In some embodiments, operations within one or more of the cloned LID ranges 914 and/or 924 may comprise modifying the LID ranges 914 and/or 924 by, inter alia, expanding the ranges 914 and/or 924, contracting the ranges 914 and/or 924, or the like. Extending one of the ranges 914 and/or 924 may comprise a corresponding extension to the other range, and, as such, allocation operations may be predicated on allocating additional LID(s) in both ranges 914 and 924.

Figure 9D:
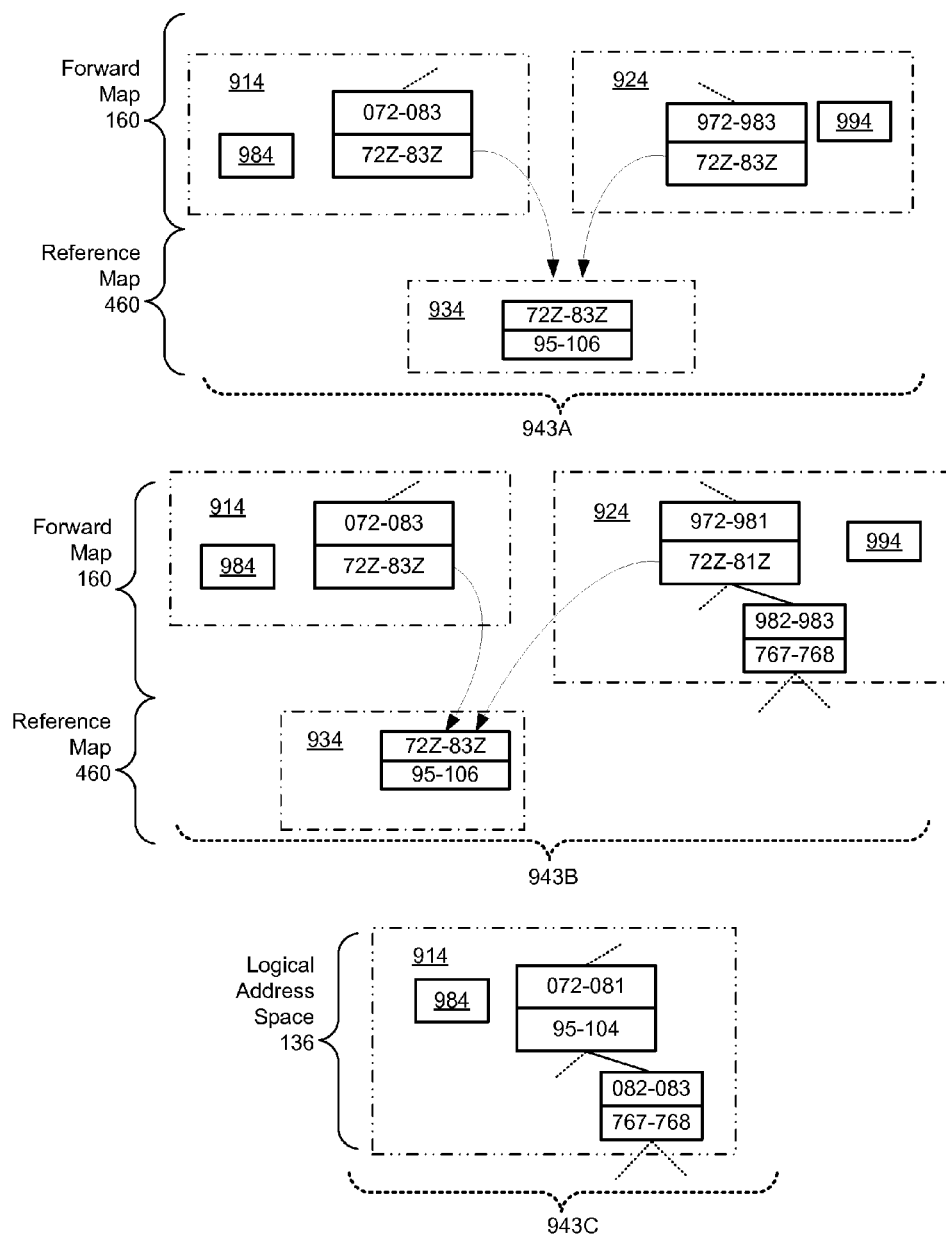
FIG. 9D depicts further embodiments of range clone and range merge operations.

The range merge operations disclosed herein may be implemented using any of the range clone and/or move embodiments of FIGS. 3A-E, the reference entry embodiments of FIGS. 4A-E, and/or the intermediate mapping embodiments of FIGS. 5A-B. FIG. 9D depicts an embodiment of a range merge operation using a reference map 460. As depicted in state 943A, cloning the range 914 may comprise allocating a LID range 924 in the logical address space 132, linking the ranges 914 and 924 (using, inter alia, metadata 984 and/or 994), and associating the ranges 914 and 924 with the reference identifiers 934 in the reference map 460. The range clone operation may further comprise storing a persistent note 366 on the storage medium 140 configured to associate the range 934 in the reference map 460 with the indirect ranges 914 and/or 924, as disclosed above. The range 934 within the reference map 460 may be bound to the storage addresses 95-106. Accordingly, both ranges 914 and 924 may indirectly reference the same data at the same storage addresses.

A storage operation within the range 924 configured to modify data corresponding to LIDs 982-983 may comprise allocating new LIDs within the range 924 and binding the new local entry 982-983 to the corresponding storage addresses 767-768, as depicted in state 943B. Merging the ranges 914 and 924 may comprise incorporating the modified data at storage addresses 767-768 into the range 914 in accordance with a merge policy, as disclosed above. In the FIG. 9D embodiment, the range merge operation of state 943C may comprise removing the reference entry 934 and updating the LIDs 081-083 of range 914 to reference the updated data at storage addresses 767-768. The merge operation may further comprise storing a persistent note 366 and/or rewriting the data at storage addresses 767-768 in an updated contextual format, as disclosed above.

Figure 9E:
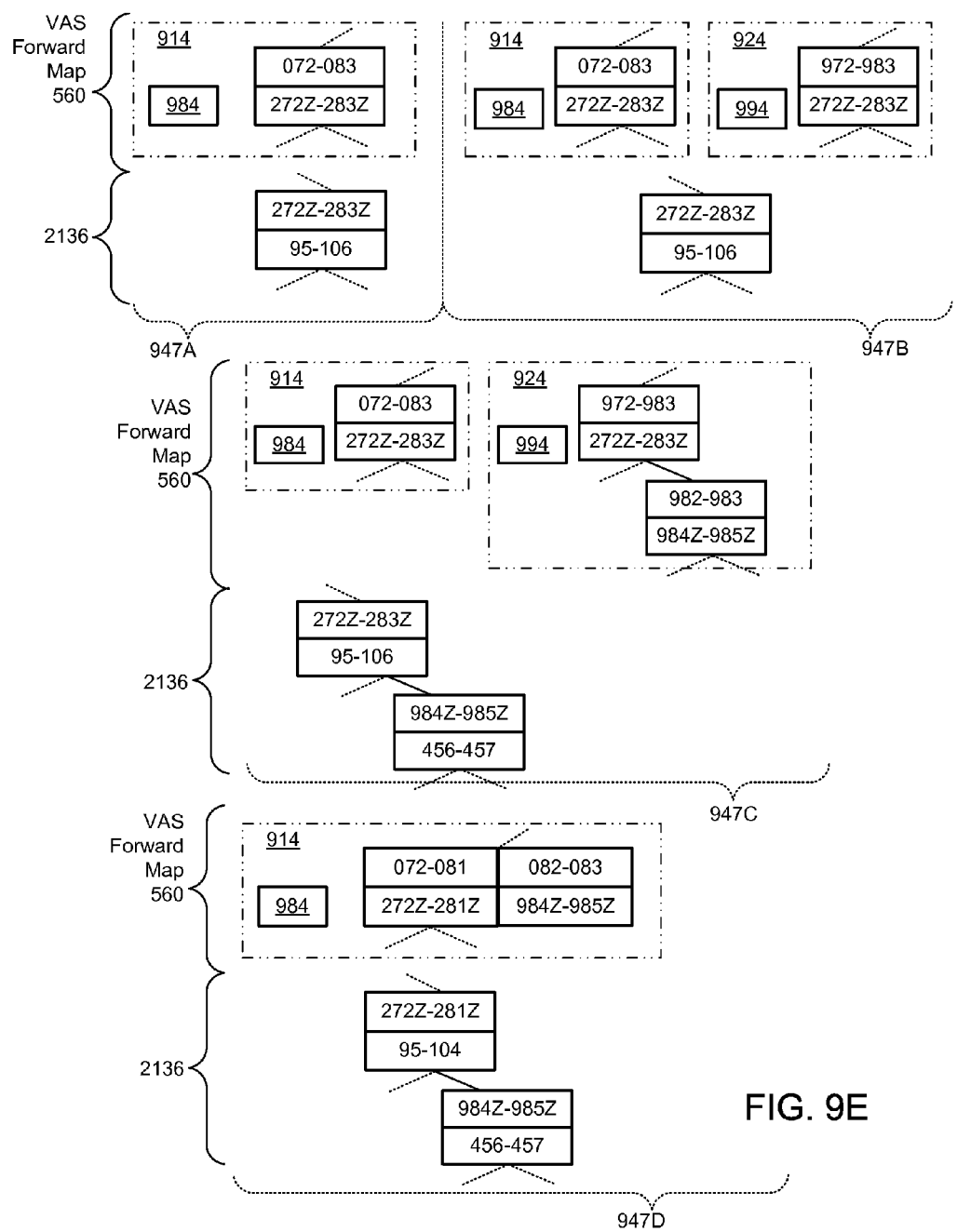
FIG. 9E depicts further embodiments of range clone and range merge operations.

FIG. 9E depicts further embodiments of range clone and range merge operations implemented by the storage module 130. FIG. 9E illustrates range clone and range merge operations in embodiments comprising an intermediary address space, as disclosed in conjunction with FIGS. 5A-B. In state 947A, the VID range 914 comprising VIDs 072-083 are indirectly bound to storage addresses 95-106 through intermediary identifiers 272Z-283Z in the VAS forward map 560. The intermediary identifiers may be part of a separate, intermediate address space 2136 (e.g., the logical address space 132 of the storage module 130).

As illustrated in state 947B, cloning the VID range 914 may comprise allocating a new VID range 924 comprising VIDs 972-983 and associating the range 924 with the intermediary identifiers 272Z-283Z in the VAS forward map 560. The clone operation may further comprise storing a persistent note 366 on the storage medium 140 that is configured to associate the VID range 924 with the intermediary addresses 272Z-283Z. Storage operations may be performed in reference to the VID ranges 914 and/or 924, as disclosed herein. Modifications to the VID ranges 914 and/or 924 may be reflected in updated mappings between the respective VID ranges 914 and/or 924 and the intermediate address space 2136. In state 947C, a storage operation modifying data of VIDs 982-983 is reflected in updated mappings between VIDs 982-983 and intermediate identifiers 984Z-985Z, and storage addresses 456-457. Merging the VID ranges 914 and 924 may comprise updating the VID mappings of range 914 to reference the updated data (through the intermediary addresses 984Z-985Z), as illustrated in state 947D. The merge operation may further comprise resolving merge conflicts (if any), as disclosed above. The merge operation may further comprise appending one or more persistent notes 366 to the storage medium 140 to associate the VIDs 082-083 with the intermediate addresses 984Z-985Z.

Figure 9F:
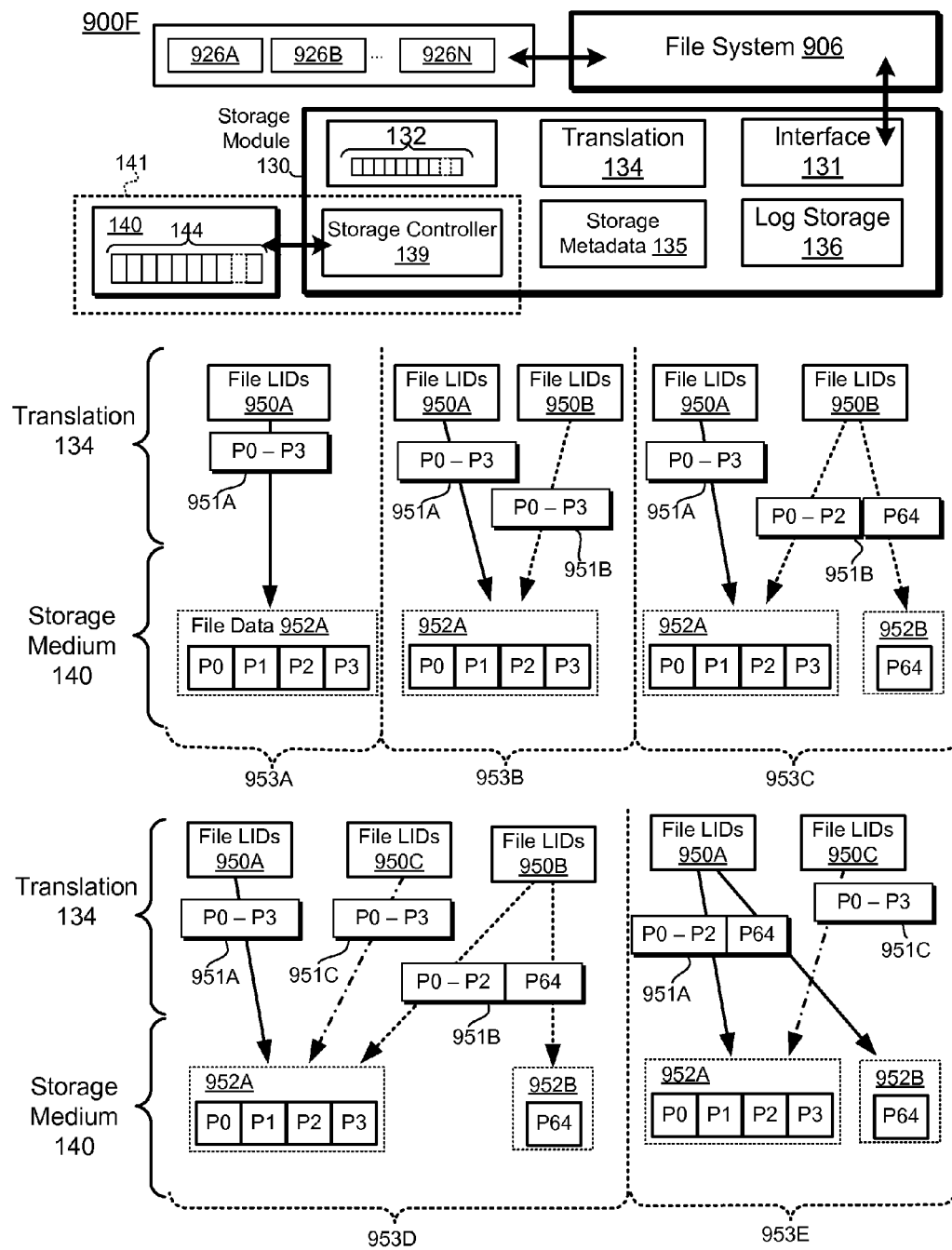
FIG. 9F is a block diagram of one embodiment of a system comprising a storage module configured to implement efficient open-to-close file consistency.

In some embodiments, the storage module 130 may leverage the range clone, move, and/or merge operations disclosed herein to provide file consistency functionality for storage clients 106, such as file systems, databases, and/or the like. Referring to FIG. 9F, a file system 906 may leverage the storage module 130 to implement a close-to-open file consistency model per the Network File System (NFS) version 3 protocol and/or other file system implementations and/or protocols. The close-to-open file consistency model may be configured to allow multiple processes and/or applications (file system clients) to operate on the same file concurrently. File modifications are committed at the time the file is closed; other clients operating on the file in parallel do not see the changes until the next time the file is opened. Accordingly, the state of the file is set at the time the file is opened and changes implemented in parallel by other clients are not applied until the file is re-opened.

In some embodiments, the file system 906 may leverage the storage module 130 to preserve the "original" data of the file (e.g., a consistent version of the file) while modifications are made within the working, cloned range. As used herein, preserving the "original" data of the file and/or a consistent version of the file refers to maintaining the file data in a state corresponding to the time the file was opened and/or keeping a log of file modifications from which the state of the file data in its original, unmodified state can be reconstructed.

FIG. 9F depicts one embodiment of a system 900F comprising storage module 130 configured to implement a close-to-open file consistency model. The file system 906 (and/or other storage client(s) 106) may leverage the storage module 130 to efficiently implement close-to-open file consistency. The storage module 130 may be configured to: a) clone files in response to file open requests of the file system clients 926A-N, resulting in a "primary" or "consistent" version of the file and a "working" version of the file; b) perform storage operations in reference to the working version of the file; and c) merge the working version of the file into the primary version of the file in response to file closure. The storage module 130 may be configured to clone the file data in one or more range clone operations, as disclosed herein (e.g., using the range clone embodiments of FIGS. 3A-E, 4A-E, 5A-B, and/or the like). The storage module 130 may be further configured to merge the working version of the file and the primary or consistent version of the file using one or more range merge and/or fold operations, as disclosed herein. The working version of the file may represent the state of the file at the time the file was opened by a particular storage client 926A-N. The storage client 926A-N may have exclusive access to the working version of the file, and, as such, the working version of the file may be isolated from file modifications made by other clients 926A-N. The storage module 130 may be configured to maintain the original, unmodified file data in reference to the "primary" or "consistent" logical interface of the file, which may comprise maintaining the associations between the file data and the consistent logical interface while storage operations are performed in reference to the working logical interface of the file. Conflicts between file modifications made by different storage clients 926A-N may be resolved according to conflict resolution policy or merge policy, such as last write (e.g., last write in time overwrites previous writes); copy on conflict (e.g., create separate versions of the file); priority based on client 926A-N, application, process, and/or the like; and so on.

In the FIG. 9F embodiment, at state 953A, the translation module 134 comprises mappings 951A between the LIDs of a file (file LIDs 950A) and data of the file 952A on the storage medium 140 at storage addresses P0-P3. The mappings 951A may be implemented using the forward map 160 disclosed herein and/or one or more intermediate mapping layers as disclosed in conjunction with FIGS. 5A-B.

In state 953B, the storage module 130 may be configured to clone the file in response to a file open request of a storage client (storage client 926B). The request may be received through the interface 131 as an explicit request, a request parameter (e.g., fadvise, ioctrl, etc.), and/or the like. The clone operation may comprise one or more range clone operations, which, as disclosed herein, may comprise allocating a new set of "cloned" file LIDs 950B corresponding to the working version file and associating the set of cloned identifiers 950B with the same file data 952A as the LIDs 950A of the primary version of the file (the original, or consistent set of logical identifiers 950A). The range clone operation may further comprise storing a persistent note 366 on the storage medium 140 to associate the file data 952A with both the primary file LIDs 950A and the working version of the file LIDs 950B, as disclosed above.

In some embodiments, the storage module 130 and/or file system 906 may be configured to direct file operations performed by the storage client 926B to the working version of the file (the working set of LIDs 950B). Accordingly, modifications made by the storage client 926B may be made in reference to the cloned file LIDs 950B. Such modifications may not affect the state of the original, primary version of the file LIDs 950A. Therefore, the storage client 926B may modify the working version of the file in reference to the LIDs 950B without changing the LIDs 950A of the original, primary version of the file.

In state 953C, the storage client 926B has performed a storage operation (through the storage module 130) to modify data of the file stored at storage address P3; the modified data may be appended to the storage log at storage address P64. In response, the translation module 134 may update mappings 951B to bind the LIDs of the cloned, working version of the file 950B to the modified file data 952B at storage address P64. Other LID(s) not modified by the storage client 926B may continue to be bound to the original, unmodified file data 952A. The storage module 130 is configured to preserve the original mappings 951A between the identifiers 950A of the primary version of the file and the unmodified file data 952A at storage addresses P0-3.

Another storage client 926N may issue a request to open the file before the storage client 926B has closed the file. In response, and as depicted in state 953D, the storage module 130 may create another clone of the primary file (clone the primary file identifiers 950A). The cloned LIDs (FIDs 950C) may correspond to the original state of the file without the modifications made by storage client 926B in reference to the cloned identifier range 950B. Accordingly, the cloned LIDs 950C may be mapped 951C to the original, unmodified file data 952A at storage addresses P0-3. The storage client 926N may perform storage operations in reference to the new cloned file identifier range 950C in parallel with the storage client 926B. Changes made by the clients 926B and 926N may be isolated within their respective LID ranges 950B and 950C, and, as such, may not be applied to the primary version of the file (LIDs 950A and/or one another).

State 953E illustrates the result of the storage client 926B closing the file. In response to a request to close the file of storage client 926B, the storage module 130 may be configured to merge the contents of the corresponding range (FIDs 950B) into the primary version of the file (LIDs 950A) in one or more range merge operations. The changes may not, however, be merged into the version of the file in use by storage client 926N (FIDs 950C); the storage client 926N may not have access to the modifications until the client 926N re-opens the file. Incorporating the modifications may comprise one or more range merge operations, as disclosed herein. The range merge operations may be configured to merge the modifications made in reference to the cloned LID range 950B into the LID range 950A of the primary version of the file. In the FIG. 9F embodiment, the range merge operation comprises updating the mappings 951A of the primary file LIDs 950A to reference the modified file data 952B at storage address P64. The data that was not modified by the client 924B may remain bound to the original, unmodified file data 952A at P0-3.

As disclosed herein, in some embodiments, the modified file data 952B may include persistent metadata configured to associate the modified file data 952B at storage address P64 with one or more of the LIDs 950B (as opposed to the LIDs 950A associated with the primary version of the file). The range merge operation may, therefore, further comprise appending a persistent note 366 to the storage medium 140 configured to associate one or more of the range of LIDs 950A with the modified file data 952B at storage address P64. The data at storage address P64 may be rewritten with updated persistent metadata in one or more background operations. Following the file close operation (and corresponding range merge operations), the translation module 134 may be configured to deallocate the LIDs of range 950B.

Figure 9G:
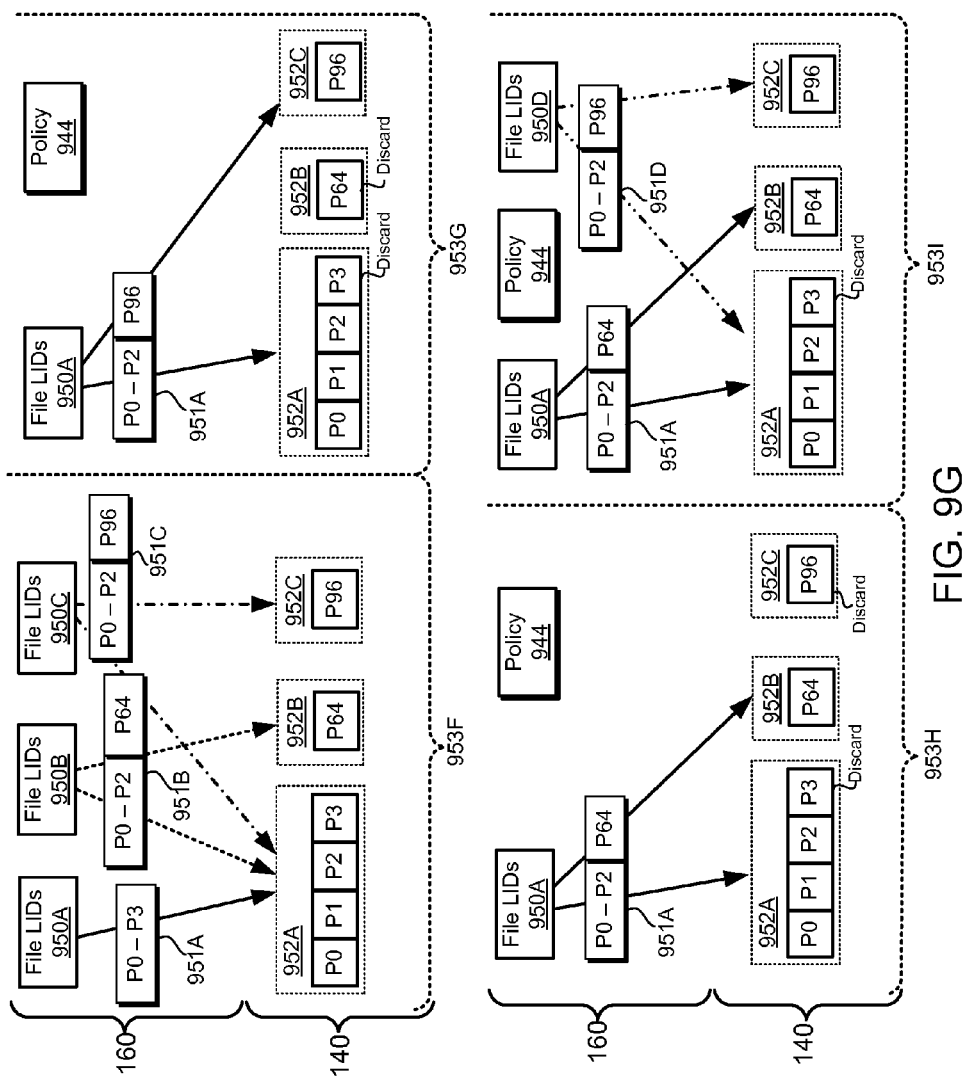
FIG. 9G depicts further embodiments of close-to-open file consistency.

The client 926N may modify the file in reference to the cloned file identifiers 950C. As depicted in state 953F of FIG. 9G, the storage client 926N may perform one or more operations that conflict with the modifications implemented by the client 926B. The modifications may occur before the client 950B has closed the file (before the modifications of client 926B have been applied to the LIDs 950A of the primary version of the file as in state 953E). As such, the LIDs 950A are mapped 951A to the original, unmodified file data 952A, one or more of the identifiers of the range 950B allocated to storage client 926B are mapped to modified file data 952B, and one or more of the identifiers of range 950C allocated to storage client 926N are mapped to conflicting file data 952C. The LIDs 950B and 950C that correspond to unmodified data may continue to reference the original, unmodified file data 952A.

The clients 926B and 926C may eventually close their respective files, which may comprise merging the modifications made in reference to the respective LID ranges 950B and 950C into the range 950A of the primary version of the file. The storage module 130 may be configured to resolve conflicts between the ranges 950B and 950C according to a merge policy 944. In some embodiments, the merge policy 944 may be based on the order in which the storage clients 926B and 926C closed the files; the modifications of the last file closed may overwrite previously applied modifications (e.g., the modifications may be serialized). As illustrated in state 953G, the storage client 950B may issue the file close request before the storage client 950C. After the client 950B closes the file, the storage module 130 may merge modifications made in reference to the range 950B into the range 950A of the primary version of the file (as illustrated, in state 953E of FIG. 9F). Closure of the file by client 926C may result in overwriting some of the modifications made by storage client 950B (modified data 952B) with data 952C, as illustrated in state 953G of FIG. 9G. The data at P3 and P64 may be marked for removal from the storage medium 140 since it is no longer referenced by the primary file or a current, working version of the file. As disclosed above, the storage module 130 may be configured to implement other merge policies, such as a priority based merge policy 944. A priority based merge policy may resolve conflicts based on relative priorities of the storage clients 926B and/or 926C. In state 953H, the storage client 926C may close the file after the storage client 926B; however, the modifications of storage client 926B may be retained due to the merge policy 944 indicating that the modifications of storage client 926B have a higher priority than conflicting modifications of storage client 926C. Accordingly, the LIDs 950A of the primary version of the file may continue to reference the modified file data 952B of storage client 926B, and the conflicting file data of storage client 926C (data 952C at P96) may be marked for garbage collection along with the obsolete file data 952A at P3. In other embodiments, the merge policy 944 may comprise a copy-on-conflict policy that results in creating two primary versions of the file. In such embodiments, and as illustrated in state 953I, the storage module 130 may be configured to incorporate the modifications of storage client 926B into the primary file (using primary file LIDs 950A), and may incorporate the conflicting modifications of storage client 926C into a new version of the file (file identifiers 950D).

Although particular embodiments of a merge policy 944 are described herein, the disclosure is not limited in this regard and could implement and/or incorporate any suitable merge policy 944. The merge policy 944 may be implemented within the storage module 130 and/or file system 906. In some embodiments, the merge policy 944 of the storage module 130 and/or file system 906 may be configured through the interface 131 of the storage module 130. The merge policy 944 may apply to all file operations performed through the storage module 130. Alternatively, or in addition, the merge policy 944 may be set on a per-file and/or per-conflict basis through, inter alia, file system API calls, fadvise, ioctrl, and/or the like, as disclosed above.

Figure 10:
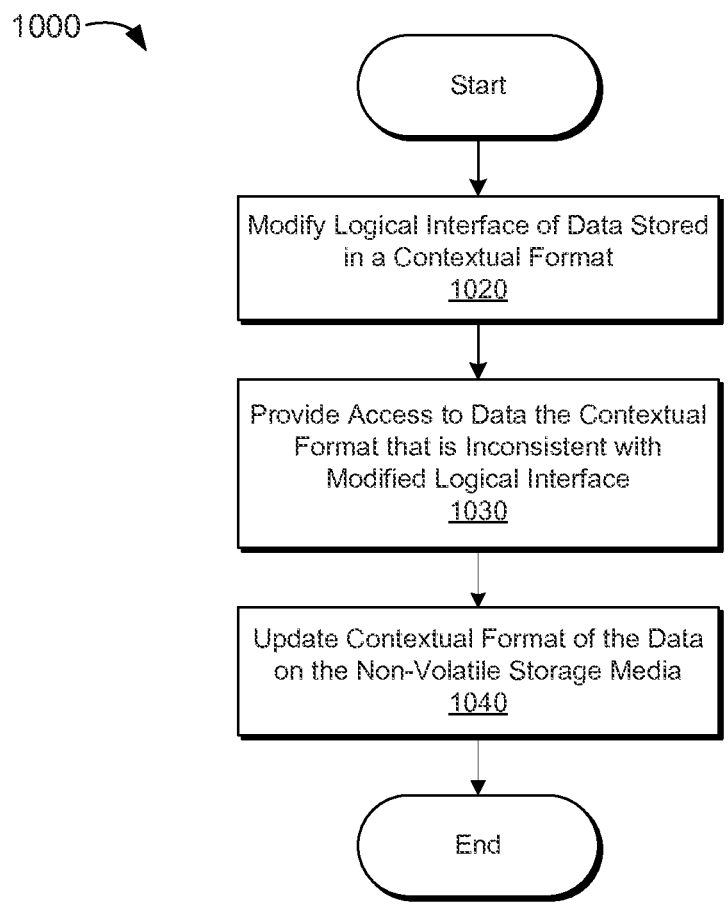
FIG. 10 is a flow diagram of one embodiment of a method for managing a logical interface of data storage in a contextual format on a non-volatile storage media.

FIG. 10 is a flow diagram of one embodiment of a method 1000 for managing a logical interface of data stored in a contextual format on a non-volatile storage medium.

Step 1020 may comprise modifying a logical interface of data stored in a contextual format on a non-volatile storage media. The logical interface may be modified at step 1020 in response to performing an operation on the data, which may include, but is not limited to, a clone operation, a deduplication operation, a move operation, or the like. The request may originate from a storage client 106, the storage module 130 (e.g., deduplication module 374), or the like.

Modifying the logical interface may comprise modifying the LID(s) associated with the data, which may include, but is not limited to, referencing the data using one or more additional LIDs (e.g., clone, deduplication, etc.), changing the LID(s) associated with the data (e.g., a move), or the like. The modified logical interface may be inconsistent with the contextual format of the data on the storage medium 140, as described above.

Step 1020 may further comprise storing a persistent note on the storage medium 140 that identifies the modification to the logical interface. The persistent note may be used to make the logical operation persistent and crash safe, such that the modified logical interface (e.g., storage metadata 135) of the data may be reconstructed from the contents of the storage medium 140 (if necessary). Step 1020 may further comprise acknowledging that the logical interface has been modified (e.g., returning from an API call, returning an explicit acknowledgement, or the like). The acknowledgement (and access through the modified logical interface at step 1030) occurs before the contextual format of the data is updated on the storage medium 140. Accordingly, the logical operation may not wait until the data is rewritten and/or relocated; as disclosed herein, updating contextual format of the data may be deferred and/or implemented in a process that is outside of the "critical path" of the method 1000 and/or the path for servicing other storage operations and/or requests.

Step 1030 may comprise providing access to the data in the inconsistent contextual format through the modified logical interface of step 1020. As described above, updating the contextual format of the data to be consistent with the modified contextual interface may comprise rewriting and/or relocating the data on the non-volatile storage media, which may impose additional latency on the operation of step 1020 and/or other storage operations pertaining to the modified logical interface. Therefore, the storage module 130 may be configured to provide access to the data in the inconsistent contextual format while (or before) the contextual format of the data is updated. Providing access to the data at step 1030 may comprise referencing and/or linking to one or more reference entries corresponding to the data (via one or more indirect entries), as described above.

Step 1040 may comprise updating the contextual format of the data on the storage medium 140 to be consistent with the modified logical interface of step 1020. Step 1040 may comprise rewriting and/or relocating the data to another media storage location on the storage medium 140. As described above, step 1040 may be implemented using a process that is outside of the critical path of step 1020 and/or other storage requests performed by the storage module 130; step 1040 may be implemented by another, autonomous module, such as media management module 370, deduplication module 374, or the like. Accordingly, the contextual format of the data may be updated independent of servicing other storage operations and/or requests. As such, step 1040 may comprise deferring an immediate update of the contextual format of the data and updating the contextual format of the data in one or more "background" processes, such as a media management process. Alternatively, or in addition, updating the contextual format of the data may occur in response to (e.g., along with) other storage operations. For example, a subsequent request to modify the data may cause the data to be rewritten out of place and in the updated contextual format.

Step 1040 may further comprise updating storage metadata 135 as the contextual format of the data is updated. As data is rewritten and/or relocated in the updated contextual format, the storage module 130 may update the storage metadata 135 (e.g., forward map 160) accordingly. The updates may comprise removing one or more links to reference entries in a reference map 460 and/or replacing indirect entries with local entries, as described above. Step 1040 may further comprise invalidating and/or removing a persistent note from the storage medium 140 in response to updating the contextual format of the data and/or persisting the storage metadata 135, as disclosed above.

Figure 11:
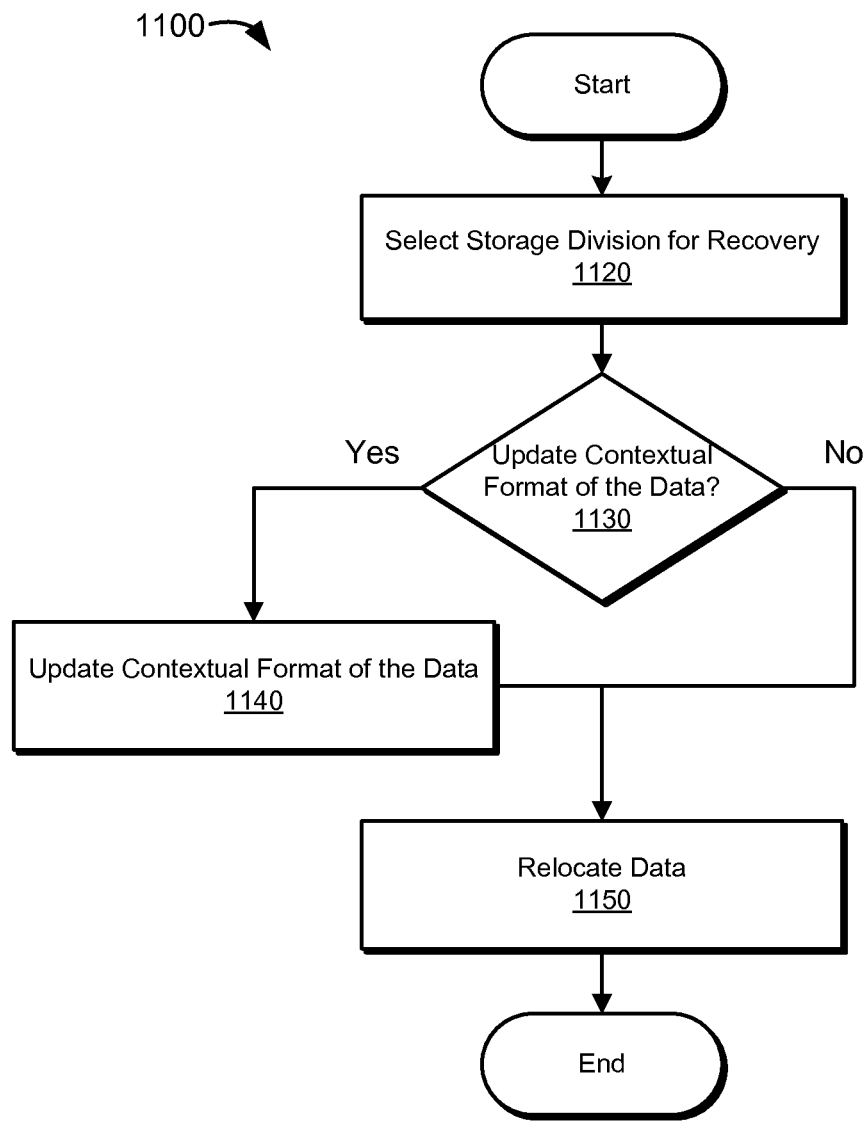
FIG. 11 is a flow diagram of one embodiment of a method for managing a logical interface of contextual data.

FIG. 11 is a flow diagram of another embodiment of a method 1100 for managing a logical interface of data stored in a contextual format on a non-volatile storage media. The method 1100 may be implemented by one or more modules and/or components of the storage module 130, as disclosed herein.

Step 1120 comprises selecting a storage division for recovery, such as an erase block or logical erase block. As described above, the selection of step 1120 may be based upon a number of different factors, such as a lack of available storage capacity, detecting a percentage of data marked as invalid within a particular logical erase block reaching a threshold, a consolidation of valid data, an error detection rate reaching a threshold, improving data distribution, data refresh, or the like. Alternatively, or in addition, the selection criteria of step 1120 may include whether the storage division comprises data in a contextual format that is inconsistent with a corresponding logical interface thereof, as described above.

As disclosed above, recovering (or reclaiming) a storage division may comprise erasing the storage division and relocating valid data thereon (if any) to other storage locations on the non-volatile storage media. Step 1130 may comprise determining whether the contextual format of data to be relocated in a grooming operation should be updated (e.g., is inconsistent with the logical interface of the data). Step 1130 may comprise accessing storage metadata 135, such as the forward map 160, reference map 460, and/or intermediary address space, as described above, to determine whether the persistent metadata (e.g., logical interface metadata) of the data is consistent with the storage metadata 135 of the data. If the persistent metadata is not consistent with the storage metadata 135 (e.g., associates the data with different LIDs, as described above), the flow continues at step 1140; otherwise, the flow continues at step 1150.

Step 1140 may comprise updating the contextual format of the data to be consistent with the logical interface of the data. Step 1140 may comprise modifying the logical interface metadata to reference a different set of LIDs (and/or reference entries), as described above.

Step 1150 comprises relocating the data to a different storage location in a log format that, as described above, preserves an ordered sequence of storage operations performed on the non-volatile storage media. Accordingly, the relocated data (in the updated contextual format) may be identified as the valid and up-to-date version of the data when reconstructing the storage metadata 135 (if necessary). Step 1150 may further comprise updating the storage metadata 135 to bind the logical interface of the data to the new media storage locations of the data, remove indirect and/or reference entries to the data in the inconsistent contextual format, and so on, as disclosed herein.

Figure 12:
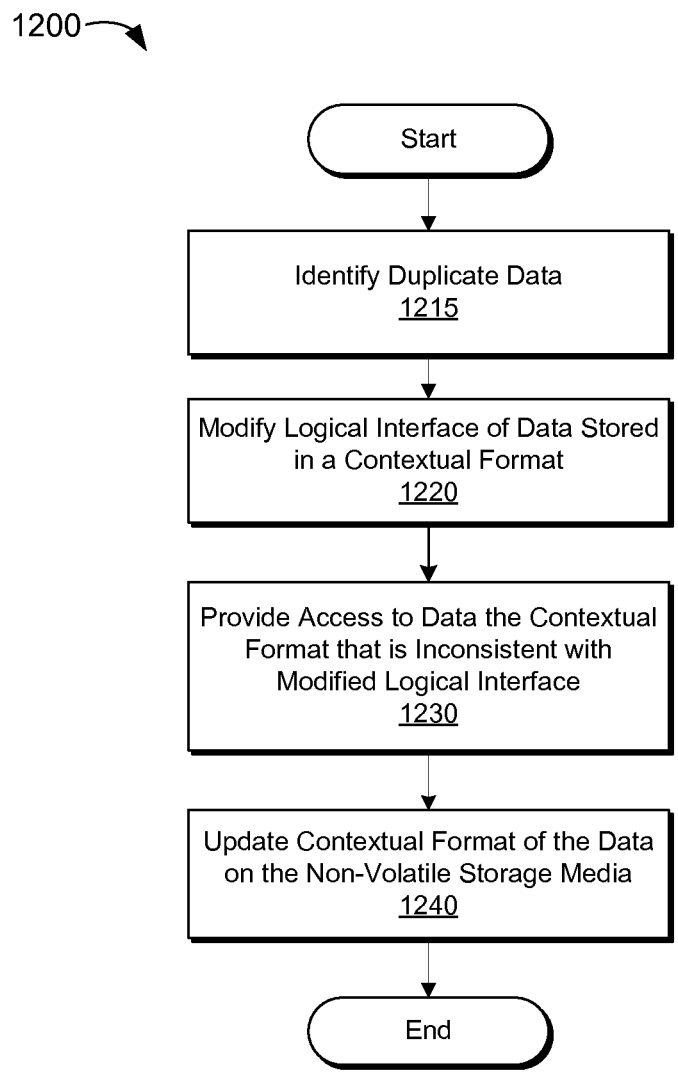
FIG. 12 is a flow diagram of another embodiment of a method for managing a logical interface of contextual data.

FIG. 12 is a flow diagram of another embodiment of a method 1200 for managing logical interfaces of data stored in a contextual format. Step 1215 may comprise identifying duplicate data on one or more storage devices 120. Step 1215 may be performed by a deduplication module 374 operating within the storage module 130. Alternatively, step 1220 may be performed by the storage module 130 as storage operations are performed.

Step 1215 may comprise determining and/or verifying that the storage medium 140 comprises duplicate data (or already comprises data of a write and/or modify request). Accordingly, step 1220 may occur within the path of a storage operation (e.g., as or before duplicate data is written to the storage medium 140) and/or may occur outside of the path of servicing storage operations (e.g., identify duplicate data already stored on the storage medium 140). Step 1220 may comprise generating and/or maintaining data signatures in storage metadata 135 and using the signatures to identify duplicate data.

In response to identifying the duplicate data at step 1215, the storage module 130 (or other module, such as the deduplication module 374) may modify a logical interface of a copy of the data, such that a single copy may be referenced by two (or more) sets of LIDs. The modification to the logical interface at step 1220 may comprise updating storage metadata 135 and/or storing a persistent note on the non-volatile storage media 135, as described above. Step 1220 may further comprise invalidating and/or removing other copies of the data on the non-volatile storage media, as described above.

The contextual format of the data on the storage medium 140 may be inconsistent with the modified logical interface. Therefore, steps 1230 and 1240 may comprise providing access to the data in the inconsistent contextual format through the modified logical interface and updating the contextual format of the data on the storage medium 140, as described above.

Figure 13:
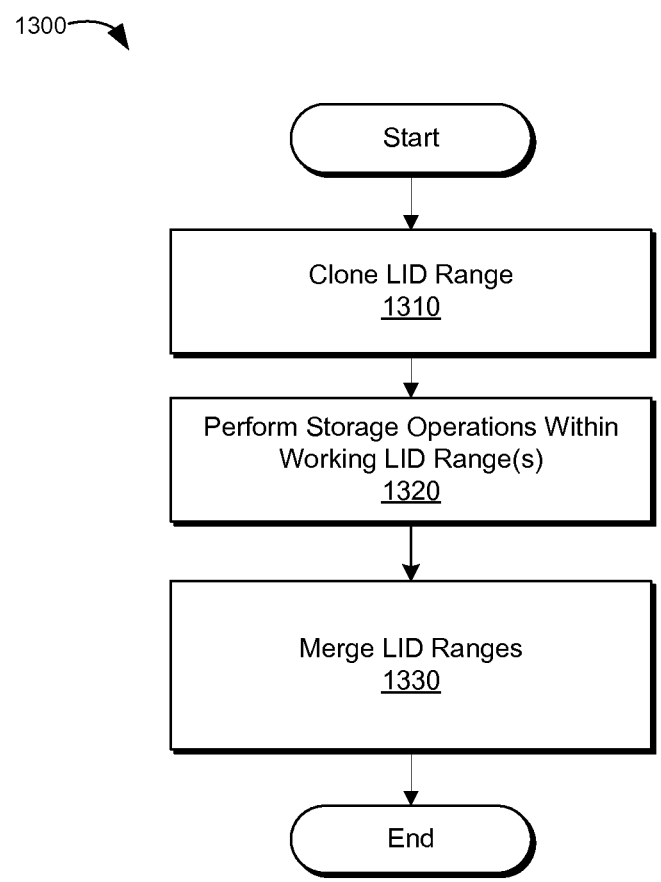
FIG. 13 is a flow diagram of one embodiment of a method for managing range merge operations.

FIG. 13 is a flow diagram of one embodiment of a range merge operation implemented by the storage module 130 disclosed herein. Step 1310 may comprise cloning a set of LIDs within a logical address space 132. Cloning the LIDs may comprise referencing the same set of data on the storage medium 140 (e.g., the same storage locations and/or storage addresses) through two or more different sets of LIDs. The two or more sets may include a working set of LIDs and an original, consistency set of LIDs. The working set of LIDs may be used to perform file modification operations, and the original, consistency set of LIDs may be configured to maintain an original, unmodified state of the data.

As disclosed above, the data cloned at step 1310 may be referenced by a set of LIDs, which may be bound to storage locations of the data on the storage medium 140. Step 1310 may comprise allocating one or more other sets of LIDs within the logical address space 132 and/or within a separate address space. The one or more other sets of LIDs may comprise a logical capacity that is equivalent to the logical capacity of the original set of LIDs (e.g., include the same number of LIDs and/or correspond to the same amount of storage capacity). Step 1310 may further comprise associating and/or binding the logical identifiers of the one or more other sets of LIDs with the same data referenced by the original set of LIDs. Accordingly, step 1310 may comprise modifying the logical interface to the data to associate the data with a two or more different sets of LIDs. In some embodiments, step 1310 comprises allocating one or more sets of LIDs within the logical address space 132, and binding the LIDs to the same set of storage addresses. Alternatively, or in addition, step 1310 may comprise creating one or more reference entries within a reference map 460 to indirectly link the LIDs of the two or more different sets of LIDs to the storage addresses through one or more reference entries, as disclosed in conjunction with FIGS. 4A-E. Alternatively, step 1310 may be implemented by use of one or more intermediate mapping layers (e.g., as disclosed in conjunction with FIGS. 5A-B). Step 1310 may further comprise linking the two or more sets of LIDs through, inter alia, metadata 984 and/or 994 associated with the LIDs. The metadata 984 and/or 994 may be configured to indicate that the LID sets represent clones of the same storage entity (e.g., versions of the same file). The metadata 984 and/or 994 may be further configured to specify and/or reference a merge policy for the two or more sets of LIDs, as disclosed above.

Step 1310 may further comprise storing a persistent note 366 on the storage medium 140 configured to make the clone operation of step 1310 persistent and crash safe. The persistent note 366 may be configured to indicate the modified logical interface of the data (e.g., associate the data with the two or more sets of LIDs), indicate a merge policy of the clone operation, and the like.

Step 1320 may comprise performing storage operations within one or more of different LID ranges of step 1310. The storage operations may be performed in response to requests received through the interface 131 from one or more storage clients 106. The storage operations may comprise appending data to the storage medium 140. The storage operations may, therefore, comprise modifying the associations and/or bindings between LIDs in one or more of LID sets and storage locations on the storage medium 140. Modifying the associations and/or bindings may further comprise mapping LIDs in one or more of the LID sets to the appended data directly and/or through one or more indirect references and/or mapping layers.

Step 1330 may comprise merging the LID sets, as disclosed above. Merging LID sets may comprise incorporating modifications made in one of the LID ranges into one or more of the LID sets, as disclosed above. Step 1330 may further comprise resolving one or more merge conflicts in accordance with a merge policy. In some embodiments, merging comprises deleting (e.g., invalidating) one or more of the LID sets, which may comprise removing entries from the forward map 160, removing shared references to storage locations from a reference count data structure, removing reference entries from a reference map 460, removing references in an intermediate mapping layer, and/or the like. Step 1330 may further comprise modifying a logical interface of the merged data, as disclosed above. The modified logical interface may update the LIDs used to reference data that was originally stored in reference to one or more of the LID sets. The modified logical interface may be inconsistent with the contextual format of the data on the storage medium 140. Therefore, step 1330 may comprise appending one or more persistent notes 366 on the storage medium 140 to associate merged data with an updated logical interface of the data (e.g., associate data originally stored in association with LIDs in the second set with LIDs in the first set). Step 1330 may further comprise providing access to the data in the inconsistent contextual format and/or updating the contextual format of the data in one or more background operations, as disclosed above.

Figure 14:
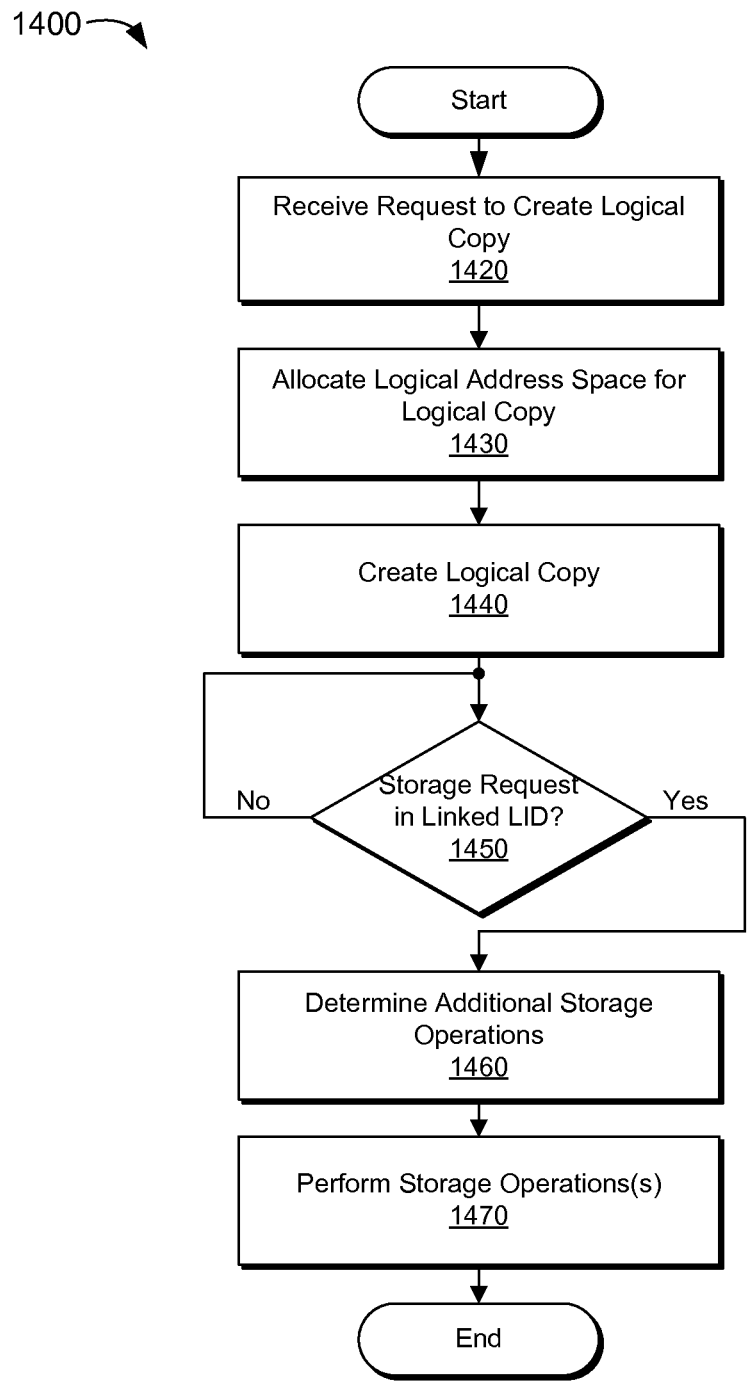
FIG. 14 is a flow diagram of another embodiment of a method for managing range clone operations.

FIG. 14 is a flow diagram of another embodiment of a method 1400 for range merge operations. Step 1420 may comprise receiving a request to create a logical copy of a LID range. The request may be received from a storage client 106 through an interface 131 and/or may be part of a higher-level API provided by the storage module 130. The request may include an "operational mode" of the clone, which may include, but is not limited to, how the clones are to be synchronized, if at all; how merging is to occur (merge policy); whether the logical copy is to be designated as ephemeral; and so on.

Step 1430 may comprise allocating LIDs in the logical address space 132 to service the request. The allocation of step 1430 may further comprise reserving physical storage space to accommodate changes to the cloned LID range. The reservation of physical storage space may be predicated on the operational mode of the clone. For instance, if all changes are to be synchronized between the clone and the original address range, a small portion (if any) of physical storage space may be reserved. Alternatively, the storage module 130 may reserve additional physical storage capacity for logical copy operations having a copy-on-conflict merge policy. Step 1430 may further comprise allocating the clone within a designated portion or segment of the logical address space 132 (e.g., a range dedicated for use with logical copy and/or clone operations). Accordingly, step 1430 may comprise allocating a second, different set of LIDs to clone a first set of LIDs.

Step 1440 may comprise updating the logical interface of data corresponding to the clone to reference both the original LIDs bound to the data as well as the cloned LIDs allocated at step 1430. Step 1440 may comprise storing a persistent note 366 on the storage medium 140, as disclosed above.

Step 1450 comprises receiving a storage request and determining if the storage request pertains to a LID in the first and/or second sets (cloned LID range). If so, the flow continues at step 1460; otherwise, the flow remains on step 1450.

Step 1460 may comprise determining what (if any) operations are to be taken on the other associated LID ranges (e.g., synchronize allocation operations, etc.). The determination of step 1460 may comprise accessing metadata 984 and/or 994, which may comprise and/or reference the synchronization policy of the clone.

Step 1470 may comprise performing the operations (if any) determined at step 1460 along with the requested storage operation. If one or more of the synchronization operations cannot be performed (e.g., additional logical address space 132 for one or more of the clones cannot be allocated), the underlying storage operation may fail.

Figure 15:
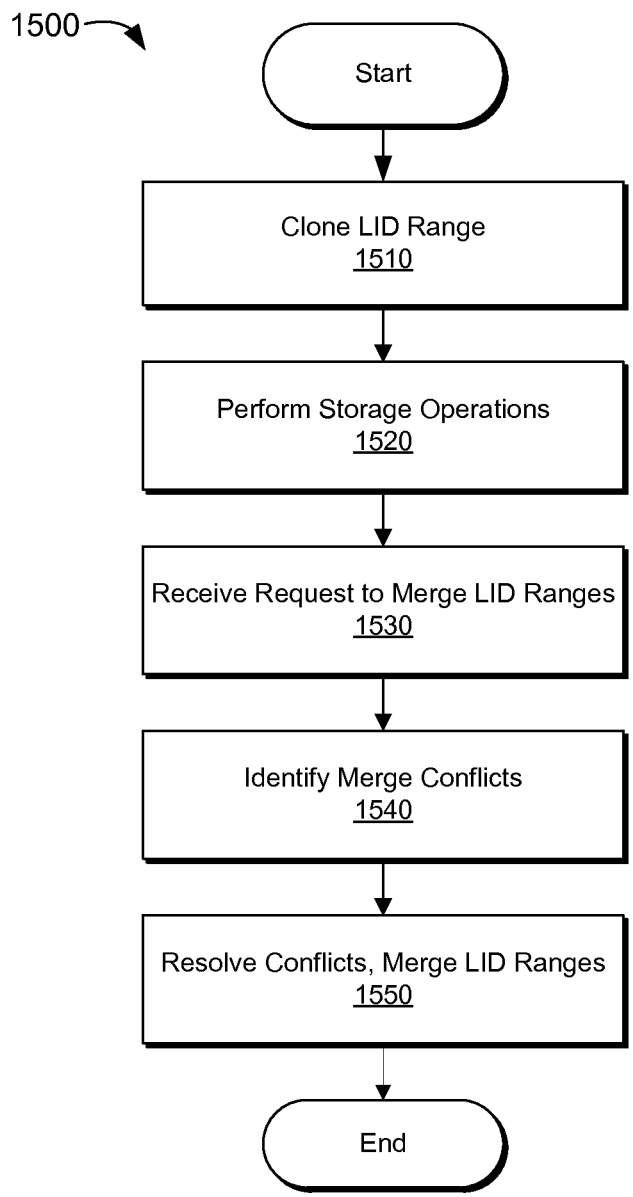
FIG. 15 is a flow diagram of another embodiment of a method for managing range merge operations.

FIG. 15 is a flow diagram of another embodiment of a method 1500 for implementing range clone and/or range merge operations. Step 1510 may comprise cloning a LID range, as disclosed above. Step 1510 may comprise cloning a set of LIDs associated with data stored on the storage medium 140 at respective storage addresses. Step 1510 may, therefore, comprise associating two or more different sets of LIDs with the same set of storage locations (e.g., the same data). Step 1510 may further comprise storing one or more persistent notes 366 on the storage medium 140 and/or rewriting the data in an updated contextual format, as disclosed above. Step 1510 may include linking the two or more sets of LIDs through, inter alia, metadata 984 and/or 994. The metadata 984 and/or 994 may comprise and/or reference a clone synchronization policy, merge policy, and/or the like, as disclosed above.

Step 1520 may comprise performing storage operations in reference to one or more of the two or more cloned LID ranges. Step 1520 may comprise synchronizing allocation operations between the cloned ranges. The storage operations of step 1520 may comprise appending data to the storage medium 140 and/or associating the appended data with LIDs of one or more of the different LID ranges.

Step 1530 comprises receiving a request to merge the two or more LID ranges of step 1510. The merge request may be received through the interface 131 and/or may be part of another, higher-level operation, such as an atomic storage operation or the like.

Step 1540 may comprise identifying merge conflicts between the two or more sets of LIDs (if any). Identifying merge conflicts may comprise identifying LIDs that were modified within more than one of the two or more cloned LID ranges. Referring back to FIG. 9C, step 1540 may comprise identifying a merge conflict in state 941D in response to determining that the LIDs 072-073 in range 914 were modified, as were the corresponding LIDs 972-973 in range 924. As such, step 1540 may comprise comparing modifications within the LID clones to identify cases where conflicting modifications would map to the same LID in the merge operation.

Step 1550 may comprise resolving merge conflicts identified at step 1540. Step 1550 may comprise determining an applicable merge policy, which, as disclosed above, may determine how merge conflicts are to be resolved. The merge policy may specify which version of a LID is included in the merged LID range and/or whether conflicts are resolved by maintaining separate copies of the LID ranges. Step 1550 may further comprise merging the LID ranges in accordance with the resolved merge conflicts, as disclosed above.

Figure 16A:
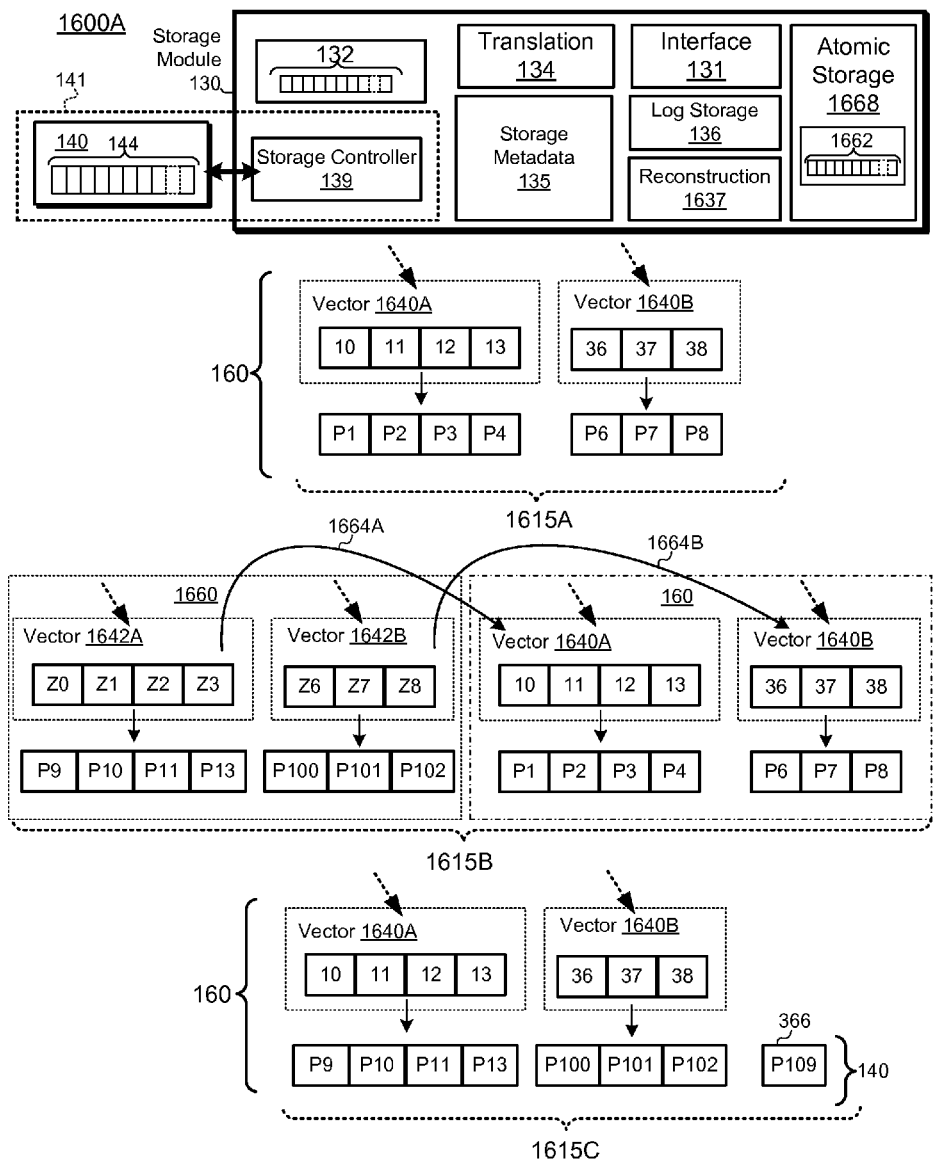
FIG. 16A depicts one embodiment of a system comprising a storage module configured to implement atomic storage operations.

The storage module 130 may be further configured to implement efficient atomic storage operations. FIG. 16A is a block diagram of one embodiment of a system 1600A comprising a storage module 130 configured to implement atomic storage operations. As used herein, an atomic storage operation refers to a storage operation that is either fully completed as a whole or is rolled back. Accordingly, atomic storage operations may not be partially completed; the storage module 130 may be configured to invalidate and/or remove data of incomplete atomic storage operations. Implementing atomic storage operations, and particularly atomic storage operations comprising multiple steps and/or pertaining to multiple different identifier ranges or I/O vectors, may impose high overhead costs. For example, some database systems implement atomic storage operations using multiple sets of redundant write operations.

The storage module 130 may comprise a transaction module 1636 configured to implement storage transactions. The transaction module 1636 may comprise an atomic storage module 1668 to leverage the range clone, range move, and/or other operations disclosed herein to increase the efficiency of atomic storage operations. In some embodiments, the interface 131 provides APIs and/or interfaces for performing vectored atomic storage operations. A vector may be defined as a data structure, such as:

```
struct iovect {
    uint64 iov_base;   // Base address of memory region for input or output
    uint32 iov_len;    // Size of the memory referenced by iov_base
    uint64 dest_lid;   // Destination logical identifier
}
```

The iov_base parameter may reference a memory or buffer location comprising data of the vector, iov_len may refer to a length or size of the data buffer, and dest_lid may refer to the destination logical identifier(s) for the vector (e.g., base logical identifier with the length of the range being implied and/or derived from the input buffer iov_len).

A vector storage request to write data to one or more vectors may, therefore, be defined as follows:

```
vector_write (
  int fileids,
  const struct iovect *iov,
  uint32 iov_cnt,
  uint32 flag)
```

The vector write operation above may be configured to gather data from each of the vector data structures referenced by the *iov pointer and/or specified by the vector count parameter (iov_cnt) and write the data to the destination logical identifier(s) specified in the respective iovect structures (e.g., dest_lid). The flag parameter may specify whether the vector write operation should be implemented as an atomic vector operation.

As illustrated above, a vector storage request may comprise performing the same operation on each of a plurality of vectors (e.g., implicitly perform a write operation pertaining to one or more different vectors). In some embodiments, a vector storage request may specify different I/O operations for each constituent vector. Accordingly, each iovect data structure may comprise a respective operation indicator. In some embodiments, the iovect structure may be extended as follows:

```
struct iovect {
  uint64 iov_base;   // Base address of memory region for input or output
  uint32 iov_len;    // Size of the memory referenced by iov_base
  uint32 iov_flag;   // Vector operation flag
  uint64 dest_lid;   // Destination logical identifier
}
```

The iov_flag parameter may specify the storage operation to perform on the vector. The iov_flag may specify any suitable storage operation, which includes, but is not limited to, a write, a read, an atomic write, a trim or discard request, a delete request, a format request, a patterned write request (e.g., a request to write a specified pattern), a write zero request, or an atomic write operation with verification request, allocation request, or the like. The vector storage request interface described above may be extended to accept vector structures:

```
vector_request(
  int fileids,
  const struct iovect *iov,
  uint32 iov_cnt,
  uint32 flag)
```

The flag parameter may specify whether the vector operations of the vector_request are to be performed atomically. Further embodiments of atomic storage operations are disclosed in U.S. patent application Ser. No. 13/725,728, entitled, "Systems, Methods, and Interfaces for Vector Input/Output Operations," filed on Dec. 21, 2012 for Ashish Batwara et al., and which is hereby incorporated by reference.

The transaction module 1636 may comprise an atomic storage module 1668 configured to implement atomic storage operations within the storage module 130. The atomic storage module 1668 may be configured to implement storage operations of an atomic storage request in reference to a different set of identifiers than the target or destination identifiers of the request. After the atomic storage operations are complete, the atomic storage module 1668 may be configured to move the data to the respective target or destination identifier(s) of the atomic storage request, as disclosed herein.

In some embodiments, the atomic storage module 1668 implements atomic storage operations directed to a first set of logical identifiers in reference to a second set of identifiers. The second set of identifiers may be considered to be ephemeral, temporary, working, or in-process identifiers. The second set of identifiers may not be directly accessible to storage clients 106. The second set of identifiers may correspond to a particular region of the logical address space 132, a particular virtual address space (e.g., a VAS 532), a separate namespace, and/or the like. After completing the storage operations of the atomic storage request, the atomic storage module 1668 may implement a range move operation configured to associate data of the atomic storage request with the first set of identifiers. The data may be dis-associated from the second set of identifiers. As above, the second set of identifiers may be distinguishable from LIDs of the logical address space 132 and/or VIDs of a VAS 532. In the event of a failure condition, the reconstruction module 1637 may identify data bound to such identifiers as pertaining to failed transactions (e.g., incomplete atomic storage operations). The identified data may be invalidated during metadata reconstruction operations and/or corresponding entries may be omitted from the storage metadata 135 (e.g., omitted from the forward map 160, VAS forward map 560, reference map 460, and/or the like).

In some embodiments, the atomic storage module 1668 implements atomic storage operations within a separate address space, such as the transaction address space 1662 of FIG. 16A. Although FIG. 16A describes use of a transaction address space 1662 the disclosure is not limited in this regard, and could be adapted to use any suitable address range and/or namespace including, but not limited to, a portion of the logical address space 132 (e.g., a range, extent, and/or set of LIDs), a portion of a VAS 532, a reference map 460, an intermediate address space, and/or the like. The identifiers of the transaction address space 1662 (transactional identifiers) may not be directly accessible to the storage clients 106.

The atomic storage module 1668 may perform atomic storage operations in reference to the transaction address space 1662, and, after the atomic storage operations are complete, may perform an atomic range move operation configured to move data of the atomic storage operations from the transaction address space 1662 into the logical address space 132 (or other destination or target namespace, such as a particular VAS 532). The atomic range move operation may include updating bindings within the forward map 160, writing metadata to the storage medium 140 (e.g., appending a persistent note 366 to the log), and/or the like, as disclosed herein.

In the FIG. 16A embodiment, a storage client 106 issues an atomic storage request pertaining to vectors 1640A and 1640B within the logical address space 132. As illustrated in FIG. 16A, the vectors 1640A and 1640B may correspond to existing entries within the forward map 160. Before the atomic storage operation is implemented (at state 1615A), the LIDs 10-13 of vector 1640A may be bound to storage addresses P1-P4 and the LIDs 36-38 of vector 1640B may be bound to storage addresses P6-8. In other embodiments, the atomic storage request may pertain to LIDs that are not allocated and/or are not yet bound to storage addresses and, as such, do not have corresponding entries within the forward map 160 (and/or other mapping layers).

In response to the atomic storage request, the atomic storage module 1668 may access a second set of identifiers within the transaction address space 1662, by use of, inter alia, a redirection module 1634. The redirection module 1634 may be configured to allocate the second set of identifiers within the transactional address space 1662. The transactional identifiers may be used to implement portions of the atomic storage request (e.g., track in-process portions of the atomic storage operations). The redirection module 1634 may be further configured to link the second set of identifiers to the first set of LIDs (e.g., the target LIDs of the atomic storage request) by use of, inter alia, the storage metadata 135, entries within the forward map 160 and/or other index metadata, and/or the like. In some embodiments, the atomic storage module 1668 may be further configured to perform range clone operation(s) configured to bind the second set of identifiers to the same storage addresses as the first set of identifiers (vectors 1640A and 1640B), as disclosed herein.

As illustrated in state 1615B, the redirection module 1634 may allocate a second set of identifiers comprising vectors 1642A and 1642B, which include transactional identifiers Z0-3 and Z6-8. Bindings between transactional identifiers and storage locations may be maintained in the storage metadata using, inter alia, an intermediate mapping layer, such as the transaction map 1660. The transaction map 1660 may comprise mappings between transactional identifiers and LIDs of the logical address space 132 (and/or VIDs of a VAS 532). In the FIG. 16A embodiment, the transaction map 1660 comprises links 1664A between the transactional identifiers of vector 1642A and corresponding LIDs of vector 1640A (LIDs 10-13). The transaction map 1660 further includes links 1664B between the transactional identifiers of vector 1642B and LIDs 36-38 of vector 1640B. The transaction map 1660 may further include bindings between transactional identifiers and storage locations. State 1615B depicts range clone operation(s) in the transaction map 1660, including bindings between transactional identifiers of vector 1642A and the storage locations P1-4 of the LIDs in vector 1640A, and bindings between transactional identifiers of vector 1642B and the storage locations P6-8 of the LIDs in vector 1640B.

The atomic storage module 1668 may implement atomic storage operations of the atomic storage request within the transaction address space 1662, which may comprise redirecting storage operations from the first set of LIDs (vectors 1640A and/or 1640B) to the second set of identifiers (the transactional identifiers of vectors 1642A and 1642B). Redirecting the storage operations may comprise translating references to LIDs in the atomic storage request to the second set of transactional identifiers by use of, inter alia, the transaction map 1660. For example, a storage operation pertaining to LID 10 may be redirected to transactional identifier Z0 based on the mappings 1664A of the transaction map 1660. Storage operations configured to allocate logical capacity may be redirected to (and maintained within) the transactional address space 1662. For example, a request to extend the vector 1640A to include LIDs 14-20 may comprise: a) allocating the LIDs in the logical address space 132, b) allocating corresponding transactional identifiers in the transactional address space 1662, and c) linking the allocated transactional identifiers and LIDs in the transaction map 1660. A request to TRIM LIDs may comprise marking the corresponding identifiers as invalid in the transaction map 1660. The corresponding LIDs in the logical address space 132 may be TRIMed in response to the range move operation performed upon completion of the atomic storage operations, as disclosed in further detail herein.

As illustrated in state 1615C, the storage operations of the atomic storage request may comprise appending data to the storage medium 140 at storage locations P9-13 and P100-102. The corresponding storage operations may be redirected to the transactional address space 1662, as disclosed herein. Accordingly, the data of the atomic storage request may be associated with the transactional identifiers Z0-3 and Z6-8, which may comprise: a) binding the storage locations P9-13 and P100-102 to the transactional identifiers Z0-3 and Z6-8 in the transaction map 1660, and b) storing the data at P9-13 and P100-102 with persistent metadata 114 configured to associate the data with respective transactional identifiers Z0-3 and Z6-8.

Other storage operations may be performed concurrently with and/or interleaved within the atomic vector operations. Accordingly, data of the atomic storage request need not be stored at contiguous storage locations within the storage address space 144 of the storage medium 140. Data of the atomic storage request may be distinguished from other data that is not related to the atomic storage request based on, inter alia, the bindings between the data at storage locations P9-10 and P100-102 and the transactional identifiers Z0-3 and Z6-8.

As further illustrated at state 1615C, the original, unmodified state of the LIDs in vectors 1640A and 1640B may be unchanged while the atomic storage operation(s) are in progress; the data at storage locations P1-4 and P6-8 may remain on the storage medium 140, and the bindings between the original, unmodified data and the LIDs 10-13 and 36-38 may be maintained within the forward map 160. Therefore, the original, unmodified data corresponding to the vectors 1640A and 1640B may be maintained in a consistent state while the atomic storage operation(s) are being performed, and may be preserved regardless of failures in the atomic storage operation(s).

Completion of the atomic storage operation may comprise merging the contents of the transactional address space 1662 into the logical address space 132. As illustrated in state 1615C, after completing the atomic storage operations in the transactional address space, the atomic storage module 1668 may perform a range move operation to modify the logical interface of the data at P9-13 and P100-102 to bind the data to the first set of LIDs (the destination LIDs of vectors 1640A and 1640B). The range move operation may comprise updating the forward map 160 to associate LIDs 10-13 of vector 1640A with storage locations P9-13 and to associate LIDs 36-38 of vector 1640B with storage locations P100-102. The range move operation may further comprise storing a persistent note 366 on the storage medium 140 to bind the storage address P9-P13 to LIDs 10-13 and P100-102 to LIDs 36-38, as disclosed herein. The range move operation may be implemented in other ways including, but not limited to, the reference entry embodiments of FIGS. 4A-E and/or the intermediary mapping embodiments of FIGS. 5A-B. The range move operation may also include rewriting the data in a contextual format that is consistent with the updated logical interface, which may comprise rewriting the data with persistent metadata 114 configured to associate the data with the first set of LIDs (e.g., LIDs 10-13 and/or 36-38 of the logical address space 132, respectively). The data may be rewritten in one or more background operations, as disclosed herein.

The atomic storage module 1668 may be configured to acknowledge completion of the atomic storage request in response to completion of the range move operation.

Accordingly, completion may be acknowledged in response to storing the persistent note 366 and/or placing the persistent note 366 in a write buffer (and/or a power-cut safe domain of the storage device 141). Completion of the atomic storage request may further comprise deallocating the transactional identifiers used to implement the atomic storage request.

In some embodiments, the range move operation may further comprise modifying LID allocations within the logical address space 132. As disclosed above, an atomic storage operation may comprise a request to allocate LIDs within the logical address space 132. Implementing such an operation may include: a) allocating the requested LIDs (or alternative LIDs) within the logical address space 132, b) allocating corresponding transactional identifiers in the transactional address space 1662, and c) linking the LIDs to the transactional identifiers, as disclosed herein. The range move operation may comprise removing the transactional identifiers and/or moving data associated with the corresponding transactional identifiers to the allocated LIDs, as disclosed herein. Implementing an operation to TRIM one or more LIDs may comprise marking the corresponding transactional identifier(s) as invalid in the transaction map 1660. The corresponding range move operation may comprise TRIMing the LIDs mapped to the transactional identifiers by, inter alia, removing the LIDs from the forward map 160 and/or storing persistent metadata indicating that the LIDs have been removed. In the FIG. 16A embodiment, an atomic storage request comprising a request to TRIM LID 12 may comprise invalidating transactional identifier Z2 in the transaction map 1660. Invalidating the transactional identifier Z2 may comprise retaining an entry representing the transactional identifier Z2 in the transaction map 1660, and marking the entry as invalid, deleted, TRIMed, or the like. Completing the atomic storage request may comprise: a) invalidating the LID mapped to the transactional identifier Z2 (e.g., invalidating the entry corresponding to LID 12 in the forward map 160 and/or other storage metadata 135), and/or b) configuring the persistent note 366 to TRIM the LID 12 (e.g., indicate that the data at the storage location(s) bound to LID 12 do not need to be retained on the storage medium 140).

In some embodiments, the storage module 130 may further comprise a reconstruction module 1637 configured to reconstruct the storage metadata 135 from the contents of the storage log. The reconstruction module 1637 may reconstruct the storage metadata 135 in response to a failure condition resulting in loss to and/or corruption of the storage metadata 135. The reconstruction module 1637 may be configured to traverse physical storage locations within the storage address space 144 in a log-order (e.g., from newest to oldest or vice versa). The reconstruction module 1637 may access the persistent metadata 114 of the storage log to reconstruct, inter alia, the LID to storage address associations of the forward map 160.

In response to a failure of the atomic storage operation of FIG. 16A, the reconstruction module 1637 may be configured to reconstruct the vectors 1640A and 1640B based on the contents of P1-4 and P6-8, respectively. The reconstruction module 1637 may recognize that the data stored at P9-13 and/or P100-102 pertains to an incomplete atomic storage request based on the association of the data with the identifiers Z0-3 and Z6-9 of the in-process address space 1662. The reconstruction module 1637 may, therefore, omit the entries from the forward map 160 and invalidate data at the corresponding storage locations. Alternatively, the reconstruction module 1637 may reconstruct corresponding entries in the transaction map 1660 such that the partial atomic storage request can be completed (e.g., resume from the point of failure as opposed to restarting the atomic storage operation from scratch).

The reconstruction module 1637 may be further configured to identify data pertaining to a completed atomic storage request. When reconstructing the storage metadata 135 after successful completion of the atomic storage request of FIG. 16A, the reconstruction module 1637 may determine that the physical storage locations P9-13 and P100-102 correspond to LIDs of the logical address space 132 (and are the result of a successful atomic storage request) based on the persistent note 366 stored at storage location 109. As disclosed above, the persistent note 366 may comprise persistent metadata configured to associate the data at P9-13 and P100-102 with the LIDs of vectors 1640A and 1640B. Accordingly, the reconstruction module 1637 may be further configured to reconstruct the associations of state 1615C by use of the persistent note 366 regardless of whether the corresponding data has been rewritten in an updated contextual format.

Figure 16B:
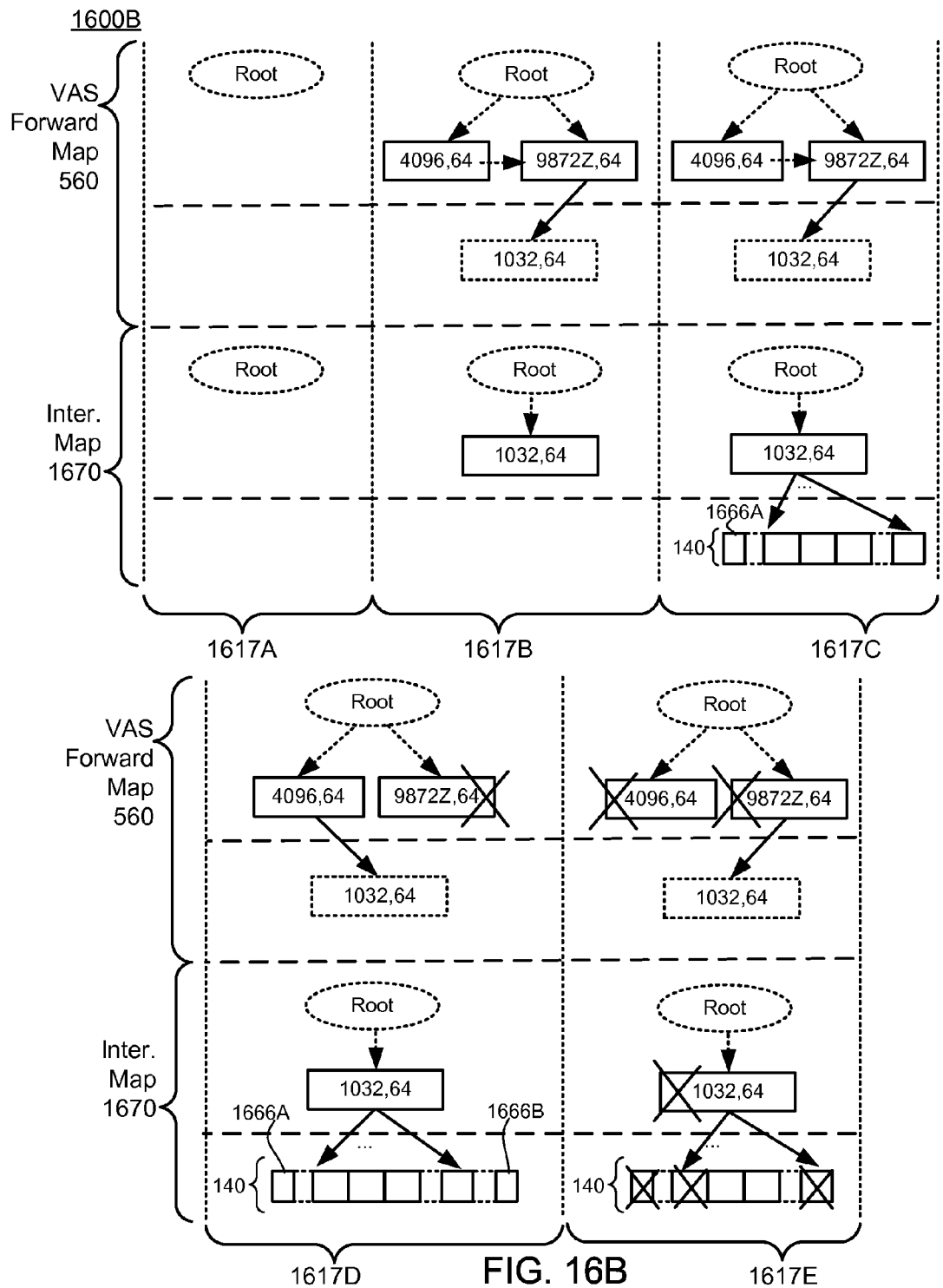
FIG. 16B depicts embodiments of atomic storage operations.

FIG. 16B depicts further embodiments 1600B of atomic storage operations implemented by use of, inter alia, the storage module 130 and aggregation module 530 disclosed herein. At state 1617A, an atomic storage operation pertaining to a first set of VIDs may be received. As illustrated in state 1617A, the target VIDs of vectors 4096, 64 (4096-4159) may not correspond to existing VID allocation(s) and/or data. Accordingly, the VAS forward map 560 may not include entries corresponding to VIDs 4096-4159 and/or entries within the intermediate map 1670.

As illustrated in state 1617B, in response to the atomic storage request, the atomic storage module 1668 may be configured to allocate VIDs corresponding to the atomic storage request (entries 4096,64). If the requested entries are not available (e.g., are already allocated to another client and/or existing data), the atomic storage request may fail. Alternatively, the atomic storage module 1668 may allocate a different set of VIDs to implement the atomic storage request, which may be returned to the storage client 106 upon completion of the atomic storage request.

The redirection module 1634 may be configured to allocate temporary, in-process identifiers 9872Z,64 corresponding to the VIDs 4096,64. As with the transactional identifiers disclosed herein, the in-process identifiers 9872Z,64 may correspond to a different namespace than the target VIDs (e.g., a transactional address space 1662), a particular region of the VAS 560, a separate VAS 560, and/or the like. The redirection module 1634 may be configured to link the VIDs 4096,64 to the in-process identifiers 9872Z,64 by use of, inter alia, metadata of respective entries within the VAS forward map 560 (and/or other storage metadata 135) and/or by use of a transaction map 1660 (or in-process index). Binding the transactional identifiers 9872Z,64 to the intermediate identifiers 1032,64 may comprise appending a persistent note 1666A to the storage medium 140. The persistent note 1666A may comprise persistent metadata configured to associate the in-process identifiers with the intermediate identifiers 1032,64.

In state 1617C, the atomic storage module 1668 may be configured to implement the storage operations corresponding to the atomic storage request in reference to the in-process identifiers, which may comprise redirecting (and/or translating) VIDs of the atomic storage request to corresponding in-process identifiers. The storage operations may comprise appending data to the storage medium 140 by use of, inter alia, the log storage module 137. The in-process identifiers 9872Z,64 may be bound to the appended data through the intermediate mapping layer 1670 (identifiers 1032,64) and/or the persistent note 1666A. The data appended to the storage log may comprise persistent metadata 114 configured to bind the data of the atomic storage operation to respective intermediate identifiers 1632,64. The persistent metadata 114 may further comprise a flag, or other indicator, configured to identify the data as part of an atomic storage request.

Completion of the atomic storage request may comprise a range move operation configured to modify the logical interface of the appended data to bind the data to the destination VIDs of the atomic storage request (VIDs 4096, 64). After completing the storage operations of the atomic storage request, the atomic storage module 1668 may implement the range move operation by, inter alia: a) updating the VAS forward map 560 to associate the target VIDs 4096,64 with the intermediate entry 1032,64, and b) removing the mapping between the in-process identifiers 9872Z,64 and the intermediate entry 1032,64.

The range move operation may further comprise deallocating the in-process identifiers 9872Z,64 (e.g., removing entries and/or corresponding metadata from an in-process index 1660, as disclosed above). As illustrated in state 1617D, the range move operation may further comprise appending another persistent note 1666B to the storage medium 140, which may be configured to identify the modified logical interface of the appended data. The persistent note 1666B may bind the intermediate entry 1032,64 to the destination VID range 4096,64. The persistent note 1666B may further indicate that the atomic storage operation was successfully completed. The atomic storage module 1668 may be configured to acknowledge completion of the atomic storage request in response to storing the persistent note 1666B on the storage medium 140 (and/or scheduling the persistent note 1666B for storage within, e.g., a power-cut safe domain).

As disclosed above, in some embodiments, the range move operations implemented by the atomic storage module 1668 may comprise modifications to the target namespace (e.g., logical address space 132). In one embodiment, for example, an atomic storage request may comprise a request to TRIM an I/O vector. Implementing the atomic storage request may comprise storing a persistent note 366 within the storage log configured to TRIM a corresponding in-process or transactional identifier(s), as disclosed above. The range move operation may comprise implementing the TRIM operation within the target namespace. The TRIM operation may comprise configuring the persistent note 1666B to TRIM the target I/O vector and/or moving the stored TRIM command to the target I/O vector, as disclosed herein.

The persistent note 1666B may be used by the reconstruction module 1637 to rebuild the storage metadata 135 in the event of a failure condition, as disclosed above. The reconstruction module 1637 may rebuild the bindings of the intermediary map 1670 and/or the VAS forward map 560. In state 1617D, the reconstruction module 1637 may reconstruct the associations between intermediate identifiers 1032,64 and the corresponding storage addresses by use of the persistent metadata 114 stored with the corresponding data segments within the log (e.g., within respective packet headers). The reconstruction module 1637 may be further configured to associate the intermediate addresses 1032,64 with the VIDs 4096,64 by use of the persistent note 1666B.

As illustrated in state 1617E, the reconstruction module 1637 may identify data of a failed atomic storage operation in response to determining that a persistent note 1666B indicating completion of the atomic storage request does not exist on the storage medium 140. The reconstruction module 1637 may determine that the appended data was part of an incomplete, failed atomic storage request in response to identifying data that is bound to intermediate identifiers 1032,64 that are: a) bound to in-process identifiers 9872Z,64 and/or b) marked as atomic (in respective persistent metadata 114). In response, the reconstruction module 1637 may: a) remove and/or omit the entry 1032,64 from the intermediate map 1670, b) remove and/or omit the entries 4096,64 and/or 9872Z,64 from the VAS forward map 560, and/or c) invalidate the corresponding data on the storage medium 140.

Figure 17:
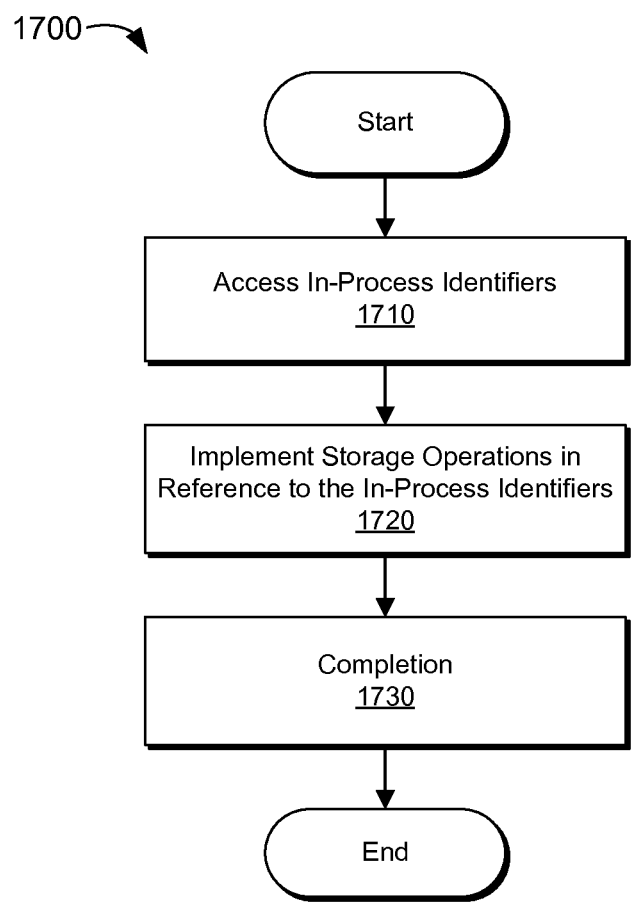
FIG. 17 is a flow diagram of one embodiment of a method atomic storage operations.

FIG. 17 is a flow diagram of one embodiment of a method 1700 for implementing atomic storage operations. Step 1710 may comprise accessing a second set of identifiers corresponding to a first set of identifiers of an atomic storage request. Step 1710 may be performed in response to an atomic storage request pertaining to the first set of identifiers (e.g., target LIDs, VIDs, or the like). The first set of identifiers may correspond to existing data stored on the storage medium 140. Alternatively, the atomic storage request may comprise a request to allocate some (or all) of the first set of identifiers within the logical address space 132 or VAS 532. The atomic storage request may correspond to a plurality of storage operations pertaining to different, disjoint vectors of LIDs and/or VIDs. Accordingly, the first set of identifiers may comprise a plurality of disjoint I/O vectors.

In some embodiments, step 1710 comprises allocating identifiers corresponding to the first set of identifiers in a separate address space, such as a transactional address space 1662, intermediate map 1670, VAS 532, or the like. Alternatively, step 1710 may comprise allocating identifiers within a particular range or region of the logical address space 132. Step 1710 may comprise allocating a corresponding set of identifiers of the same amount and/or logical capacity as the first set of identifiers. The second set of identifiers may be accessed and/or allocated by use of, inter alia, the redirection module 1634, as disclosed herein. Step 1710 may further include linking the first and second sets of identifiers by use of, inter alia, a transaction map 1660, as disclosed herein.

Step 1710 may further comprise implementing a range clone operation to bind the second set of identifiers to data of the first set of identifiers (if any). The range clone operation may be implemented using any of the embodiments disclosed herein, including, but not limited to, the range clone embodiments of FIGS. 3A-E, the reference entry embodiments of FIGS. 4A-E, and/or the intermediate mapping layer embodiments of FIGS. 5A-B.

Step 1720 may comprise implementing storage operations of the atomic storage request in reference to the second set of identifiers accessed at step 1710. Step 1720 may comprise redirecting storage operations from the first set of identifiers to the second set of identifiers (e.g., translating between the first and second sets of identifiers, as disclosed herein). The storage operations of step 1720 may comprise storing data on the storage medium 140 by use of, inter alia, the log storage module 137. The storage operations of step 1720 may include, but are not limited to, a) operations to allocate storage resources (e.g., operations to allocate logical and/or physical storage resources), b) operations to deallocate storage resources (e.g., TRIM, persistent TRIM, and/or the like), c) writing data to the storage log, d) modifying existing data stored on the storage medium 140, e) overwriting data stored on the storage medium 140, and/or the like. The log storage module 136 may be configured to implement the storage operations out-of-place within the storage address space 144, such that operations configured to modify, overwrite, and/or replace existing data stored on the storage medium 140 are appended to the storage log, while the data to be modified, overwritten, and/or replaced by the appended data remains unchanged on the storage medium 140.

Data written to the storage medium 140 at step 1720 may comprise persistent metadata 114 configured to indicate the logical interface of the data. The persistent metadata 114 may be configured to bind the data to the second set of identifiers accessed at step 1710. Alternatively, or in addition, the persistent metadata 114 may be configured to bind the appended data to identifiers of an intermediate address space, which are bound to the second set of identifiers through, inter alia, a persistent note 366 stored within the storage log. In some embodiments, the persistent metadata 114 may be further configured to indicate that the data is part of an atomic storage operation. Alternatively, or in addition, the data may be identified as part of an atomic storage operation by use of the persistent metadata 114 (e.g., through association between the data and the second set of identifiers).

Step 1730 may comprise completing the atomic storage request. Completion of the atomic storage request may comprise a range move operation configured to move the data of the storage operations implemented in step 1720 in reference to the second set of identifiers to the first set of target identifiers. The range move operation may be completed in a single, atomic write operation. The single atomic write operation may comprise an operation to store persistent metadata on the storage medium 140 (e.g., a persistent note 366 and/or 1666B). The persistent metadata may be configured to modify the logical interface of the data written at step 1720 to bind the data to the first set of identifiers (e.g., the target LIDs or VIDs of the atomic storage request). The persistent metadata may be configured to modify the logical interface of a plurality of different storage vectors (e.g., a plurality of different, discontiguous sets of identifiers). Step 1730 may further comprise updating storage metadata 135 to reference the appended data through the first set of identifiers, which may comprise modifying one or more mappings in the forward map 160, reference map 460, intermediate mapping layer 1670, and/or the like.

Step 1730 may further comprise rewriting the data stored at 1720 in a contextual format that is configured to associate the data with the first set of logical identifiers. The data may be rewritten in one or more background storage operations. The storage module 130 and/or aggregation module 530 may provide access to the data through the first set of identifiers before the data is rewritten.

Step 1730 may further comprise acknowledging completion of the atomic storage request. Completion may be acknowledged in response to storing the persistent metadata (persistent note 366 and/or 1666B) on the storage medium 140 and/or determining that, within a reasonable certainty, the persistent metadata will be stored on the storage medium 140.

Figure 18:
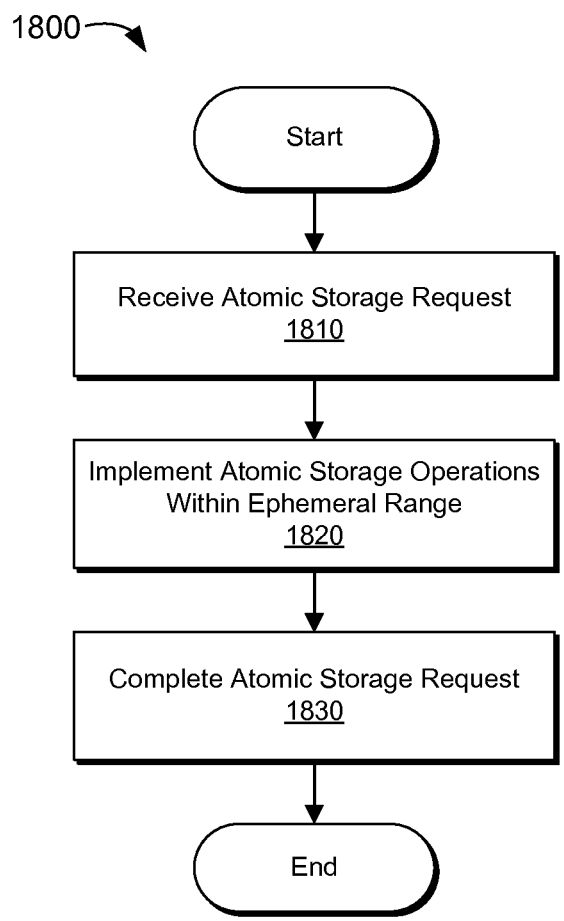
FIG. 18 is a flow diagram of another embodiment of a method for atomic storage operations.

FIG. 18 is a flow diagram of another embodiment of a method 1800 for atomic storage operations. Step 1810 may comprise receiving an atomic storage request. The atomic storage request may be received at the storage module 130 through, inter alia, the storage interface 131. Alternatively, the atomic storage request may be received through the interface 531 of the aggregation module 530. The atomic storage request may comprise a plurality of atomic storage operations to be performed within respective I/O vectors, each of which may correspond to a different, respective target set of LIDs and/or VIDs.

Step 1820 may comprise implementing the storage operations of the atomic storage request in reference to a set of transactional or in-process identifiers. The transactional identifiers may correspond to a particular region of the logical address space 132; a VAS 532 (or region within a particular VAS 532); a separate namespace, such as the transactional address space 1662 disclosed above; and/or the like. Step 1820 may comprise allocating and/or identifying transactional identifiers corresponding to the target identifiers of the atomic storage request; the transactional identifiers may comprise a plurality of identifier ranges and/or extents corresponding to the I/O vectors of a vectored atomic storage request. In some embodiments, the transactional identifiers may be allocated and/or identified in different ranges and/or extents than the target identifiers. For example, the transactional identifiers used to implement an atomic storage operation corresponding to two discontiguous ranges of LIDs 1024-2048 and 6144-7186 may be implemented within a single range of ephemeral identifiers 10240-12288 or a plurality of smaller ranges and/or extents of transactional identifiers. The transactional identifiers may be linked to the target identifiers by use of, inter alia, storage metadata 135. In some embodiments, the transactional identifiers are linked to the target identifiers in a transaction map 1660. The transaction map 1660 may be further configured to bind the transactional identifiers to storage locations corresponding to the target LIDs and/or VIDs.

Step 1820 may further comprise implementing storage operations of the atomic storage request in reference to the transactional identifiers. One or more of the atomic storage operations may be predicated on the availability of resources within a target or destination namespace, such as the logical address space 132, VAS 532, or the like. In some embodiments, for example, the atomic storage request may comprise a request to allocate a particular set of LIDs. Step 1820 may, therefore, comprise provisionally reserving logical capacity within a target namespace by use of, inter alia, one or more persistent notes 366, as disclosed above. Step 1820 may further comprise allocating and/or reserving corresponding transactional identifiers, as disclosed above. In response to a failure of the allocation operation, the atomic storage module 1668 may: a) fail the atomic storage request or b) allocate and/or reserve a different set of target LIDs within the target namespace, which may be returned upon completion of the atomic storage operation.

The storage operations of step 1820 may further comprise appending data to the storage log in association with persistent metadata 114 that is configured to identify the data as being part of an atomic storage operation. The persistent metadata may comprise the transactional identifiers of step 1810. Alternatively, or in addition, the persistent metadata may comprise an atomic storage flag (or other datum) configured to indicate that the data is part of an incomplete atomic storage operation.

Step 1830 may comprise completing the atomic storage request. Step 1830 may comprise closing the atomic storage request implemented at step 1820. Closing the atomic storage request may comprise performing a range move operation to bind the data of the storage operations of step 1820 to the target identifiers, which may comprise updating storage metadata 135 to map the target identifiers to the data stored in the storage operations of step 1820. The range move operation may further comprise implementing one or more TRIM operations within the target namespace, as disclosed above. Completing the atomic storage request may further comprise storing persistent metadata on the storage medium 140 that is configured to: a) bind data of the atomic storage request to the target identifiers and/or b) indicate that the atomic storage request has been completed. The persistent metadata may be appended to the storage log in a single storage operation (e.g., in a persistent note 366 and/or 1666B). Step 1830 may further comprise acknowledging completion of the atomic storage request. Completion may be acknowledged in response to completing the range move operations and/or storing the corresponding persistent metadata.

Figure 19:
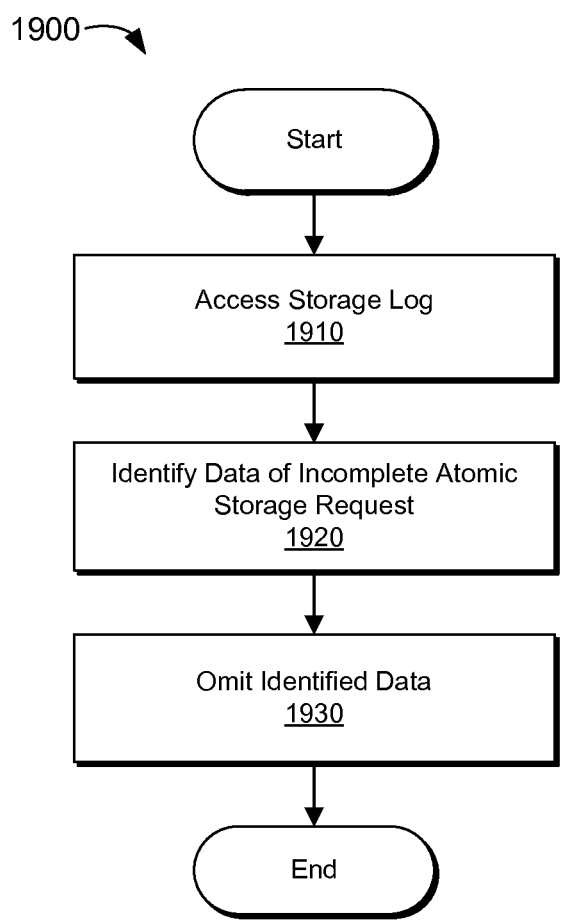
FIG. 19 is a flow diagram of another embodiment of a method for atomic storage operations.

FIG. 19 is a flow diagram of another embodiment of a method 1900 for atomic storage operations. Step 1910 may comprise accessing the storage log on the storage medium 140. Step 1910 may be performed by the reconstruction module 1637 to reconstruct the storage metadata 135 following a failure condition. The reconstruction module 1637 may be configured to access the storage log according to the log order of the storage log. The reconstruction module 1637 may be configured to identify the last append point within the storage log, and traverse the storage log in a reverse log order (e.g., from the head of the log toward the tail).

Step 1920 may comprise identifying data of an incomplete atomic storage request. Step 1920 may comprise identifying data that is bound to transactional or in-process identifiers and/or identifiers of a transactional and/or in-process address space 1662. Step 1920 may comprise accessing persistent metadata 114 stored with data segments in the storage log. Step 1920 may further comprise determining that other persistent metadata within the storage log fails to modify the identified data bindings (e.g., does not associate the data segments with identifiers in a different address space, such as the logical address space 132 and/or VAS 532).

Step 1930 may comprise omitting the identified data segments from the storage metadata 135, which may comprise invalidating the storage location(s) comprising the data, and omitting entries corresponding to the data segments from the forward map 160, intermediate mapping layer 1670, and/or the like. Step 1930 may, therefore, comprise rolling back a failed atomic storage operation, such that data of the partially completed atomic storage operation does not affect the target identifiers and/or namespace.

As disclosed above in conjunction with FIGS. 5A-B, in some embodiments an aggregation module 530 may be configured to provide a virtual address space 532 that corresponds to one or more logical address spaces 132 of one or more storage module(s) 130. Accordingly, in some embodiments, the virtual address space 532 may comprise an "aggregate namespace." As used herein, an "aggregate namespace" or "aggregate address space" refers to a namespace that corresponds to and/or comprises portions of one or more other namespaces and/or address spaces. An aggregate address space may, therefore, comprise a combination of logical address spaces 132 managed by respective storage modules 130. An aggregate address space may also be referred to as "composite" address space, a "conglomerate," and/or the like. An aggregate address space may comprise a set of virtual identifiers (VIDs), and may be formed by combining logical spaces 132 using any suitable combination scheme. As depicted in FIG. 5A, the VIDs of the aggregate address space (VAS 532) may have a one-to-one correspondence to logical identifiers within the logical address space 132. In some embodiments, VIDs of an aggregate address space may have a one-to-many relationship to the underlying logical address space(s) 132; VIDs of the aggregate namespace may map to a plurality of LIDs within respective logical address spaces 132. A one-to-many namespace aggregation scheme may be used to implement data redundancy, high-availability, and/or other storage features.

Figure 20A:
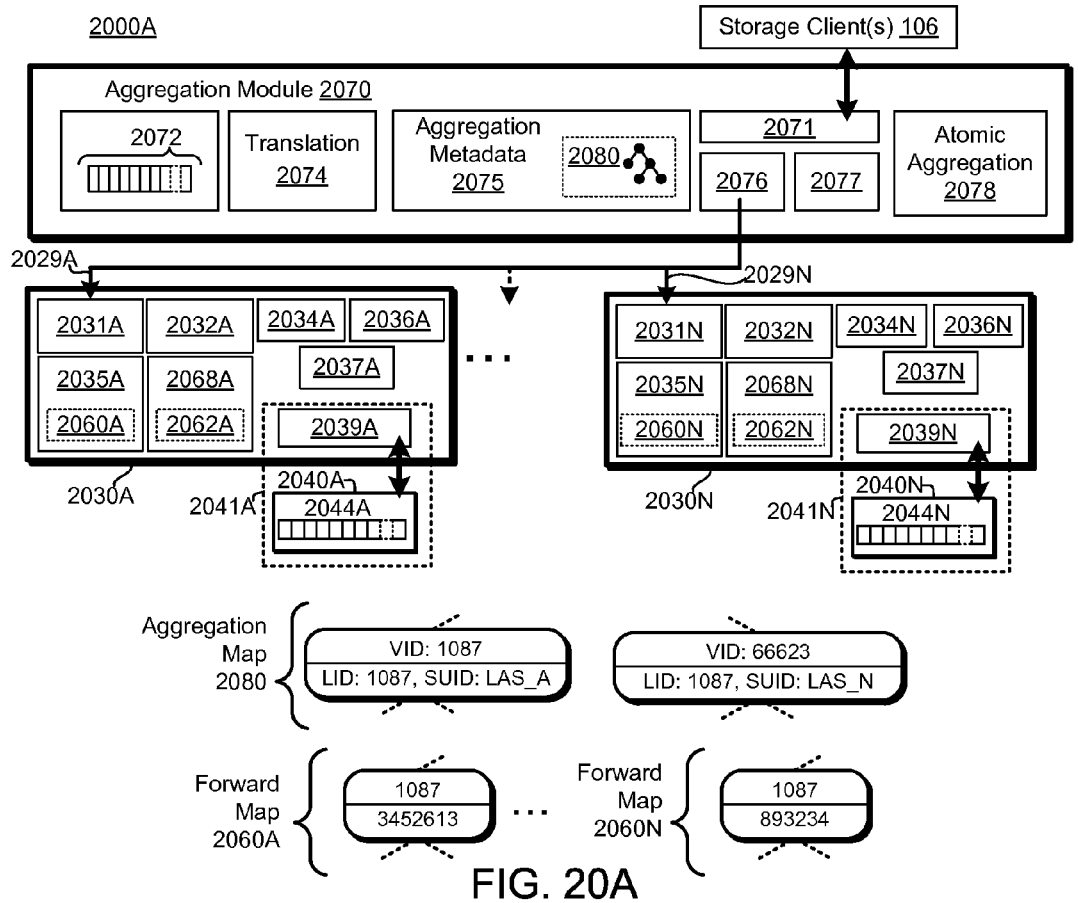
FIG. 20A depicts one embodiment of a system comprising an aggregation module configured to implement atomic storage operations.

FIG. 20A depicts one embodiment of a system 2000A comprising an aggregation module 2070. As disclosed above, the aggregation module 2070 may comprise software and/or hardware components including, but not limited to, one or more drivers and/or other software modules operating on the computing system 100, such as one or more drivers, storage drivers, I/O drivers, filter drivers, services, kernel-level modules, user-level modules, libraries, and/or the like; hardware components, such as hardware controllers, communication interfaces, and/or the like; and so on. The aggregation module 2070 may be configured to maintain an aggregate logical address space (AAS) 2072. The AAS 2072 may correspond to logical address spaces 132A-N of a plurality of different storage modules 2030A-N. The storage modules 2030A-N may comprise respective storage module interfaces 2031A-N, logical address spaces 2032A-N, translation layers 2034A-N, storage metadata 2035A-N (including respective forward maps 2060A-N), log storage modules 2036A-N, reconstruction modules 2037A-N, storage controllers 2039A-N, storage devices 2041A-N (including storage media 2040A-N having respective storage address spaces 2044A-N), and so on, as disclosed herein. The logical address spaces 2032A-N of the storage modules 2030A-N may be assigned respective storage unit identifiers (SUIDs). As used herein, an SUID refers to an identifier and/or namespace for an address space. An SUID may include, but is limited to, a storage unit identifier, VSU identifier, LUN identifier, VLUN identifier, unique identifier, GUID, and/or any other suitable identifier and/or name.

The aggregate address space 2072 may correspond to one or more of the logical address spaces 2032A-N of the storage modules 2030A-N. The translation module 2074 may be configured to map VIDs of the aggregate address space 2072 to LIDs of a respective logical address space 2032A-N by use of, inter alia, an aggregation map 2080. The aggregation map 2080 may comprise any-to-any mappings between VIDs of the AAS 2072 and LIDs of a respective storage module 2030A-N. Entries of the forward map may bind VIDs to respective LIDs within one (or more) of the logical address spaces 2032A-N. In the FIG. 20A embodiment, the aggregation map 2080 assigns VID 1087 to LID 1087 of logical address space 2032A, and maps VID 66623 to LID 1087 of logical address space 2032N. The entries may be further configured to identify the namespace of the assigned LIDs by use of the SUID of the corresponding logical address space 2032A-N. As illustrated in FIG. 20A, the entry for VID 1087 comprises an SUID configured to indicate that the corresponding LID 1087 is in logical address space 2032A (the logical address space 2032A is assigned SUID LAS_A). The entry for VID 66623 comprises an SUID configured to indicate that the corresponding LID 1087 is in logical address space 2032N (the logical address space 2032N is assigned SUID LAS_N).

The corresponding LIDs within the logical address spaces 2032A and 2032N may be assigned respective storage locations (on respective storage media 2074A and 2074N) by use of storage metadata 2035A-N of the respective storage modules 2030A-N (e.g., forward maps 2060A-N), as disclosed herein. The forward map 2060A of storage module 2030A may tie LID 1087 to a storage address of the storage address space 2044A of the storage device 2041A, and the forward map 2060N of storage module 2030N may tie LID 1087 to a storage address of the storage address space 2044N of the storage device 2041N.

Figure 20B:
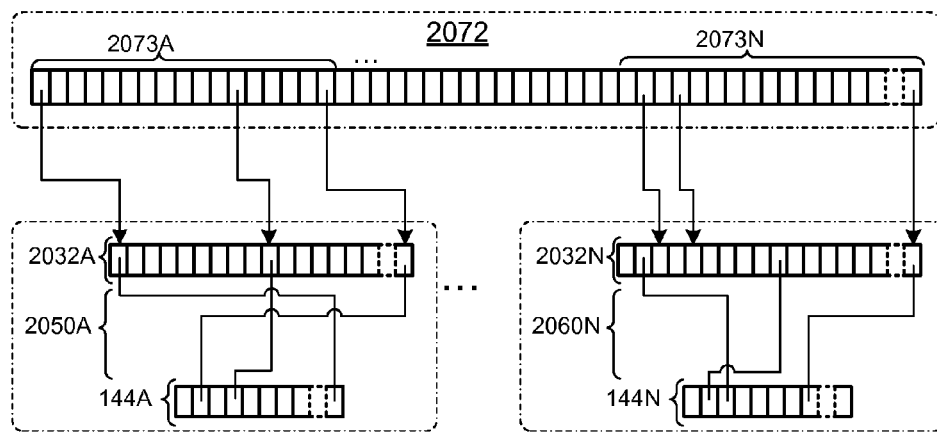
FIG. 20B depicts embodiments of aggregation translation mappings.

In some embodiments, the translation module 2074 may be configured to implement a deterministic mapping between the AAS 2072 and the logical address space(s) 2032A-N, such that the mapping for a VID may be determined without the need for additional mapping layers and/or metadata, such as the aggregation map 2080. In some embodiments, the translation module 2074 may be configured to implement a deterministic mapping scheme by associating ranges and/or extents of the AAS 2072 with corresponding ranges and/or extents of respective logical address spaces 2032A-N. As depicted in the FIG. 20B embodiment, the translation module 2074 is configured to associate VIDs in contiguous AAS ranges 2073A-N with LIDs in corresponding contiguous LID ranges of the logical address spaces 2032A-N; the AAS range 2073A corresponds to a contiguous LID range of the logical address space 2032A, the AAS range 2073N corresponds to a contiguous LID range of the logical address space 2032N, and so on. Accordingly, the VID to LID mappings of FIG. 20B may be implemented without the use of a fully associative and/or any-to-any mapping structure. Although FIG. 20B depicts a deterministic mapping based on contiguous VID ranges 2073A-N, the disclosure is not limited in this regard and could be adapted to use any suitable deterministic mapping scheme including, but not limited to: a set associative mapping, a modulo mapping, and/or the like. The aggregation map 2080 and/or metadata pertaining to the deterministic mapping(s) disclosed herein may be maintained within aggregation metadata 2075. The aggregation metadata 2075 may be stored in volatile memory resources 102 of a computing system 100. In some embodiments, portions of the aggregation metadata 2075 may be stored in persistent storage 104 and/or within one or more of the storage modules 2030A-N (e.g., in a dedicated metadata storage channel).

As disclosed above, the log storage modules 2036A-N of the storage modules 2030A-N may be configured to store data in association with persistent metadata 114 that describes the data (e.g., in a packet format 110). The persistent metadata 114 may identify and/or reference, inter alia, the LIDs corresponding to a particular data segment 112. The persistent metadata 114 may be further configured to identify and/or reference the VIDs bound to the data segment 112. The aggregation module 2070 may, therefore, be capable of reconstructing the VID to LID mapping by use of the storage log on the storage media 2040A-N, as disclosed herein.

Referring to FIG. 20A, the aggregation module 2070 may comprise a storage interface 2071 through which storage clients 106 may access storage services. As disclosed herein, the storage interface 2071 may include, but is not limited to: a block device interface, an object storage interface, a file storage interface, a key-value storage interface, a virtualized storage interface, one or more virtual storage units (VSUs), an object storage interface, a database storage interface, other suitable interface and/or an Application Programming Interface (API), and the like. The interface 2071 may be further configured to provide APIs and/or interfaces for performing atomic storage operations, vectored atomic storage operations, storage transactions, and the like, as disclosed herein.

The aggregation module 2070 may be configured to perform storage operations by use of the storage modules 2030A-N. The aggregation module 2070 may comprise a storage aggregation module 2076 configured to a) identify storage module(s) 2030A-N pertaining to a particular storage request by use of, inter alia, the translation module 2074 and to b) implement the storage request by use of the identified storage module(s) 2030A-N. The storage module(s) 2030A-N pertaining to a storage request may be determined based on the mappings between VIDs of the storage request and SUIDs of the respective logical address spaces 2032A-N maintained within, inter alia, the aggregation map 2080. In response to a storage request pertaining to VID 66623, for example, the aggregation storage module 2076 may determine that the VID corresponds to LID 1087 of logical address space 2032N (by use of the aggregation map 2080), and may issue the storage request with the translated LID 1087 to the corresponding storage module 2030N. In other embodiments, such as the deterministic mapping embodiment of FIG. 20B, the translation module 2074 may identify the logical address spaces 2032A-N of the storage request based on the region(s) 2073A-N corresponding to the VIDs of the request. Storage requests that do not reference to any particular set of LIDs, such as nameless write operations, VID allocation operations, and/or the like, may be assigned LIDs (and respective storage modules 2030A-N) by use of an aggregation policy module 2056. The aggregation policy module 2056 may be configured to allocate resources of the storage modules 2030A-N to storage clients 106 according to an aggregation policy. As used herein, an aggregation policy refers to a policy for provisioning storage resources of storage modules 2030A-N and/or logical address spaces 2032A-N. The aggregation policy module 2056 may be configured to load balance input/output capacity between the storage modules 2030A-N, which may comprise a) monitoring bandwidth and/or usage of the communication channel(s) to/from the storage modules 2030A-N and/or storage devices 2041A-N, and b) adapting allocation patterns within the AAS 2072 in accordance with the load on the respective storage modules 2030A-N.

The aggregation policy module 2056 may be further configured to implement a quality of service (QoS) policy for one or more storage clients 106. A QoS policy may correspond to properties of the storage services provided to a storage client 106, such as input/output bandwidth, input/output latency, persistence level (e.g., RAID level), and/or the like. The aggregation policy module 2056 may be configured to acquire information pertaining to the availability and/or usage of storage resources of the storage modules 2030A-N, such as the available logical and/or physical capacity of the storage modules 2030A-N, I/O bandwidth to/from the storage modules 2030A-N (e.g., performance and/or load on the interconnects 2029A-N), latency of storage operations performed on the storage modules 2030A-N, reliability of the storage modules 2030A-N and/or corresponding storage devices 2041A-N, configuration of the storage modules 2030A-N and/or storage devices 2041A-N (e.g., RAID configuration, mirroring configuration, backup, and so on), and the like. Further embodiments of adaptive persistence are disclosed in U.S. patent application Ser. No. 13/829,835 entitled "Systems and Methods for Adaptive Persistence" filed Mar. 14, 2013 for David Flynn et al., which is hereby incorporated by reference.

The storage aggregation policy module 2056 may use the information pertaining to the storage modules 2030A-N to identify storage modules 2030A-N to provision to particular storage clients 106 and/or for use in providing a particular QoS and/or persistence level. The storage aggregation policy module 2056 may be further configured to use the information pertaining to the storage modules 2030A-N to avoid overloading the storage modules 2030A-N, such that existing QoS requirements cannot be met. In one embodiment, the aggregation policy module 2056 may, for example, implement a QoS policy that guarantees a high input/output bandwidth to a particular storage client 106. Based on the QoS policy, the aggregation policy module 2056 may: a) monitor input/output bandwidth availability on the interconnects 2029A-N to/from the storage modules 2030A-N to identify storage modules 2030A-N that are capable of satisfying the input/output bandwidth requirements of the QoS policy, b) allocate VIDs to the storage client 106 that correspond to the identified storage module(s) 2032A-N, c) avoid VID allocations that would result in reducing the input/output bandwidth available to the storage client 106 below (and/or within a threshold) of QoS requirements, and/or d) reallocate and/or re-provision storage resources to the storage client 106 (and/or other clients) to provide the input/output bandwidth guaranteed by the QoS (e.g., reduce the input/output load on the identified storage module(s) 2032A-N, move VIDs of the storage client 106 to other storage module(s) 2032A-N, and/or the like).

The aggregation module 2070 may be configured to implement atomic storage operations on the storage modules 2030A-N. As disclosed herein, an atomic storage request and/or vectored atomic storage request may pertain to one or more sets, groups, ranges, and/or extends of VIDs. The VIDs of an atomic storage request may correspond to different logical address spaces 2032A-N on different storage modules 2030A-N, and that map to different storage devices 2041A-N. Accordingly, portions of an atomic storage request may be implemented by use of a first storage module 2030A (on a first storage device 2041A), and other portions of the atomic storage request may be implemented by use of a different storage module 2030N (on a different storage device 2041N). The atomic storage operations may be implemented within the respective storage modules 2030A-N, as disclosed herein (e.g., by use of respective atomic storage modules 2068A-N). The atomic storage modules 2068A-N may be further configured to identify and/or invalidate data of failed and/or incomplete atomic storage operations performed within the storage module 2030A-N. However, the individual storage modules 2030A-N may be unable to determine whether other portions of the atomic storage request, implemented on other storage modules 2030A-N, were successfully completed. For example, in the FIG. 20A embodiment, the interface module 2071 may receive an atomic storage request pertaining to VIDs 1087 and 66623. The storage aggregation module 2076 may determine, by use of the translation module 2074, that the VID 1087 corresponds to storage module 2030A and that VID 66623 corresponds to storage module 2030N. The storage aggregation module may issue corresponding atomic storage requests to the respective storage modules 2030A and 2030N. The atomic storage operation on storage module 2030A may be completed successfully, but the atomic storage operation on storage module 2030N may fail. The storage module 2030N may identify and/or remove data corresponding to the failed atomic storage operation, as disclosed herein. Rolling back the failed atomic storage operation may further require invalidating the storage operations performed on storage module 2030A. However, since the atomic storage operation implemented on storage module 2030A was completed successfully, the storage module 2030A may not be aware of the failure, and as such, may not invalidate the data of the failed atomic storage operation.

In some embodiments, the aggregation module 2070 may comprise an atomic aggregation module 2078 configured to coordinate atomic storage operations on the storage modules 2030A-N. The atomic aggregation module 2078 may comprise a recovery agent 2077 configured to a) identify failed and/or incomplete atomic storage operations on respective storage modules 2030A-N and b) instruct the storage modules 2030A-N to invalidate and/or rollback data pertaining to failed and/or incomplete atomic storage operations.

In some embodiments, the atomic aggregation module 2078 is configured to assign a transaction sequence identifier (TSI) to atomic storage operations. The atomic aggregation module 2078 may be configured to increment the TSI each time an atomic storage request is received. In response to an atomic storage request, the atomic storage module 2078 may be configured to: a) identify the storage module(s) 2030A-N corresponding to the atomic storage request, as disclosed herein, and b) generate a transaction completion tag (TCT) for the atomic storage request. The TCT may comprise the TSI assigned to the atomic storage request. The TCT may be further configured to identify the storage modules 2030A-N and/or logical address spaces 2032A-N involved in the atomic storage request. Alternatively, or in addition, the TCT may be configured to indicate the number of different storage modules 2030A-N and/or logical address spaces 2032A-N involved in the atomic storage request. The atomic aggregation module 2078 may be configured to issue atomic storage requests to the identified storage modules 2030A-N with the TCT (e.g., through respective storage interfaces 2031A-N of the storage modules 2030A-N). The atomic storage requests issued to the storage modules 2030A-N may correspond to portions of the atomic storage request (e.g., may be sub-requests of the atomic storage request). The sub-requests may comprise separate atomic storage requests corresponding to respective portion(s) of the atomic storage request. The sub-requests may include and/or reference the TCT (e.g., as a separate parameter). In some embodiments, the atomic aggregation module 2078 may provide the TCT to the storage layer(s) independently of the sub-requests (e.g., through separate calls to the storage module interface 2031A-N). The identified storage modules 2030A-N may be configured to implement the issued atomic storage requests by use of respective atomic storage modules 2068A-N, as disclosed herein. The atomic storage modules 2068A-N may be further configured to store the TCT upon completing the sub-requests (e.g., append the TCT to the storage log on the storage media 2040A-N). Accordingly, the TCT may be stored by each storage module 2030A-N involved in the atomic storage operation. The TCT information may be stored in response to completing the sub-request(s) issued to the storage layer 2030A-N. The storage modules 2030A-N may be configured to acknowledge completion of their respective portions of the atomic storage request in response to storing the TCT. The atomic aggregation module 2078 may acknowledge completion of the atomic storage request in response to receiving completion acknowledgements from each storage module 2030A-N involved in the atomic storage request.

The atomic storage modules 2068A-N of the storage modules 2030A-N may be configured to provide the TCT corresponding to the last successfully completed atomic storage operation performed thereon (e.g., the most recent TCT (if any) in the storage log of the respective storage module 2030A-N). The recovery agent 2077 may be configured to identify failed atomic storage operations by comparing the TCT information acquired from the storage modules 2030A-N. The recovery agent 2077 may identify a failed and/or incomplete atomic storage operation in response to inconsistent TCT information from the storage modules 2030A-N.

Figure 20C:
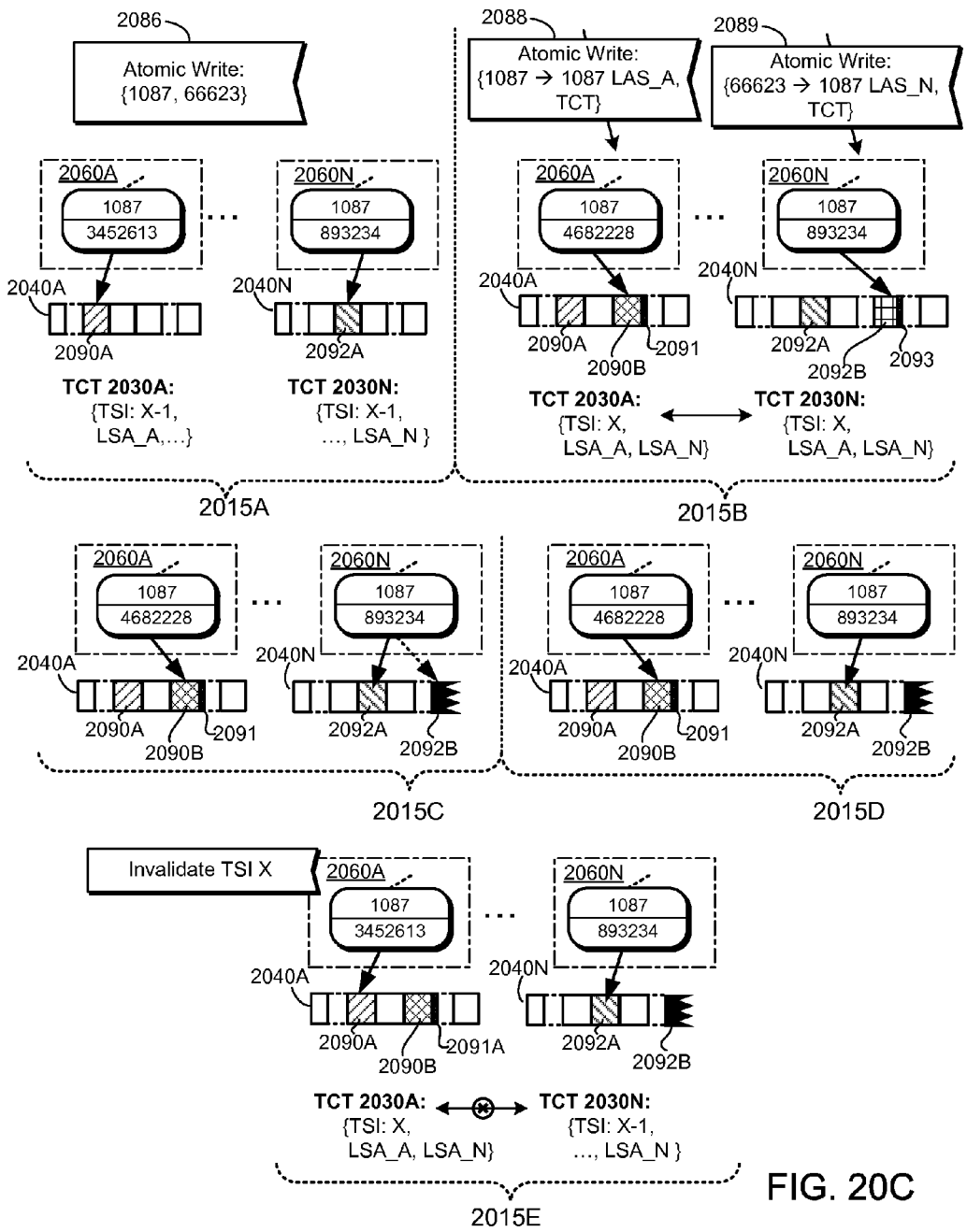
FIG. 20C depicts embodiments of atomic storage operations that span two or more logical address spaces.

FIG. 20C depicts embodiments 2000C of atomic storage operations that span two or more logical address spaces 2032A-N. In state 2051A, the interface 2071 of the aggregation module 2070 receives a vectored atomic write request 2086 pertaining to VIDs 1087 and 66623. The VIDs 1087 and 66623 may correspond to LID 1087 of logical address space 2032A and LID 1087 of logical address space 2032N, respectively. LID 1087 of logical address space 2032A may be bound to storage location 2090A of the storage medium 2040A, and LID 1087 of logical address space 2032N may be bound to storage location 2092A of the storage medium 2040N.

In response to the atomic storage request 2086, and as illustrated in state 2015B, the atomic aggregation module 2078 may be configured to generate a TSI (X), and identify the storage module(s) 2030A-N corresponding to the VIDs of the atomic storage request 2086 by use of the translation module 2074, as disclosed above (e.g., identify the logical address spaces 2032A-N corresponding to the VIDs of the atomic storage request by use of the aggregation map 2080; a deterministic mapping scheme, such as the regions 2073A-N; and/or the like). The atomic aggregation module 2078 may be further configured to generate a TCT for the atomic storage request that comprises and/or references the TSI assigned to the atomic storage request 2086 and/or identifies the storage modules 2030A-N to be used to implement the atomic storage request 2086 (storage modules 2030A and 2030N, which correspond to VIDs 1087 and 66623 respectively).

The atomic aggregation module 2078 may be configured to split the atomic storage request 2086 into a plurality of sub-requests and/or sub-operations. The atomic aggregation module 278 may split the atomic storage request 2086 based on mappings between VIDs of the atomic storage request 2086 and LIDs within of the logical address spaces 2032A-N. The mappings between the VIDs and logical address spaces 2032A-N may be used to select the storage modules 2030A-N for use in implementing the atomic storage request 2086. The sub-requests may comprise multi-block and/or vectored atomic storage requests, as disclosed herein.

The atomic aggregation module 2078 may be further configured issue the identified sub-requests and/or sub-operations (atomic storage requests 2088 and 2089) to the selected storage modules 2030A and 2032N by use of the storage aggregation module 2076. The storage aggregation module 2076 may issue an atomic storage request 2088 pertaining to VID 1087 (translated to LID 1087 of logical address space 2032A) to storage module 2030A, and an atomic storage request 2089 pertaining to VID 66623 (translated to LID 1087 of logical address space 2032N) to storage module 2030N. The atomic storage requests 2088 and 2089 may include and/or reference the TCT generated by the atomic aggregation module 2078.

The atomic storage modules 2068A and 2068N of the storage modules 2030A and 2030N may be configured to implement the respective atomic storage requests 2088 and 2089, as disclosed herein. In some embodiments, the atomic storage modules 2068A and 2068N may implement the atomic storage requests 2088 and/or 2089 by use of respective transaction address spaces 2062A and 2062, as disclosed in conjunction with FIGS. 10A and 10B. Alternatively, one or more of the atomic storage modules 2068A and/or 2068N may implement the atomic storage requests 2088 and/or 2089 by use of the embodiments disclosed in U.S. patent application Ser. No. 13/725,728, entitled, "Systems, Methods, and Interfaces for Vector Input/Output Operations," filed on Dec. 21, 2012 for Ashish Batwara et al., and which is incorporated by reference. The atomic storage modules 2068A and 2068N may be further configured to store the TCT on the storage media 2040A and/or 2040N upon completing the atomic storage requests 2088 and/or 2089.

As illustrated in state 2015B, the atomic storage module 2068A implements the atomic storage request 2088 by, inter alia, appending data corresponding to LID 1087 at storage location 2090B. The atomic storage module 2068N implements the atomic storage request 2089 by, inter alia, appending data corresponding to LID 1087 at storage location 2092B. Upon completing the atomic storage request 2088, the atomic storage module 2068A may write the TCT to the storage medium 2040A, and, upon completing the atomic storage request 2089, the atomic storage module 2068N may write the TCT to the storage medium 2040N. Storing the TCT may comprise appending the TCT to the storage log (e.g., as a persistent note 366, a packet 200, and/or the like). The atomic storage modules 2068A and/or 2068N may be further configured to invalidate older TCT information (if any) on the respective storage media 2040A and/or 2040N (since only the most recently completed TCT information is needed). Invalidating the older TCT information may comprise marking the storage locations comprising the TCT information as invalid (e.g., in a reverse index) and/or indicating that the storage location(s) comprise data that does not need to be retained on the storage media 2040A and/or 2040N. The atomic storage module 2068A may acknowledge completion of the atomic storage request 2088 upon storing the TCT at storage location 2091 (and/or writing the TCT to a power-cut safe domain of the storage medium 2040A), and the atomic storage module 2068N may acknowledge completion of the atomic storage request 2089 upon storing the TCT at storage location 2093 (and/or writing the TCT to a power-cut safe domain of the storage medium 2040N). The atomic aggregation module 2078 may acknowledge completion of the atomic storage request 2086 in response to receiving completion acknowledgements from storage modules 2030A and 2030N. The atomic aggregation module 2078 may verify completion of the atomic storage request 2086 by comparing TCT information of the storage modules 2030A and 2030N. As illustrated in state 2015B, the TCT information of storage module 2030A may report that the last completed atomic storage operation was assigned TSI X and included two storage modules 2030A-N. The TCT information may be further configured to identify the particular storage modules 2030A-N involved in the atomic storage operations (e.g., 2030A and 2030N). As shown in state 2015B, both storage modules 2030A 2030N may report matching TCT information (e.g., TSI of last completed atomic operation is not earlier than X).

In another embodiment, and as illustrated in state 2015C, the atomic storage request 2088 issued to the storage module 2030A may complete successfully, but the atomic storage request 2089 issued to storage module 2030N may fail due to, inter alia, an invalid shutdown or crash. Accordingly, the atomic storage module 2068A may complete the atomic storage request 2088 (and store the TCT at storage location 2091). The atomic storage module 2068N, however, may experience a failure as data is being stored at storage location 2092B. As such, the atomic storage module 2068N of storage module 2030N may not store the TCT information on the storage medium 2040N, and may not acknowledge completion of the atomic storage request 2089 to the atomic aggregation module 2078 and/or may report an error to the atomic aggregation module 2078.

State 2015D illustrates a recovery operation following the failure of state 2015C. During the recovery operation, the atomic storage module 2068N may identify and rollback the data of the failed atomic storage request 2089 (by use of, inter alia, the reconstruction module 2037N), which may comprise invalidating data of the failed atomic storage operation (e.g., the data stored at storage location 2092B) and/or reverting to a previously valid version of the data within the storage log (e.g., binding the LID 1087 to the data stored at storage location 2092A). The atomic storage module 2068A (and/or reconstruction module 2037A) of the storage module 2030A, however, may not recognize that the atomic storage operation 2086 failed. From the perspective of the atomic storage module 2068A, the atomic storage request 2088 was successfully completed, despite the failure in the other storage module 2030N. Therefore, the atomic storage module 2068A may not rollback the data of the atomic storage request 2088, and the data corresponding to VIDs 1087 and 66623 may be in an inconsistent state.

The recovery agent 2077 of the aggregation module 2070 may perform recovery operations in addition to the recovery operations performed within the storage modules 2030A-N. The recovery agent 2077 may be configured to perform the disclosed recovery operations in response to a failure condition in one or more of the storage modules 2030A-N and/or an invalid shutdown of the aggregation module 2070 itself. The atomic aggregation module 2078 may be configured to identify failed atomic storage operations by use of the TCT information acquired from the storage modules 2030A-N (by use of the recovery agent 2077). As disclosed above, the recovery agent 2077 may detect a failed atomic storage operation based on the TCT information of the storage modules 2030A-N. A failed atomic storage operation may be identified in response to TCT information from the storage modules 2030A-N that is out of sequence with respect to an expected TSI for the storage modules 2030A-N. As illustrated in state 2015E, the recovery agent 2077 may request TCT information from the storage modules 2030A-N. Based on the TCT information from storage module 2030A, the recovery agent 2077 may determine that an atomic storage request assigned TSI X was initiated, which involved storage modules 2030A and 2030N. Accordingly, the expected TSI of storage module 2030N is TSI X or higher; a TSI that is earlier in sequence than X, indicates that the atomic storage request 2086 was not fully completed. A TSI later in the sequence, indicates that the storage module 2030A or 2030N successfully completed other atomic storage operations subsequent to completing the atomic storage operation assigned TSI X. Although in FIG. 20C the atomic aggregation module determines the TCT information by use of storage module 2030A, the disclosure is not limited in this regard. In other embodiments, the atomic aggregation module 2078 may maintain separate TCT metadata (e.g., by use of a separate metadata storage channel, storage device, and/or the like). In some embodiments, the TCT information may comprise a TSI and a storage module count (rather than specifying the particular storage modules 2030A-N involved in the atomic storage operation). The atomic aggregation module 2078 may identify a failure condition in response to determining that less than an expected number of storage modules 2030A-N reported a TSI equal to (or later than) the expected TSI. In the FIG. 20C embodiment, the failure of storage module 2030N may be identified in response to TCI information from storage module 2030A indicating a TSI of X, and a storage module count of two without receiving corresponding TCT information from other storage modules 2030B-N.

The atomic aggregation module 2078 may be configured to obtain TCT information from the storage modules 2030A-N using any mechanism including, but not limited to: requesting TCT information from the storage modules 2030A-N (by use of respective interfaces 2031A-N of the storage modules 2030A-N), receiving TCT information from the storage modules 2030A-N (e.g., the storage modules 2030A-N may be configured to push TCT information to the aggregation module 2070), and/or the like.

In state 2015E of the FIG. 20C embodiment, the storage module 2030A reports a TSI of X (and identify storage modules 2030A and 2030N as implementing the atomic storage operation). The storage module 2030N, however, may report TCT information that is out of sequence (e.g., less than X). In response, the atomic aggregation module 2078 determines that the atomic storage operation corresponding to TSI X failed. The atomic aggregation module 2078 may inform the other storage modules 2030A-N (storage module 2030A) that the atomic storage operation corresponding to TSI X is incomplete and should be rolled back. The atomic aggregation module 2078 may instruct the storage module(s) 2030A and 2030N to invalidate data of the atomic storage request 2086, as disclosed herein (through the interface 2031A-N of the storage modules). As illustrated in state 2015E, rolling back the atomic storage operations corresponding to the atomic storage request 2086 may comprise invalidating the data stored at 2090B and/or restoring a mapping between the LID 1087 and a previous version of the data stored at storage location 2090A.

Figure 21:
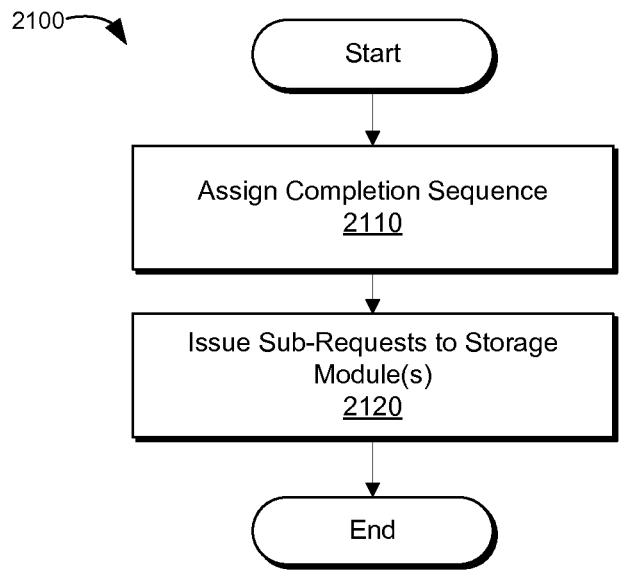
FIG. 21 is a flow diagram of an embodiment of a method for implementing atomic storage operations that comprise multiple storage modules and/or logical address spaces.

FIG. 21 is a flow diagram of one embodiment of a method 2100 for implementing atomic storage operations that comprise multiple storage modules and/or logical address spaces. Step 2110 comprises assigning a completion sequence indicator to an atomic storage request, such as the atomic storage request 2086 disclosed above. The atomic storage request of step 2110 may correspond to VIDs of a conglomerate address space (e.g., an AAS 2072). AAS 2072 may comprise a plurality of different logical address spaces 2032A-N, each corresponding to a respective storage module 2030A-N and/or storage device 2041A-N. Step 2110 may, therefore, further comprise selecting storage modules 2030A-N to implement the atomic storage request. As disclosed herein, the storage modules 2030A-N may be selected based on mappings between the VIDs of the atomic storage request and the logical address spaces 2032A-N comprising the AAS 2072. Storage modules 2030A-N corresponding to the LIDs mapped to the VIDs of the atomic storage request may be selected to implement the atomic storage request.

Step 2120 comprises issuing sub-requests to two or more of the storage modules 2030A-N. Step 2120 may comprise generating the sub-requests. The sub-requests may correspond to the atomic storage request received at step 2110. The sub-requests may be adapted to configure the two or more selected storage modules 2030A-N to implement portions of the atomic storage request. The sub-requests may comprise and/or reference LIDs of a logical address space 2032A-N translated from the VIDs of the atomic storage request, as illustrated in state 2015B of FIG. 20C. The sub-requests may comprise the completion sequence indicator of step 2110. The completion sequence indicator may be provided as a TCT, which may be configured to identify the storage modules 2030A-N involved in the atomic storage operation and/or identify the number of storage modules 2030A-N involved in the atomic storage operation.

Step 2120 may further comprise determining whether the sub-requests issued to the two or more storage modules 2030A-N were completed successfully based, inter alia, on completion information stored by the two or more storage modules 2030A-N, as disclosed herein.

Figure 22:
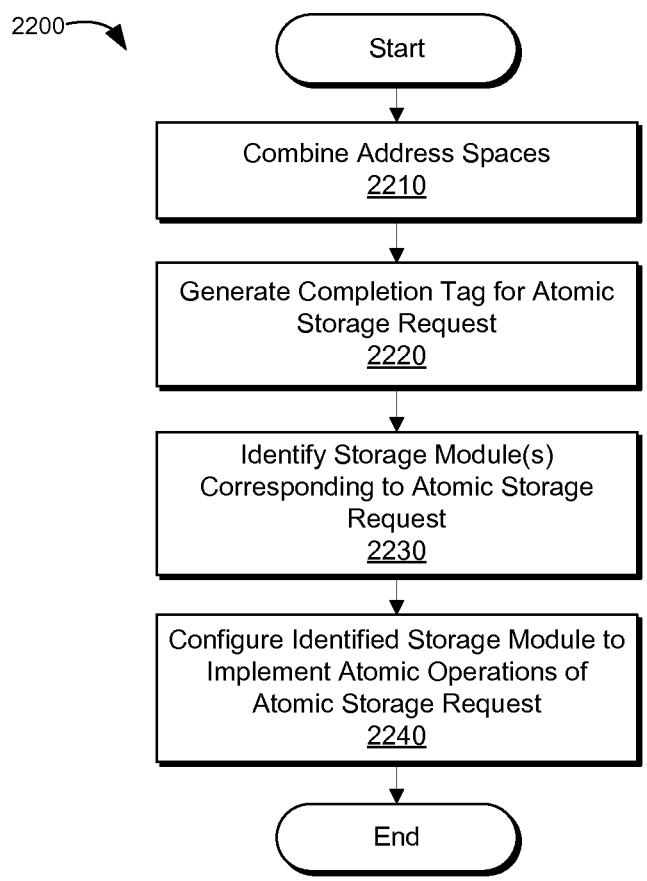
FIG. 22 is a flow diagram of another embodiment of a method for implementing atomic storage operations that comprise multiple storage modules and/or logical address spaces.

FIG. 22 is a flow diagram of another embodiment of a method 2200 for implementing an atomic storage request that comprise multiple storage modules 2030A-N and/or logical address spaces 2032A-N. Step 2210 may comprise combining a plurality of logical address spaces 2032A-N to form a composite, conglomerate, and/or aggregate address space (AAS 2072) by use of, inter alia, the aggregation module 2070 and/or translation module 2074. The logical address spaces 2032A-N may be managed by respective storage modules 2030A-N and/or may correspond to respective storage devices 1141A-N, as disclosed herein. Step 2210 may comprise mapping VIDs of the AAS 2072 to LIDs within the respective logical address spaces 2032A-N. The mappings may comprise any-to-any mappings maintained in an aggregation map 2080 (or other mapping structure). Alternatively, the mappings may comprise deterministic mappings, such as the region-based mappings of FIG. 20B.

Step 2220 may comprise generating a completion tag in response to an atomic storage request (e.g., a TCT) by use of the atomic aggregation module 2078. Generating the completion tag may comprise assigning a sequence indicator to the atomic storage request. The sequence indicator may comprise a sequence number, timestamp, and/or other identifier configured to define a sequence of atomic storage operations performed by the atomic aggregation module 2078. Step 2220 may, therefore, comprise incrementing a sequence number.

Generating the completion tag may further comprise identifying the storage modules 2030A-N pertaining to the atomic storage request (e.g., selecting the storage modules 2030A-N to be used to implement the atomic storage request) at step 2230. The atomic storage request of step 2220 may correspond to one or more VIDs (e.g., VID vectors) in the AAS 2072. Identifying the storage modules 2030A-N at step 2230 may comprise mapping the VIDs of atomic storage requests to the logical address spaces 2032A-N comprising the AAS 2072. The storage modules 2030A-N may be selected based on VID-to-LID mappings maintained by the aggregation module 2070 (e.g., a storage module 2030A-N may be selected in response to mapping a VID of the atomic storage request to the logical address space 2032A-N managed by the storage module 2030A-N).

Step 2240 may comprise configuring the storage modules 2030A-N identified at step 2230 to implement portions of the atomic storage request. Step 2240 may comprise instructing the identified storage modules 2030A-N to implement atomic operations corresponding to the atomic storage request. Step 2240 may comprise translating VIDs of the atomic storage request to LIDs of the logical address spaces 2032A-N of the respective storage modules 2030A-N. Step 2240 may further comprise providing the completion tag of step 2220 to the identified storage modules 2030A-N. The storage modules 2030A-N may be configured to store the completion tag upon completing the atomic operations assigned to the respective storage module 2030A-N.

Figure 23:
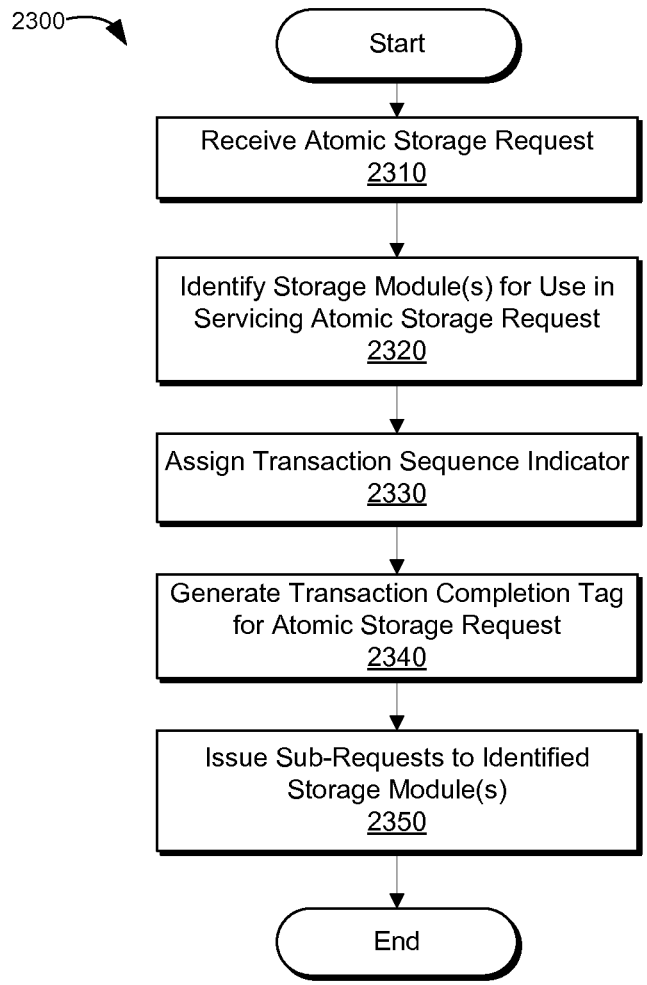
FIG. 23 is a flow diagram of another embodiment of a method for implementing atomic storage operations that comprise multiple storage modules and/or logical address spaces.

FIG. 23 is a flow diagram of one embodiment of a method 2300 for implementing atomic storage operations that involve multiple storage modules 2030A-N. Step 2310 may comprise receiving an atomic storage request at an aggregation module 2070. The atomic storage request may be received through an interface module 2071 of the aggregation module 2070, as disclosed herein.

The atomic storage request of step 2310 may pertain to one or more VIDs and/or VID vectors of the AAS 2072 of the aggregation module 2070. The AAS 2072 may comprise a combination of a plurality of different logical address spaces 2032A-N managed by different respective storage modules 2030A-N. LIDs of the logical address spaces 2032A-N may correspond to different respective storage media 2040A-N, as disclosed herein.

Step 2320 may comprise identifying the storage modules 2030A-N for use in servicing the atomic storage request. As disclosed above, the storage modules 2030A-N may be identified based on mappings between the VIDs of the atomic storage request and the logical address spaces 2032A-N comprising the AAS 2072. Step 2330 may comprise assigning a TSI to the atomic storage request, as disclosed herein. Step 2340 may comprise generating a TCT for the atomic storage request. The TCT may comprise the TSI assigned at step 2330. The TCT may be configured to specify the storage modules 2030A-N involved in the atomic storage request identified at step 2320.

Step 2350 may comprise issuing sub-requests to the storage modules 2030A-N identified at step 2320. The sub-requests may comprise and/or reference the TCT of step 2340. Accordingly, step 2350 may comprise providing the TCT to the identified storage modules 2030A-N. The sub-requests of step 2350 may configure the identified storage modules 2030A-N to implement portions of the atomic storage request. The sub-requests may comprise and/or reference LIDs within the respective logical address spaces 2032A-N of the storage modules 2030A-N. The LIDs may be translated from VIDs of the atomic storage request. The identified storage modules 2030A-N may be configured to implement the sub-requests using an atomic storage module 1668, as disclosed above. Alternatively, or in addition, one or more of the identified storage modules 2030A-N may be configured to implement a sub-request using the embodiments disclosed in U.S. patent application Ser. No. 13/725,728, entitled, "Systems, Methods, and Interfaces for Vector Input/Output Operations," filed on Dec. 21, 2012 for Ashish Batwara et al., and which is incorporated by reference. The sub-requests may be configured to instruct the identified storage modules 2030A-N to store completion information in response to completing the atomic storage operation(s) of the sub-requests issued thereto. Storing the completion information may comprise storing the TCT on a respective storage device 1141A-N. As disclosed above, the TCT may comprise the TSI assigned to the atomic storage request, and may be configured to identify the storage modules 2030A-N used to implement the sub-requests issued at step 2350 and/or identify the number of storage modules 2030A-N used to implement respective sub-requests.

Figure 24:
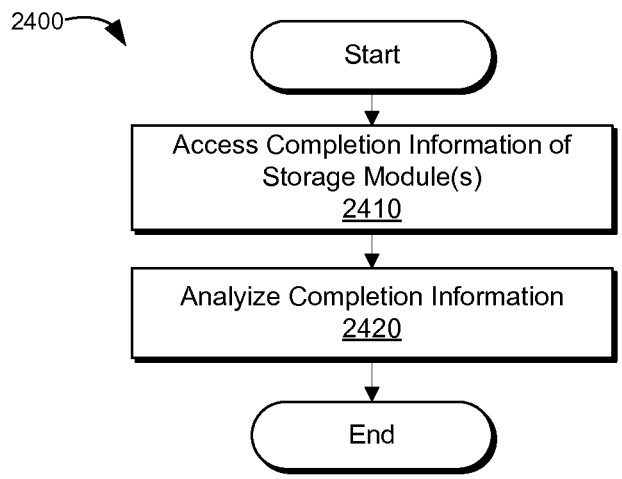
FIG. 24 is a flow diagram of one embodiment of a method for recovering from an invalid shutdown condition.

FIG. 24 is a flow diagram of one embodiment of a method for recovering from an invalid shutdown condition. The method 2400 may be performed in response to an invalid shutdown condition in one or more of the storage modules 2030A-N of an aggregation module 2070 and/or an invalid shutdown of the aggregation module 2070 itself. Step 2410 may comprise accessing transaction completion information of a plurality of different storage modules 2030A-N by, inter alia, a recovery agent 2077 of the aggregation module 2070. Step 2410 may, therefore, comprise requesting completion information from the storage modules 2030A-N by use of, inter alia, respective interface modules 2031A-N of the storage modules 2030A-N. Alternatively, or in addition, step 2410 may comprise receiving completion information pushed from one or more of the storage modules 2030A-N. In some embodiments, one or more of the storage modules 2030A-N may be configured to transmit completion information to the aggregation module 2070 in response to detecting and/or recovering from an invalid shutdown condition.

The transaction completion information may comprise the sequence indicator of the latest successfully completed atomic storage operation performed on the respective storage modules 2030A-N. The transaction completion information may be further configured to identify the storage modules 2030A-N involved in the completed atomic storage operation(s) and/or the number of storage modules 2030A-N involved in the completed atomic storage operation(s).

Step 2420 may comprise analyzing the completion information of the storage modules 2030A-N accessed at step 2410 to determine whether the storage modules 2030A-N comprise data of failed and/or incomplete atomic storage requests. Step 2420 may be implemented by use of a recovery agent 2077, as disclosed herein. Identifying a failed and/or incomplete atomic storage request may comprise identifying transaction completion information of a storage module 2030A-N that is out of sequence with respect to transaction completion information of other storage modules 2030A-N. As disclosed above, transaction completion information may identify the storage modules 2030A-N involved in atomic storage requests (and/or the number of storage modules 2030A-N involved in atomic storage requests), and may indicate a TSI of the corresponding atomic storage requests. If all of the storage modules 2030A-N identified as being part of a particular atomic storage request have a completed sequence indicator that is equal to or greater (e.g., later in sequence) than the sequence indicator assigned to the particular atomic storage request, the recovery agent 2077 may determine that the atomic storage request was fully completed. If, however, any of the storage modules 2030A-N identified as being part of the particular atomic storage request have a completed sequence indicator that is less (e.g., earlier in sequence) than the sequence indicator assigned to the particular atomic storage request, the recovery agent 2077 may determine that the atomic storage request failed.

Figure 25:
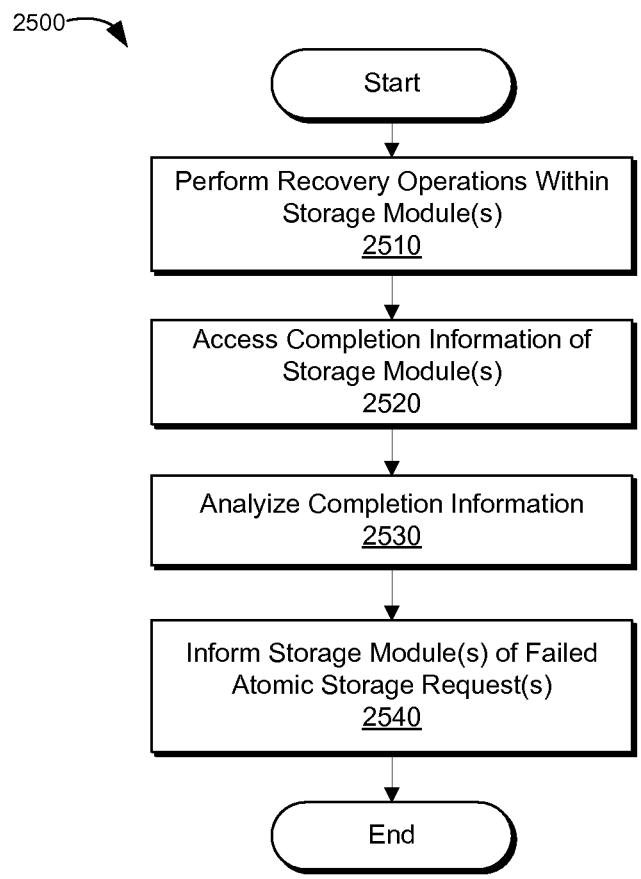
FIG. 25 is a flow diagram of another embodiment of a method for recovering from an invalid shutdown condition.

FIG. 25 is a flow diagram of one embodiment of a method 2500 for recovering from an invalid shutdown condition. Step 2510 may comprise detecting an invalid shutdown condition by a recovery agent 2077 of the aggregation module 2070. The invalid shutdown condition may correspond to an invalid shutdown of one or more storage modules 2030A-N and/or an invalid shutdown of the aggregation module 2070.

Step 2510 may further comprise performing recovery operations within the respective storage modules 2030A-N. As disclosed herein, the storage modules 2030A-N may be configured to identify and roll back data pertaining to incomplete and/or failed atomic storage operations performed on the respective storage modules 2030A-N (e.g., by use of respective reconstruction modules 1637 and/or atomic storage modules 1668A-N). However, the storage modules 2030A-N may be incapable of detecting failure conditions in other storage modules 2030A-N. As disclosed herein, an atomic storage request may be split into sub-operations, which may be performed on two or more different storage modules 2030A-N. The sub-operations performed on a first storage module 2030A may complete successfully. The sub-operations performed on a second storage module 2030N may fail. The storage module 2030N may be capable of identifying and rolling back the data of the failed sub-operations. From the perspective of the storage module 2030A, however, the sub-operations appear to have been completed successfully; the storage module 2030A may be unaware of the failure in the other storage module 2030N. Therefore, although the storage module 2030N rolls back the failed atomic storage request, the storage module 2030A may not, resulting in an invalid data remaining on the storage module 2030A.

Step 2520 may comprise accessing completion information of a plurality of storage modules 2030A-N, as disclosed herein. Step 2520 may be performed in response to recovery operations of the storage modules 2030A-N. Accordingly, step 2520 may be performed after recover operations are completed within the respective storage modules 2030A-N.

Step 2530 may comprise identifying a failed atomic storage request involving two or more storage modules 2030A-N by use of the completion information accessed at step 2520. The failed atomic storage request may be identified by use of the completion information, as disclosed herein.

Step 2540 may comprise informing the storage modules 2030A-N involved in the identified atomic storage request that the atomic storage request failed. Step 2030A-N may comprise instructing the two or more storage modules 2030A-N to roll back atomic storage operations performed on the respective storage modules 2030A-N as part of the failed atomic storage request. Referring to the Example above, step 2540 may comprise informing storage module 2030A that the atomic storage request failed and, as such, the data of the sub-operations performed thereon should be rolled back.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. A method, comprising:
    assigning two or more storage controllers of a storage system to an atomic storage request, each of the two or more storage controllers assigned to implement respective sub-requests of the atomic storage request based on associations between addresses of the atomic storage request and logical address spaces managed by respective storage controllers of the storage system;
    generating completion metadata for the atomic storage request, the completion metadata comprising one or more of: a number of storage controllers assigned to the atomic storage request and an identifier of each of the assigned storage controllers; and
    configuring each storage controller of the assigned storage controllers to store the completion metadata generated for the atomic storage request in response to completing implementation of the respective sub-requests assigned to the storage controller.

2. The method of claim 1, further comprising:
    determining a count of storage controllers having stored the completion metadata generated for the atomic storage request; and
    comparing the determined count to the number of storage controllers assigned to the atomic storage request included in the completion metadata generated for the atomic storage request.

3. The method of claim 1, further comprising:
    acquiring storage controller identifiers from storage controllers of the storage system determined to have stored the completion metadata generated for the atomic storage request; and
    determining whether each identifier included in the completion metadata generated for the atomic storage request corresponds to a storage controller identifier of the acquired storage controller identifiers.

4. The method of claim 1, further comprising:
    requesting the completion metadata generated for the atomic storage request from each of the plurality of storage controllers of the storage system;
    receiving the completion metadata generated for the atomic storage request from one or more of the storage controllers of the storage system in response to the requesting; and
    determining whether the atomic storage request was successfully completed within the storage system by one or more of:
        comparing a count of the one or more storage controllers to the number of storage controllers assigned to the atomic storage request included in the completion metadata generated for the atomic storage request; and
        determining whether each identifier included in the completion metadata generated for the atomic storage request corresponds to a storage controller of the one or more storage controllers.

5. The method of claim 1, further comprising:
    issuing the respective sub-requests to the assigned storage controllers, wherein issuing the respective sub-requests comprises translating addresses of the atomic storage request to logical addresses of the logical address spaces managed by the assigned storage controllers.

6. The method of claim 1, further comprising:
    determining whether the atomic storage request was successfully completed, the determining comprising:
        requesting last completion metadata written by each of the storage controllers of the storage system;
        identifying, in completion metadata received in response to the requesting, completion metadata comprising a sequence indicator of the atomic storage request; and
        using the identified completion metadata to determine whether the atomic storage request was successfully completed.

7. The method of claim 6, further comprising:
    determining that the atomic storage request was successfully completed in response to one or more of:
        receiving completion metadata comprising the sequence indicator of the atomic storage request from the number of storage controllers assigned to the atomic storage request; and
        receiving completion metadata comprising the sequence indicator of the atomic storage request from storage controllers corresponding to each storage controller assigned to the atomic storage request.

8. The method of claim 6, further comprising:
    determining that the atomic storage request was not completed successfully in response to one or more of:
        receiving completion metadata comprising the sequence indicator of the atomic storage request from fewer than the number of storage controllers assigned to the atomic storage request; and
        determining that an identifier included in the completion metadata generated for the atomic storage request does not correspond to a storage controller from which completion metadata comprising the sequence identifier of the atomic storage request was received.

9. The method of claim 8, further comprising:
instructing one or more of the storage controllers of the storage system to invalidate data pertaining to the atomic storage request.

10. The method of claim 6, further comprising:
determining whether the atomic storage request was successfully completed in response to detecting an invalid shutdown.

11. An apparatus, comprising:
an atomic aggregation module configured to:
  assign respective atomic storage operations of an atomic storage request to two or more storage modules of a storage system comprising a plurality of storage modules; and
  generate a transaction completion tag for the atomic storage request, the transaction completion tag comprising a sequence indicator and one or more of: a number of storage modules assigned to implement atomic storage operations of the atomic storage request, and identifiers of the two or more storage modules in the storage system; and
an aggregation storage module configured to cause each storage module of the two or more storage modules to:
  write the transaction completion tag generated for the atomic storage request in non-volatile storage of the storage module in response to completing the respective atomic storage operations assigned to the storage module.

12. The apparatus of claim 11, wherein:
the atomic storage request corresponds to identifiers of an aggregate address space corresponding to a plurality of logical address spaces of respective storage modules of the storage system; and
the atomic aggregation module is configured to select the two or more storage modules to implement the respective atomic storage operations of the atomic storage request based on associations between the identifiers of the atomic storage request and the logical address spaces of the respective storage modules of the storage system.

13. The apparatus of claim 11, further comprising:
a recovery agent configured to:
  request transaction completion tags from each storage module of the storage system; and
  determine whether the atomic storage request was completed successfully based on transaction completion tags received in response to the request.

14. The apparatus of claim 13, wherein the recovery agent is configured to determine that the request completed successfully in response to one or more of:
  determining that transaction completion tags comprising the sequence indicator of the atomic storage request were received from the number of storage modules assigned to implement atomic storage operations of the atomic storage request;
  determining that transaction completion tags comprising the sequence indicator of the atomic storage request were received from storage modules corresponding to each of the identifiers included in the transaction completion tag generated for the atomic storage request.

15. The apparatus of claim 13, wherein the recovery agent is configured to determine that the atomic storage request is incomplete in response to one or more of:
  determining that transaction completion tags comprising the sequence indicator of the atomic storage request were received from fewer than the number of storage modules assigned to implement the atomic storage operations of the atomic storage request; and
  determining that one or more of the identifiers included in the transaction completion tag does not correspond to a storage module from which a transaction completion tag comprising the sequence indicator of the atomic storage request was received.

16. The apparatus of claim 15, wherein the recovery agent is configured to instruct the storage modules of the storage system to invalidate data pertaining to the atomic storage request.

17. The apparatus of claim 11, further comprising:
a recovery agent configured to inform a first one of the two or more storage modules that the atomic storage request failed in response to determining that a second one of the two or more storage modules failed to store the transaction completion tag generated for the atomic storage request.

18. The apparatus of claim 11, further comprising:
a recovery agent configured to:
  access transaction completion tags stored within non-volatile storage of the storage modules; and
  determine whether the atomic storage request was fully completed based on the accessed transaction completion tags.

19. The apparatus of claim 11, further comprising:
a recovery agent configured to:
  determine that the atomic storage request was completed on each of the two or more storage modules in response to determining that each of the two or more storage modules stored the completion tag of the atomic storage request on respective storage devices of the two or more storage modules.

20. The apparatus of claim 11, wherein each of the storage modules comprises an atomic storage module configured to identify and/or invalidate data of failed atomic storage operations performed on the storage module.

21. A non-transitory computer-readable storage medium comprising computer-readable program code configured for execution by a processor to cause a computing device to perform operations, the operations comprising:
  combining a plurality of logical address spaces to form a virtual address space, each logical address space corresponding to a respective storage layer configured to perform storage operations pertaining to the logical address space on persistent storage of the storage layer;
  selecting two or more of the storage layers to implement an atomic storage request, each of the two or more storage layers being assigned to implement a respective portion of the atomic storage request based on mappings between virtual identifiers of the atomic storage request and the logical address spaces corresponding to the storage layers; and
  providing completion data for the atomic storage request to each of the selected storage layers, the completion data comprising a completion sequence number and one or more of: a number of the selected storage layers, and an identifier of each of the selected storage layers, wherein each storage layer of the selected storage layers is configured to write the provided completion data to the persistent storage of the storage layer in response to the storage layer completing the respective portion of the atomic storage request assigned to the storage layer.

22. The non-transitory computer-readable storage medium of claim 21, wherein each storage layer of the selected storage layers is assigned to implement the respective portion of the atomic storage request that maps to the logical address space corresponding to the storage layer.

23. The non-transitory computer-readable storage medium of claim 21, the operations further comprising:
translating virtual identifiers of a portion of the atomic storage request assigned to a particular storage layer of the selected storage layers to logical identifiers within the logical address space of the particular storage layer; and
sending an atomic sub-request comprising the translated logical identifiers to the particular storage layer, the atomic sub-request configured to cause the particular storage layer to implement the portion of the atomic storage request assigned to the particular storage layer on the persistent storage of the particular storage layer.

24. The non-transitory computer-readable storage medium of claim 21, the operations further comprising:
determining whether each storage layer of the selected storage layers completed the portion of the atomic storage request assigned to the storage layer, by:
accessing completion data stored on persistent storage of the storage layers; and
determining one or more of:
whether a number storage layers storing completion data comprising the completion sequence indicator of the atomic storage request corresponds to the number of the selected storage layers, included in the provided completion data for the atomic storage request; and
whether each identifier included in the provided completion data for the atomic storage request corresponds to a storage layer storing completion data comprising the completion sequence number of the atomic storage request.

25. The non-transitory computer-readable storage medium of claim 21, the operations further comprising:
issuing respective atomic sub-requests to the selected storage layers, each atomic sub-request configured to cause a respective storage layer of the selected storage layers to implement the portion of the atomic storage request assigned to the storage layer; and
determining whether the atomic storage request was fully completed based on completion data stored on the persistence storage of the storage layers.

* * * * *